US012769638B2

(12) United States Patent
Fedoruk et al.

(10) Patent No.: US 12,769,638 B2
(45) Date of Patent: *Oct. 20, 2026

(54) CONTROLLING ACCESS TO RESOURCES IN A MULTI-TENANT ARTIFICIAL INTELLIGENCE PIPELINE PLATFORM

(71) Applicant: Airia LLC, Alpharetta, GA (US)

(72) Inventors: Roman Fedoruk, Cumming, GA (US); John Manton, Alpharetta, GA (US); Spencer Reagan, Marietta, GA (US); Gregory Roberts, Alpharetta, GA (US); Erich Stuntebeck, Alpharetta, GA (US)

(73) Assignee: Airia LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/377,256

(22) Filed: Nov. 3, 2025

(65) Prior Publication Data

US 2026/0057434 A1 Feb. 26, 2026

Related U.S. Application Data

(63) Continuation of application No. 18/820,235, filed on Aug. 29, 2024, now Pat. No. 12,488,383.

(Continued)

(51) Int. Cl.

*G06Q 30/0601* (2023.01)
*G06F 8/34* (2018.01)

(Continued)

(52) U.S. Cl.

CPC ............ *G06F 21/6218* (2013.01); *G06F 8/34* (2013.01); *G06F 8/35* (2013.01); *G06F 9/445* (2013.01);

(Continued)

(58) Field of Classification Search

CPC ........ G06F 21/6218; G06F 9/451; G06F 8/34; G06F 8/35; G06F 9/445; G06F 11/3476;

(Continued)

(56) References Cited

U.S. PATENT DOCUMENTS

| | | | |
|---|---|---|---|
| 9,495,133 | B1 | 11/2016 | Righi et al. |
| 10,009,375 | B1 | 6/2018 | Sites |

(Continued)

FOREIGN PATENT DOCUMENTS

| | | | |
|---|---|---|---|
| CN | 115374515 | A | 11/2022 |
| CN | 117114088 | A | 11/2023 |

(Continued)

OTHER PUBLICATIONS

Desfeux et al., Identification of a Series of Compatible Components using Artificial Intelligence, 2019, World Intellectual PropertyOrganization Patent Cooperation Treaty (PCT), pp. 1-34 (Year: 2019).

(Continued)

*Primary Examiner* — Stephen S Hong
*Assistant Examiner* — Darrin Hope
(74) *Attorney, Agent, or Firm* — Clayton, McKay & Bailey, PC

(57) ABSTRACT

Systems and methods are described for managing resource access in multitenancy in artificial intelligence (AI) platforms. The platform can provide a user interface (UI) that allows for creation of an organization, tenants within that organization, and groups within tenants. This hierarchy can dictate resource permissions that impact which AI agents and agent objects are available to a user. The different tenants can have segregated data and utilize different agent objects, such as different prompts, datasets, or models. A marketplace UI can prioritize additional marketplace agents for approval and inclusion with the tenant.

20 Claims, 22 Drawing Sheets

Related U.S. Application Data

(60) Provisional application No. 63/658,434, filed on Jun. 10, 2024.

(51) Int. Cl.

| | |
|---|---|
| ***G06F 8/35*** | (2018.01) |
| ***G06F 9/445*** | (2018.01) |
| ***G06F 9/451*** | (2018.01) |
| ***G06F 11/34*** | (2006.01) |
| ***G06F 11/3668*** | (2025.01) |
| ***G06F 21/12*** | (2013.01) |
| ***G06F 21/31*** | (2013.01) |
| ***G06F 21/45*** | (2013.01) |
| ***G06F 21/50*** | (2013.01) |
| ***G06F 21/62*** | (2013.01) |
| ***G06F 30/27*** | (2020.01) |
| ***G06N 3/0475*** | (2023.01) |
| ***G06N 3/088*** | (2023.01) |
| ***G06N 20/00*** | (2019.01) |
| *G06F 9/46* | (2006.01) |
| *G06F 21/36* | (2013.01) |
| *G06F 21/44* | (2013.01) |

(52) U.S. Cl.

CPC .......... *G06F 9/451* (2018.02); *G06F 11/3457* (2013.01); *G06F 11/3476* (2013.01); *G06F 11/3672* (2013.01); *G06F 11/3692* (2013.01); *G06F 21/121* (2013.01); *G06F 21/316* (2013.01); *G06F 21/45* (2013.01); *G06F 21/50* (2013.01); *G06F 21/6209* (2013.01); *G06F 30/27* (2020.01); *G06N 3/0475* (2023.01); *G06N 3/088* (2013.01); *G06N 20/00* (2019.01); *G06Q 30/0641* (2013.01); *G06F 9/468* (2013.01); *G06F 21/36* (2013.01); *G06F 21/44* (2013.01); *G06F 2209/5015* (2013.01); *G06F 2209/5022* (2013.01); *G06F 2209/503* (2013.01); *G06F 2221/2141* (2013.01)

(58) Field of Classification Search

CPC .... G06F 21/121; G06F 21/45; G06F 21/6209; G06F 2221/2141; G06F 30/27; G06F 11/3457; G06F 11/3672; G06F 11/3692; G06F 21/316; G06F 21/50; G06F 9/468; G06F 21/36; G06F 21/44; G06F 2209/5015; G06F 2209/5022; G06F 2209/503; G06N 20/00; G06N 3/0475; G06N 3/088; G06Q 30/0641

See application file for complete search history.

(56) References Cited

U.S. PATENT DOCUMENTS

| | | | |
|---|---|---|---|
| 10,417,249 | B1 | 9/2019 | Sadler et al. |
| 10,977,006 | B2 * | 4/2021 | Katzenberger .... G06F 16/24568 |
| 11,616,801 | B2 | 3/2023 | Sjouwerman |
| 11,710,306 | B1 | 7/2023 | Bazrafkan et al. |
| 11,748,634 | B1 | 9/2023 | Kulkarni et al. |
| 12,111,747 | B1 | 10/2024 | Jain et al. |
| 12,277,245 | B1 | 4/2025 | Morgan et al. |
| 12,556,559 | B1 | 2/2026 | Bhattacharya et al. |
| 12,602,238 | B1 | 4/2026 | Swanger et al. |
| 2011/0213712 | A1 | 9/2011 | Hadar et al. |
| 2016/0063512 | A1 | 3/2016 | Greenspan et al. |
| 2018/0152564 | A1 | 5/2018 | Lang et al. |
| 2018/0314971 | A1 | 11/2018 | Chen et al. |
| 2019/0206390 | A1 | 7/2019 | Rotem et al. |
| 2020/0104123 | A1 | 4/2020 | Laschet et al. |
| 2020/0118019 | A1 | 4/2020 | Sengupta et al. |
| 2020/0257567 | A1 | 8/2020 | Fontanari Filho et al. |
| 2020/0265509 | A1 | 8/2020 | Kumar Addepalli et al. |
| 2020/0382442 | A1 | 12/2020 | Bantke et al. |
| 2021/0007814 | A1 | 1/2021 | Shuma et al. |
| 2021/0014299 | A1 | 1/2021 | Lin et al. |
| 2021/0056266 | A1 | 2/2021 | Ma et al. |
| 2021/0065048 | A1 | 3/2021 | Salonidis et al. |
| 2022/0066905 | A1 | 3/2022 | Lee et al. |
| 2022/0138004 | A1 | 5/2022 | Nandakumar |
| 2022/0188691 | A1 | 6/2022 | Katz et al. |
| 2022/0261598 | A1 | 8/2022 | Chen et al. |
| 2022/0308918 | A1 | 9/2022 | Pandey et al. |
| 2022/0343207 | A1 | 10/2022 | Vu et al. |
| 2023/0007856 | A1 | 1/2023 | Balasubramanian et al. |
| 2023/0098725 | A1 | 3/2023 | Tidd et al. |
| 2023/0110527 | A1 * | 4/2023 | Bhat .................... H04L 63/102 726/4 |
| 2023/0205674 | A1 | 6/2023 | Sahu et al. |
| 2023/0236960 | A1 | 7/2023 | Dzhuraeva et al. |
| 2023/0350648 | A1 | 11/2023 | Guo et al. |
| 2023/0359927 | A1 | 11/2023 | Gogin et al. |
| 2023/0368284 | A1 | 11/2023 | Sheikh et al. |
| 2023/0401327 | A1 * | 12/2023 | Loganathan ............ G06F 16/27 |
| 2023/0409654 | A1 | 12/2023 | Ziv et al. |
| 2023/0418622 | A1 | 12/2023 | Zhu et al. |
| 2024/0028417 | A1 | 1/2024 | Manamohan et al. |
| 2024/0061719 | A1 | 2/2024 | Reddy |
| 2024/0080192 | A1 | 3/2024 | Wu et al. |
| 2024/0281419 | A1 | 8/2024 | Alfaras et al. |
| 2024/0296522 | A1 | 9/2024 | Saito |
| 2024/0330753 | A1 | 10/2024 | Chen et al. |
| 2024/0338179 | A1 | 10/2024 | Sangeneni |
| 2024/0338290 | A1 | 10/2024 | Abay et al. |
| 2025/0004757 | A1 | 1/2025 | Pathak et al. |
| 2025/0029039 | A1 | 1/2025 | Kumar et al. |
| 2025/0085935 | A1 | 3/2025 | Ketharaju et al. |
| 2025/0103304 | A1 | 3/2025 | Ye et al. |
| 2025/0130884 | A1 | 4/2025 | Wong et al. |
| 2025/0165775 | A1 | 5/2025 | Sathianathan et al. |
| 2025/0200294 | A1 | 6/2025 | Shin |
| 2025/0240220 | A1 | 7/2025 | Poothiyot et al. |
| 2025/0298955 | A1 | 9/2025 | Ramirez Beltran et al. |
| 2025/0341809 | A1 | 11/2025 | Sheldon et al. |
| 2025/0342100 | A1 | 11/2025 | Ramanujan et al. |
| 2025/0356313 | A1 | 11/2025 | Pollock et al. |
| 2025/0373451 | A1 | 12/2025 | Jungerman et al. |
| 2025/0378007 | A1 | 12/2025 | Gulwani et al. |

FOREIGN PATENT DOCUMENTS

| | | | |
|---|---|---|---|
| KR | 102608631 | B1 | 12/2023 |
| WO | 2019053488 | A1 | 3/2019 |

OTHER PUBLICATIONS

Ding et al., "Hybrid LLM: Cost-Efficient and Quality-Aware Query Routing", arXiv preprint arXiv:2404.14618 (Apr. 2024). (Year: 2024).

Geronimo, "Evaluating LLMs with Semantic Similarity," Mar. 2024 [retrieved on Nov. 30, 2024], pp. 1-39, downloaded from :https://medium.com/@geronimo7/semscore-evaluating-llms-with-semantic-similarity-2abf5c2fadb9. (Year: 2024).

Hazelwood et al., "Applied Machine Learning at Facebook: A Datacenter Infrastructure Perspective," 2018 IEEE International Symposium on High Performance Computer Architecture (H PCA), Vienna, Austria, 2018, pp. 620-629, doi: 0.1109/H PCA.2018.00059 (Year: 2018).

Lin et al., A Pipeline Design Method For Domestic Design(translation), 2022, Chinese Patent Office, pp. 1-8 (Year: 2022).

Lins et al., "Artificial Intelligence as a Service", Bus Inf Syst Eng 63, 441-456 (2021 ). https://doi .org/10.1007 /s 12599-021-00708-w (Year: 2021).

Niknazar et al. "Building a domain-specific guardrail model in production." arXiv preprint arXiv:2408.01452 (Jul. 2024). (Year: 2024).

Leonel Rosasn-Arias et al., "A Graphical User Interface for Fast Evaluation and Testing of Machine Learning Models Performance",

(56) References Cited

OTHER PUBLICATIONS

2019 [retrieved Mar. 25, 2026], pp. 1-6, downloaded from : https://ieeexplore.ieee.org/abstracUdocumenU8739238. (Year: 2019).

Scott Jordan et al., "Evaluating the Performance of Reinforcement Learning Algorithms", 2020 [retrieved Mar. 25, 2026], pp. 1-12, downloaded from :https://proceedings.mlr.press/v119/jordan20a.html. (Year: 2020).

Zoltan Somogyi, "Performance Evaluation of Machine Leaming Models", 2021 [retrieved Mar. 25, 2026], pp. 87-112, https://link.springer.com/chapter/10.1007/978-3-030-60032-7 3. (Year: 2021).

Ian Arawjo et al., "Chain Forge: A Visual Toolkit for Prompt Engineering and LLM Hypothesis Testing", May 11, 2024 [retrieved Apr. 13, 2026], pp. 1-18, downloaded from :https://dl.acm.org/doi/full/10.1145/3613904.3642016. (Year: 2024).

Yongchao Zhou et al., "Large Language Models are Human-Level Prompt Engineers", Mar. 10, 2023 [retrieved Apr. 9, 2026], pp. 1-43, downloaded from :https://arxiv.org/pdf/2211.01910. (Year: 2023).

Paul Fergus et al., "Deploying and Hosting Machine Learning Models", Jul. 19, 2022 [retrieved May 6, 2026], pp. 299-371, downloaded from :https://link.springer.com/chapter/10.1007/978-3-031-04420-5_13. (Year: 2022).

* cited by examiner

CONTROLLING ACCESS TO RESOURCES IN A MULTI-TENANT ARTIFICIAL INTELLIGENCE PIPELINE PLATFORM

CROSS-REFERENCE TO RELATED APPLICATIONS

This application claims priority as a continuation application to U.S. application Ser. No. 18/820,235, filed Aug. 29, 2024, titled "Controlling Access to Resources in a Multi-tenant Artificial Intelligence Agent Platform," which claims priority as a non-provisional application to U.S. provisional application No. 63/658,434, titled "Artificial Intelligence Agent Platform," filed on Jun. 10, 2024, the contents of which are incorporated herein in their entirety.

BACKGROUND

The rise of artificial intelligence (AI) has significantly transformed various industries, offering unprecedented capabilities in data processing, predictive analytics, and decision-making. However, managing AI pipelines, also called AI agents, especially in a multi-tenant environment, presents substantial challenges, particularly for small and medium-sized enterprises (SMEs). These challenges are exacerbated by the rapid pace of technological advancement, which necessitates frequent updates to AI models, algorithms, and underlying codebases. SMEs often lack the resources, both in terms of specialized personnel and financial investment, to continuously adapt and maintain robust AI agents. This situation creates a significant barrier to entry, limiting the ability of smaller companies to leverage AI technologies effectively.

Moreover, the complexity of AI agent management is heightened in multi-tenant environments, where a single platform serves multiple tenants, each with potentially diverse needs and use cases. Ensuring that each tenant can efficiently deploy, manage, and update their AI solutions without significant downtime or the need for specialized expertise is a formidable task. The difficulty of maintaining compatibility across various AI tools, the need for continuous performance tuning, and the challenges associated with scaling AI operations further complicate the management of these AI agents.

As the foregoing illustrates, what is needed in the art are more effective systems and methods for testing multiple AI pipelines and conveying differences in their functionality.

SUMMARY

Systems and methods described herein aim to alleviate AI adoption challenges by providing an AI platform that allows a primary tenant to manage and provide AI agents and tools to subtenants. The terms AI agent and AI pipeline are used synonymously herein. Likewise, the terms agent object and pipeline object are synonymous.

The AI platform is designed to simplify the deployment and management of AI solutions for subtenants, who may lack in-depth technical knowledge. Subtenant users can interact with the platform by answering a series of questions related to their specific business needs. Based on their responses, the platform intelligently matches them with a relevant use-case template, which includes predefined base AI agents tailored to their needs.

This approach not only streamlines the process of implementing AI solutions but also ensures that subtenants can benefit from cutting-edge AI technologies without the burden of ongoing maintenance and updates. By centralizing the management of AI agents within a platform accessible to multiple tenants, the invention reduces the complexity, cost, and time required for subtenants to deploy and maintain effective AI solutions, making advanced AI capabilities more accessible to smaller companies.

The AI platform allows tenants and subtenants to build, test, and deploy AI agents. These AI agents can consist of multiple agent objects, including one or more dataset objects, model objects, prompt objects, and code objects. The AI platform comprehensively facilitates the management of artificial intelligence (AI) agents in a multi-tenant environment, addressing significant technical challenges that have hindered smaller enterprises from effectively utilizing AI technologies.

The system addresses ongoing problems related to the complexity and resource-intensive nature of managing AI agents across multiple organizations and tenants of those organizations, all who have diverse needs. Traditional AI management systems require continuous updates, customizations, and maintenance, which can overwhelm smaller companies with limited technical expertise. The system can address these issues by automating the process of matching tenant users with relevant AI tools and agents, reducing the need for specialized knowledge and ongoing maintenance. Additionally, the organization can manage the types of AI tools and agents available to different specific or types of subtenants.

A server can receive organization account information comprising an organization identifier and an organization administrator identifier. For example, a user can select an option on a website or application to create an account, supplying an email address for the user, a first and last name, and the name of the organization. The organization information can be received through a first user interface (UI).

The server can then generate an organization computing environment based on the organization account information. The organization computing environment can include an organization computing environment profile. The organization computing environment profile can include the organization identifier. The organization computing environment can also include an organization administrator user profile. The organization administrative user profile comprises the organization administrator identifier and at least one administrative permission assigned to the organization administrator identifier. The permissions can be governed by management policies available at the server.

In one example, the server causes organization resource permissions to be assigned to the organization computing environment profile and a plurality of agent objects to be made accessible to the organization computing environment. The resource permissions can dictate the plurality of agent objects accessible to those associated with the organization.

The server can also receive a request to generate a first tenant and a second tenant. This request can be received through a second UI and can include first tenant information and second tenant information. In an instance in which the generation request is authorized based at least in part on the administrator user profile, the server can perform multiple stages as part of creating tenants for management by the organization. For example, the server can cause a first tenant and a second tenant to be generated. The first tenant comprises a first tenant profile and the second tenant comprises a second tenant profile. The first tenant profile comprises a first tenant identifier and the second tenant profile comprises a second tenant identifier, with both tenant profiles also being associated with the organization.

The server can assign first tenant resource permissions to the first tenant profile, the first tenant resource permissions being a subset of the organization resource permissions. This can cause first agent objects to be accessible to the first tenant in accordance with the first tenant resource permissions, wherein the first agent objects are a subset of the organization agent objects. The server can cause second agent objects to be accessible to the second tenant, the second agent objects being a different subset of the organization agent objects than the first agent objects.

The server can receive a request to assign first tenant permissions and second tenant permissions to the user profile, the request being received through a third UI. Thus, the user profile can include multiple permissions levels, such as an organization level and a tenant level. The organization level can dictate which changes the user can make at organization level, whereas each tenant level dictates which tenant changes the user can make for that respective tenant. The user profile can also include group permissions, which dictate which changes the user can make based on group affiliation at a particular tenant. In an instance in which the assignment request is determined to be authorized based at least in part on the administrator profile, the server can assign the first tenant permissions and the second tenant permissions to the user profile.

The server can also receive a request to access the organization computing environment by a second user. The request can be associated with the user identifier, allowing the server to identify the user and the associated permissions. The user identifier can also be associated with the organization, one or more tenants, and one or more groups, allowing resource permissions to be dynamically determined. In an instance in which the access request is determined to be authorized based at least in part on the association of the user profile to the first tenant profile and the second tenant profile, the system can cause a UI to display based on which tenant is selected, providing access to the selected tenant's AI agents and agent objects while preventing access to different agent objects of a different tenant. The tenant selection can be associated with the user profile of the second user, which can track a default or currently selected tenant.

In one example, the tenant selection is received from a tenant selector component of the UI. The tenant selector presents the first and second tenants as options to the second user based on the stored profile of the second user identifying the first and second tenants. Selecting the second tenant causes display of the second agent objects, with the server preventing the second user from simultaneously accessing the first and second tenants' AI agents and agent objects. This is because the second user can have different resource permissions with respect to the second tenant than with respect to the first tenant.

When the first tenant is selected, the UI can display the first agent objects, which are those available to the first tenant. If the second user belongs to a group within the first tenant, the available agent objects can be a subset of the first agent objects that meet the resource permissions of the first group of the first tenant. The UI can display options to select and connect the subset of first agent objects, the subset of first agent objects including prompt objects, dataset objects, and model objects. The subset of first agent objects can also be limited based on an evaluation of at least one management policy associated with the second user. For example, some AI agents and agent objects might only be available to the second user when the second user is within a geofence of the office or outside a geofence of competitor locations.

The server can also cause display of a marketplace on the UI for adding agent objects to the available agent objects. The marketplace can be a UI feature that presents various selectable Agent objects (marketplace agent objects), such as models and datasets. Cost and performance statistics can be included with the marketplace agent objects. The UI can prioritize display of marketplace agent objects that meet the first resource permissions of the first tenant and even the first group to which the second user belongs. The prioritization can also be based on the marketplace agent object being compatible with an AI agent that is stored in association with the first group. The UI therefore prioritizes display of marketplace agent objects that meets resource permissions of whichever tenant is currently selected.

In one example, the UI includes an option to simulate execution of the first marketplace agent object prior to purchase. The simulated execution uses first marketplace agent object in a modified version of the AI agent that is stored in association with the first group. This execution can be simulated simultaneously with the original AI agent in an example, such that the second user can understand performance and results differences.

The second user can attempt to purchase the first marketplace agent object. This can include the server receiving an UI selection from the second user to add the first marketplace agent object to the available agent objects of the first group. Depending on the privileges of the second user, the actual purchase the first marketplace agent object can be delayed and made contingent on approval by an administrative user that is different than the second user. The administrative user can perform various tests prior to approving, in an example. Upon approval, the server can update the available agent objects for the first group to include the purchased agent object.

The UI can also include an option to visualize currently non-permitted marketplace agent objects. For example, the second user can toggle on non-permitted marketplace agent objects that fail to meet the resource permissions of the first tenant or first group. This can cause a first non-permitted marketplace agent object to be prioritized for display based on similarities to a current agent object in the AI agent, the similarities including object type, object date, object version, and object creator.

When the second user is created, the second user can be assigned a default AI agent. This default AI agent can be selected for display based on profile information of the second user. The default AI agent meets resource permissions of the first group, first tenant, and first organization.

Based on the resource permissions, the system identifies and displays the available tenant agents and agent objects, such as AI models, datasets, and prompt packages, keys, and code objects that are accessible to the user. The user can design and modify AI agents for the organization or a tenant depending on their resource permissions. The tenant user can access different agent objects for different tenants based on the tenant user having different roles with the multiple tenants. Roles can be managed by the group identifiers, allowing the tenant user to navigate between roles seamlessly. This solves the problem of managing access controls and permissions in a multi-tenant environment, ensuring that users have the appropriate level of access based on their roles.

In one example, the subset of tenant agent objects are determined based on a selected plan during or after tenant creation. Models in the marketplace are sorted by type for easier navigation. For example, the marketplace UI can group language models separately from image recognition models. The marketplace also highlights agent objects that have been previously tested within available subtenant AI agents or that are related to the collected information or the use-case template. Different agents and agent objects can be available in the marketplace UI, depending on the tenant.

The system can incorporate a token-based requirement for accessing marketplace agent objects, where the token requirements may vary depending on the plan selected for the subtenant. This feature ensures that subtenants can acquire the tools they need while managing costs effectively.

By solving these problems, the invention provides a powerful solution for managing AI agents in a multi-tenant environment, enabling both tenants and subtenants to leverage advanced AI capabilities with ease and efficiency. The platform's ability to reduce the complexity, cost, and time associated with AI deployment and maintenance makes it a valuable tool for companies of all sizes, particularly those with limited technical expertise.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
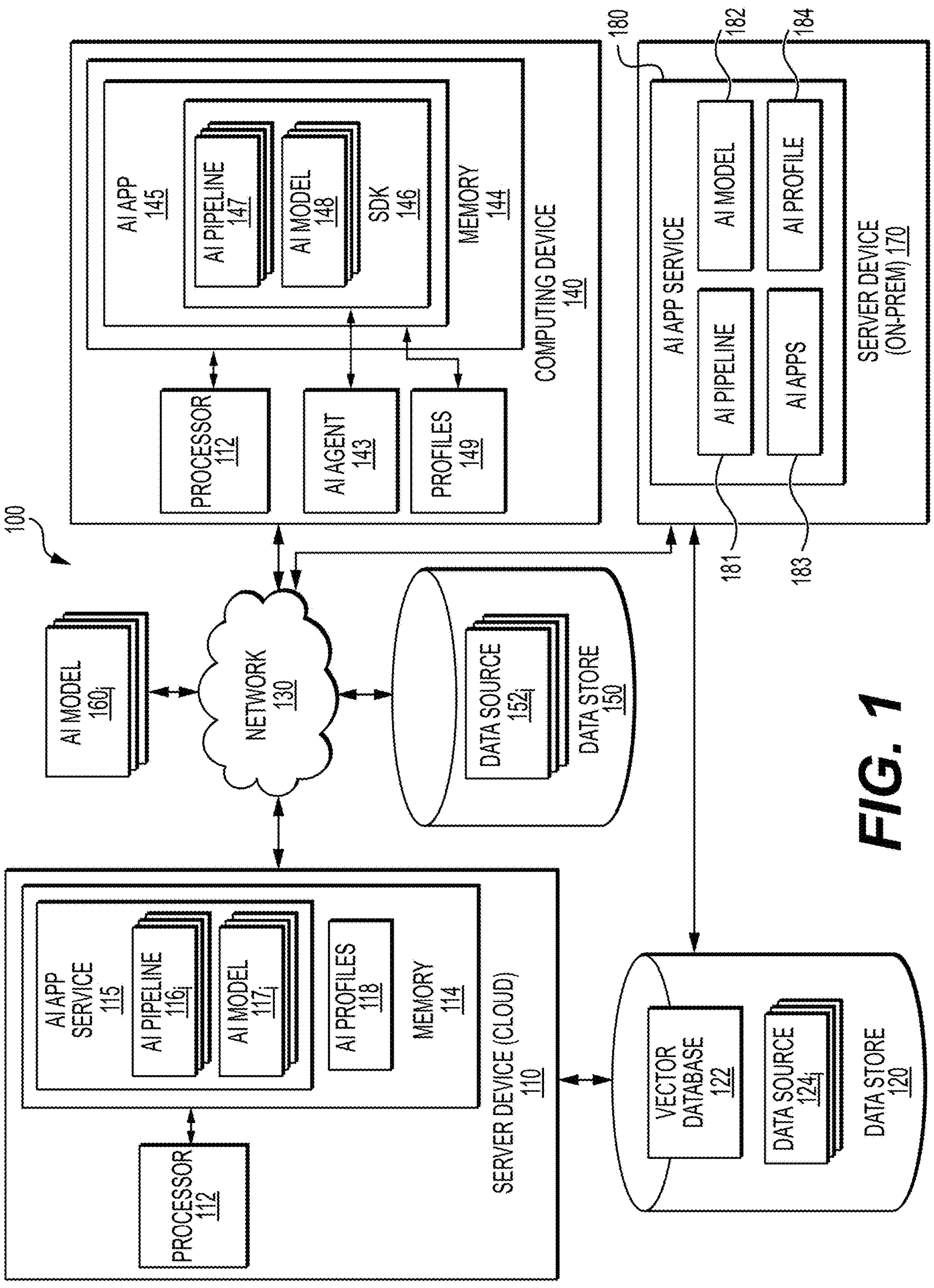
FIG. 1 illustrates a block diagram of a computer-based system configured to implement one or more aspects of the various embodiments.

FIG. 1 illustrates a block diagram of a computer-based system 100 configured to implement one or more aspects of at least one embodiment. As shown, the system 100 includes a server device 110 in communication with a data store 120, another data store 150, artificial intelligence (AI) models 160 (referred to herein collectively as AI models 160 and individually as an AI model 160), and a computing device 140. Illustratively, the server device 110, the AI models 160, the data store, and the computing device 140 are in communication over a network 130, which can be a wide area network (WAN) such as the Internet, a local area network (LAN), a cellular network, and/or any other suitable network.

As shown, an artificial intelligence (AI) application ("app") service 115 (also called "AI platform") executes on one or more processors 112 of the server device 110 and is stored in a system memory 114 of the server device 110. The AI app service 115 can act as an AI platform that provides tenants with a way to easily create, deploy, and manage AI agents 116. Tenants can create AI agents 116 that uniquely suit their needs. The AI app service 115 can present a graphical user interface (UI) that allows the user to design and manage the AI agents 116. The AI agents 116 can utilize AI models 117 to perform tasks for a wide range of enterprise and personal AI applications. An enterprise AI application can be used in a work setting, with managed access to various functions and datasets that are part of the application. A personal AI application can be one that a user downloads for personal use. The AI app service 115, can execute on a cloud server 110, or on one or more servers 170 that are located on premises at an enterprise.

AI profiles 118 can be stored at the AI platform for use in managing functionality of AI agents 116. The AI profiles 118 can be user specific, such that a user is assigned an AI profile 118 with information that impacts functionality with respect to that user. For example, the AI profile 118 can indicate a usage tier or enterprise group that applies to the user. The AI profile 118 can also track the user's activities at the AI app service 115. The AI app service 115 can use this information to determine which AI agents 116, datasets, AI models 117, prompts, and tools are available to the user.

An AI app service 180 that executes at an on-premises ("on-prem") server 170 can provide a tenant with similar AI agent design and administration. But being on-prem can allow for some AI agents 181 and/or objects within those agents to securely execute within an enterprise's own trusted infrastructure, in an example. The AI app service 180 can include AI agents 181, AI models 182, AI profiles 184, and AI apps 183. The AI apps 183 can be managed enterprise applications in an example. These can be accessed through a secure dashboard by users who are enrolled and in compliance with the AI app service 180. For example, a content application can allow enterprise users access to enterprise documents. But the documents can be intelligently surfaced or expanded through use of AI agents 181 that operate with the content application according to a user's AI profile 184. The AI models 182 can run locally or in a trusted outside environment so as to not compromise sensitive enterprise data.

Users can access the AI app service 115, 180 though use of a computing device 140, which can be any processor enabled device. Examples include a laptop, phone, tablet, headset, and personal computer. An AI agent 143 can execute on the computing device 140. The AI agent 143 can allow the AI platform (e.g., app service 115, 170) to manage what functionality of the AI agents 116, 181 is available to the computing device 140. In one example, the AI agent 143 is installed on the computing device 140 as part of device enrollment at the AI platform, or as part of installation of an AI app 145 that interacts with the AI platform (e.g., AI app service 115, 180). The AI agent 143 can be part of an AI app 145 or operating system. Alternatively, the AI agent 143 or can execute as a stand alone application.

The AI agent 143 can ensure that the computing device 140 complies with management policies, and vary access to objects at the AI platform based on the level of compliance. For example, a compliant computing device 140 can download or access an AI app 183 and/or objects of an AI agent 181. But the AI platform can prevent a non-compliant computing device from executing the AI agent 181 or specific objects within the agent, such as specific AI models 182, tools, datasets, or prompt packages. Alternate AI agents 116, 147, 181 can be provided based on the level of compliance of the computing device 140.

One or more user or device profiles 118, 184 can be maintained at the platform and fully or partially maintained at the computing device 140 as profiles 149. Any or all of these profiles 118, 149, 184 can track user and device information that are utilized by the AI platform. The profile information can be updated by the AI platform, such as by storing query and result history, and learned aspects about the user that are relevant to an AI app 145 that utilizes the AI platform. The profile 118, 149, 184 itself can be an input to an AI agent 116, 147, 181.

A compliance management service can execute at the platform and can communicate with the AI agent 143 to ensure that a computing device 140 remains compliant with compliance rules as a requisite to AI agent operation.

Compliance rules can encompass configurable criteria that must be met for a client device to be considered "in compliance" with the AI agent management service. These rules can be determined based on various factors such as the geographical location of the client device, its activation and management enrollment status, authentication data (including data obtained by a device management system), time, date, and network properties, among others. User profiles associated with specific users can also influence the compliance rules. User profiles are identified through authentication data linked to the client device and can be associated with compliance rules that take into account time, date, geographical location, and network properties detected by the device. Furthermore, user profiles 149 can be connected to user groups (also called "management groups"), and compliance rules can be established based on these group associations.

Compliance rules set predefined constraints that must be satisfied for the AI agent management service or other applications to allow access to enterprise data or other features of the client device. In certain cases, the AI agent management service interacts with a management application, migration application, or other client application running on the device to identify states that violate one or more compliance rules. These non-compliant states can include the detection of viruses or malware on the computing device 140, the installation or execution of blacklisted client applications, or the device 140 being "rooted" or "jailbroken," which grants root access to the user. Other problematic states can involve the presence of specific files, suspicious device configurations, vulnerable versions of client applications, or other security risks. Sometimes, the migration service provides the compliance rules, which are based on the rules of the previous management service. Alternatively, the compliance rules can be directly configured in the AI agent management service by an administrator.

Returning to the functionality of the server device 110, 170, one or more processors 112 receive user input from input devices, such as a keyboard or a mouse. In operation, the one or more processors 112 may include one or more primary processors of the server device 110, controlling and coordinating operations of other system components. In particular, the processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

The system memory 114 of the server device 110 stores content, such as software applications and data, for use by the processor(s) 112 and the GPU(s) and/or other processing units. The system memory 114 can be any type of memory capable of storing data and software applications, such as a random-access memory (RAM), a read-only memory (ROM), an erasable programmable read-only memory (EPROM or flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a secure digital card, an external flash memory, a portable compact disc read-only memory (CD-ROM), an optical storage device, a magnetic storage device, and/or any suitable combination of the foregoing.

The server device 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1 can be modified as desired. In some embodiments, any combination of the processor(s) 112, the system memory 114, and/or GPU(s) can be included in and/or replaced with any type of virtual computing system, distributed computing system, and/or cloud computing environment, such as a public, private, or a hybrid cloud system.

In some embodiments, the AI platform application 115 is configured to facilitate the design, instantiation, modification, testing, and/or execution of AI agents 116*i* (referred to herein collectively as AI agents 116 and individually as an AI agent 116) that use one or more AI models 117 (referred to herein collectively as AI models and individually as an AI model 117), as discussed in greater detail below in conjunction with FIGS. 2-4. Generated AI agents, such as AI agents 147*i* (referred to herein collectively as AI agents 117 and individually as an AI agent 147), and AI models, such as AI models 148 (referred to herein collectively as AI models 148 and individually as an AI model 148), can also or instead be deployed to execute elsewhere, such as in a client application 145, which as shown includes a software development kit (SDK) that includes the API agents 147 and the AI models 148. Illustratively, the client application 145 is stored in a system memory 144, and executes on a processor 142, of the computing device 140, which can be similar to the processor 112 and the memory 114 of the server device 110, respectively. A machine learning (ML) model is one type of AI model.

In one example, a local AI agent 147 and AI Model 148 can be used as part of a larger AI agent 181 of the AI platform. This can allow for preprocessing locally, such as the redaction of personally identifiable information (PII). The local AI agent 147 and AI Model 148 can recognize PII in content before the content is sent to a cloud server 110, in an example. A discriminative model can run locally on the computing device 140, not relying on generative AI, such as LLMs, whether run locally or in the cloud. The recognized PII can be replaced with encrypted information, and a decryption mechanism, such as a key, hash, password or other information, can be supplied by the AI agent 143 to the AI platform. The decryption mechanism can be stored separately from the content with the removed PII, in an example. The decryption mechanism can allow the user or other authorized users to decrypt and reinsert the PII at a later time.

Each of the data store 120 and the external data store 150 can include any storage device or devices, such as fixed disc drive(s), flash drive(s), optical storage, network attached storage (NAS), and/or a storage area-network (SAN). Although shown as distinct from the server device 110, in at least one embodiment the server device 110 can include the data store 120 and/or the data store 150. Illustratively, the data stores 120 and 150 store data sources 124*i* (referred to herein collectively as data sources 124 and individually as a data source 124) and 152*i* (referred to herein collectively as data sources 152 and individually as a data source), respectively. In addition, the data store 120 stores a vector database 122. In operation, execution of the AI agents 116 and/or 147 can include use of local AI models (e.g., AI models 117 or 148) and/or remote AI models (e.g., AI models 160) that process input data along with data from one or more data sources 124 and/or 152 that are identified via an embedding search using the vector database 122 and provided to the local and/or remote AI models as context, as discussed in greater detail below in conjunction with FIGS. 2-5 and 11.

Although a server device 110 and a computing device 140 are shown for illustrative purposes, in some embodiments, each of the AI platform application 115 and/or client applications can be implemented in any combination of software and/or hardware and can execute in any technically feasible type of computing system, such as a desktop computer, a laptop computer, a mobile device, a virtualized instance of a computing device, a datacenter computing system, a distributed and/or cloud-based computing system, and so forth.

Figure 2:
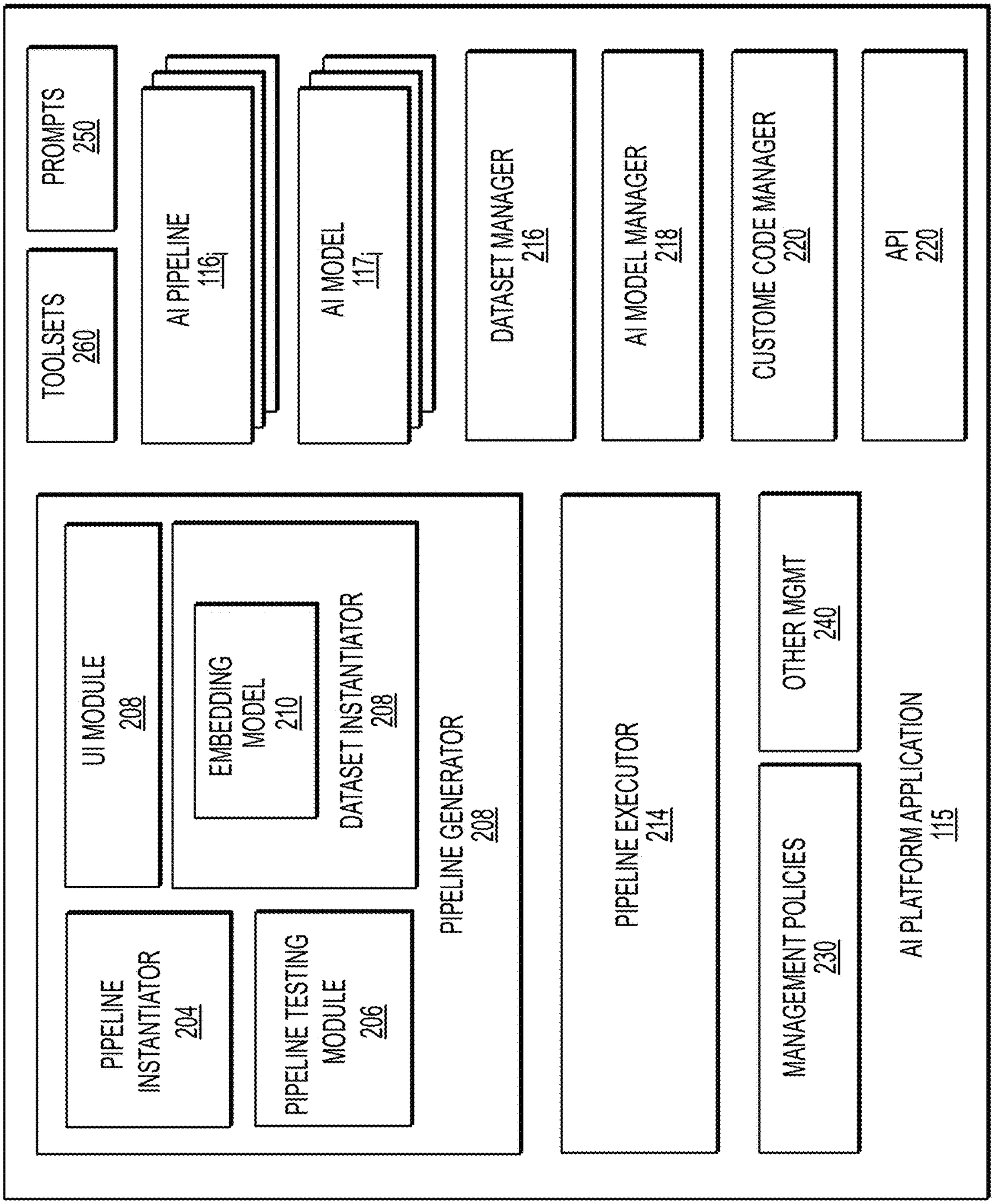
FIG. 2 is a more detailed illustration of the artificial intelligence (AI) platform application of FIG. 1, according to various embodiments.

FIG. 2 is a more detailed illustration of the AI platform application 115 of FIG. 1, according to various embodiments. As shown, the AI platform application 115 includes a agent generator module 202, an agent executor module 214, the AI agents 116, the AI models 117, a dataset manager 216, an AI model manager 218, a custom code manager 220, and an application programming interface (API) 222.

The agent generator 202 includes an agent instantiator module 204, an agent testing module 206, a user interface (UI) module 208, and a dataset instantiator module 212. In operation, the UI module 208 generates one or more UIs that permit a user, such as an information technology (IT) administrator, to define AI agents that each include one or more objects having associated parameters, as well as relationships between the object(s). In some embodiments, each AI agent can include a directed graph that includes multiple objects and indicates how the outputs of one or more objects are input into, or otherwise depend on, other object(s). Given user input defining objects (including parameters thereof) and/or AI agents of objects, the agent instantiator 204 instantiates the objects and/or agents, such as by adding the objects and/or agents to a database and/or generating program code for the objects and/or agents, as discussed in greater detail below in conjunction with FIGS. 8-10. In some embodiments, one particular type of object is a dataset object that defines a dataset from which chunks of text that are relevant to input can be retrieved for inclusion, along with the input, in the context window of a prompt that is input into an AI model. In such cases, to instantiate a dataset object, the dataset instantiator 212 (1) divides text data from a data source associated with the dataset object into chunks that can be referenced for later use, and (2) processes the chunks using a trained embedding model that generates embeddings of the chunks in a high-dimensional latent space.

Then, the dataset instantiator stores the embeddings of the chunks in the vector database 122 for use in embedding searches, as discussed in greater detail below in conjunction with FIGS. 3 and 9. The agent testing module 206 permits users to test instantiated AI agents against various input data to see what outputs are generated by those AI agents, as discussed in greater detail below in conjunction with FIG. 7. The agent executor 214 executes agents that have been instantiated and tested. For example, the client application 145 could make a call via the API 222 to execute an AI agent, or the AI platform application 115 itself could execute an AI agent.

The platform can also store prompt packages 250 for use in the AI agents. An administrator user (of the platform or tenant of the platform) can create enterprise prompts that end users do not see. The enterprise prompts can be fed into an LLM in a agent to guide the LLM towards results that are usable by the AI apps. This can include ensuring that the results include particular content and exclude other content, and that the results are formatted for use with the AI application. The platform can also track user prompts, which can be prompts created by an end user.

The platform also stores toolsets 260 (also called "tools") for inclusion in the AI agents. Toolsets 260 can include scripts and code for various processing, including pre- and post-processing.

Tools 260 can be ingested through an API to the AI platform. The API Ingestion process can utilize an API definition file in an example. Alternatively, tools can be ingested based on tool documentation or a website. For example, an ingestion agent can ingest the text, identify APIs, determine semantic meaning of the API description, and create a Tool Action in the agent builder. The ingestion agent can also add API calls, add authentication keys, and make the tool available as a dropdown in the UI under the Tool object. In this way, a Third Party Service can be made accessible via the APIs.

Additional compliance rules can include data privacy and security rules. These can ensure that sensitive company data is not shared with AI applications without proper authorization. Data encryption can be enforced on secure communication channels when interacting with AI systems. User access to AI applications 145, 183 can be restricted based on user groups, roles, and permissions.

Prompt policies can prohibit the use of AI applications to generate content that infringes on copyrights, trademarks, or patents. The AI platform can implement content filtering and monitoring mechanisms to detect and prevent the generation of protected intellectual property. The prompt policies can prohibit the generation of harmful, discriminatory, or biased content. The AI platform can enforce management policies against using AI for malicious purposes, such as creating fake news, deepfakes, or engaging in social engineering attacks.

As additional security measures, the AI platform can maintain a centralized repository of approved AI models and datasets for employee use. The AI platform can implement version control and model lineage tracking to ensure the integrity and reproducibility of AI-generated outputs. The platform can also regularly audit and validate AI models for accuracy, fairness, and absence of bias.

Access controls and authentication can be added to the AI platform. The system can implement strong authentication mechanisms, such as multi-factor authentication, for accessing AI applications. The system can also enforce least privilege principles, granting employees access only to the AI features and data necessary for their job functions.

The AI platform can also run logging and monitoring services. This can enable comprehensive logging of AI application usage, including user activities, input prompts, and generated outputs. The AI platform can also perform real-time monitoring and run alerting systems to detect anomalous or suspicious AI usage patterns. An administrative agent can regularly review logs and audit trails to ensure compliance with established policies.

As part of third-party AI application management, a vetting process can be executed on third-party AI applications before allowing their use within the organization. In general, this can include assessing the security, privacy, and compliance posture of external AI providers to ensure they align with the organization's standards.

Figure 3:
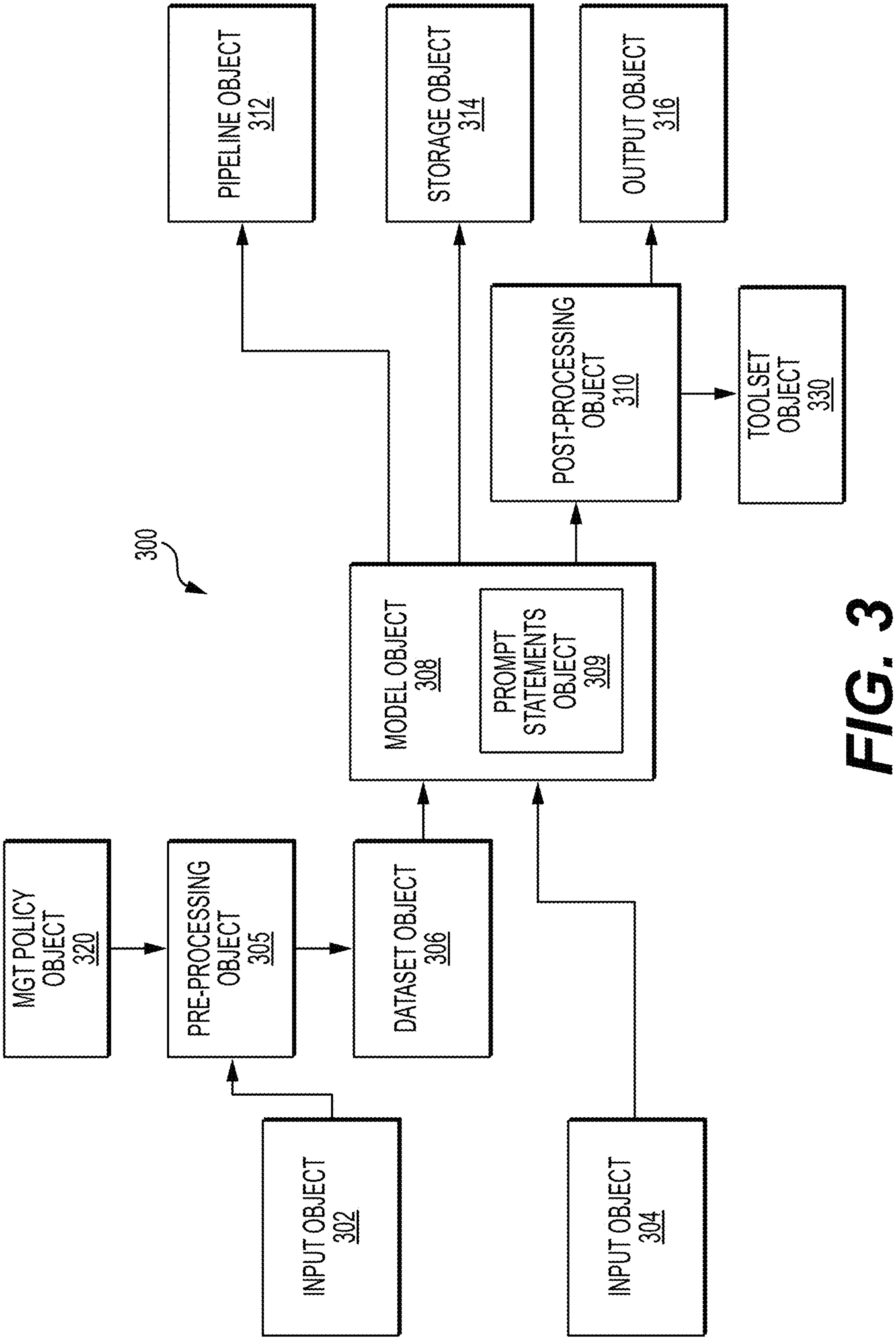
FIG. 3 illustrates an exemplar AI agent, according to various embodiments.

FIG. 3 illustrates an exemplary AI agent 300, according to various embodiments. The AI agent 300 can display on a UI of an administrator console, and each agent object can be placed in the UI to create the AI agent 300. As shown, the AI agent 300 includes two input objects 302 and 304, a preprocessing object 305, a dataset object 306, a model object 308, a prompt statements object 309, a post-processing object 310, an agent object 312, a storage object 314, an output object 316, a management policy object 320, and a toolset object 330. Further, the AI agent 300 indicates the relationships between objects 302, 304, 306, 308, 309, 310, 312, 314, and 316.

The system can cause display of the UI by sending code from a server to a user device, which renders in a browser. In another example, the server sends code to a different client application, causing the UI to display in the client application.

The input objects 302 and 304 define inputs into the AI agent 300. In some embodiments, each of the input objects 302 and 304 can define a user input or stored data to be retrieved as input. For example, the user input could be a question entered by a user into a UI provided by the AI platform application 115 or the AI application 145. As another example, the stored data could include a profile, or a summarization of previous conversations with an AI model by the same user that is retrieved from a database. Both input objects 302, 304 can be defined to receive a particular type of content or information from the AI application 145.

A preprocessing object 305 can include code that examines or modifies the content of input object 302 as a prerequisite to further stages in the AI agent. For example, the preprocessing object 305 can check for malicious code, such as embedded prompts, queries that attempt to reveal system prompts, and other attempts to harm the system or circumvent controls. The pre-processing can also format the input for use within further stages of the AI agent. For example, images in an email signature line can be stripped out before the email content is passed to an embedding model for vectorization.

As another example, the preprocessing object 305 can be used for redacting PII before it is sent to a generative model, such as an LLM. The recognized PII can be replaced with encrypted information, and a decryption mechanism, such as a key, hash, password or other information, can be supplied by the AI agent 143 to the AI platform. The decryption mechanism can be stored separately from the content with the removed PII, in an example. The decryption mechanism can allow the user or other authorized users to decrypt and reinsert the PII at a later time.

In another example, a management policy object 320 can be used to apply management policies to the pre-processing object 305 or other objects in the AI agent 300. The management policy can allow an administrator to define conditions that are user specific and based on compliance. For example, a user or application might only be able to access a dataset from within an AI application on a compliant device, when the user is located within a whitelisted geography or outside of a blacklisted geography.

The management policies can be stored on a server and can relate to a user, device, model object, prompt object, dataset object, toolset object, and endpoint. For example, user policies can be specific to a user or a group of users. Device policies can apply to specific devices or device types. Model policies can govern use of particular AI models. Prompt policies can govern which prompts must be included and which ones are disallowed. Dataset policies can control which datasets or portions of those datasets are available for use in the AI agent. Toolset policies can govern what code and software is executable as part of an AI agent. And endpoint policies can generally govern access and execution of the AI agent itself.

Management policies related to the AI agent itself can limit model types that are available for use. For example, an AI agent policy can disallow public model inference endpoints such as OPENAI or ANTHROPIC. An AI agent policy can require only platform-hosted models, only on-prem hosted models, or only specific model files that have been validated for security. The policy can be applied to the entire agent or just specific console users, specific dataset objects, and the like. In one example, a model policy can be applied that allows only models below a configured cost per token to be used in the AI agent. Cost per token for different models can be configured in a fixed configuration or pulled dynamically from the model provider(s).

In the AI agent 300, the preprocessing object 305 can include a management policy check based on management policy object 320. If the user and device comply with the management policy check, then the dataset object can be accessed. If not, then information from the dataset object 306 is not fed to the model object 308.

Another management scenario arises when a UI administrative user has access to a dataset for purposes of adding the dataset to an AI agent but does not have access to some or all of the content of the dataset. In this case, permissions can be validated at agent runtime to ensure that whatever content from the dataset is needed by the model(s) is in fact accessible to the end user executing the AI agent.

The dataset object 306 defines a dataset from which chunks of text that are relevant to input from the input output 302 can be retrieved for inclusion, along with outputs of the input object 302 and the input object 304, in the context window of a prompt that is input into an AI model defined by the model object 308. In some embodiments, the dataset is generated by (1) dividing text data (e.g., text from documents) in a data source into chunks of a predefined length (e.g., a predefined number of tokens), and (2) processing the chunks using a trained embedding model that generates embeddings of the chunks in a high-dimensional latent space. For example, in some embodiments, each of the embeddings can be a vector of numbers that represents the semantic meaning of a corresponding chunk of text data. Once generated, the embeddings can be stored in, e.g., the vector database 122 and used to perform embedding searches that identify chunks of text data that are relevant to one or more inputs. The chunks of text can then be included in the context window of a prompt to an AI model with an instruction for the AI model to, for example, only answer based on the relevant chunks. As another example, the relevant chunks can be included as few-shot examples in a prompt. In some embodiments, the dataset object 306 can specify (1) one or more data sources, (2) a chunk size, (3) one or more embedding models used to generate embeddings from chunks, (4) a similarity metric used in embedding searches to compare embeddings of inputs with the embeddings generated from chunks, and (5) a similarity threshold for selecting a number of chunks and/or a maximum a number of chunks to include in the context window of a prompt. In some embodiments, the dataset object 306 can also specify a schedule for generating embeddings of chunks of source data so that the embeddings are updated if the source data changes. Although described herein primarily with respect to generating embedding using a single selected embedding model, in some embodiments, any number of embeddings can be generated for each dataset using any number of embedding models specified in a dataset object.

In one example, the chunks are not a predefined length. For example, the chunks can be sentence-based. In that approach, chunking uses a sentence-segmentation technique, such that individual sentences are treated as chunks, regardless of their length or punctuation. Chunks with this technique can be of variable length.

Chunking can also be done using semantic understanding. In this technique, text can be sent to a LLM, with prompt instructions to split it into individual chunks that best capture meaning. Based on how the prompt instruction are given, chunks with this technique can be fixed or variable length.

The model object 308 defines an AI model (e.g., one of the models 117, 148, or 160) to use. Any technically feasible AI model can be specified by the AI model 308 in some embodiments. For example, an artificial neural network, such as a language model (e.g., a large or small language model), a generative pre-trained transformer (GPT) model, a multi-modal model, a visual language model, and/or the like can be specified in some embodiments. The AI model can also be trained from scratch or a fine-tuned version of a previously trained model. Further, the specified AI model can execute locally on the same computing device or remotely, such as in a datacenter or cloud computing environment. In addition, in some embodiments, the model object 308 can abstract away the conversion and/or normalization of data into a format that is suitable for input into the AI model, so that a user does not need to The prompt statements object 309 defines zero or more statements to include in the context window of prompts that are input into the AI model of the model object 308. Any suitable user-specified or predefined statement(s) can be included in some embodiments. For example, the following statement could be used to instruct the AI model to generate an answer only using information from the chunks of data generated by execution of the dataset object 306, and to cite a reference and document name used to generate the answer: "You are a helpful assistant. Above is some helpful context. Answer the question, and only use the information above. Cite the exact reference and document name you used to answer." Such a statement could be entered by a user or selected by the user from a predefined list of statements. As another example, the following statement could be used to instruct the AI model to not mention product X when answering a question: "When answering the question, do not mention product X in your answer." As a further example, one or more statements can be used to specify one or more tools, such as publicly available tools (e.g., tools for checking the weather, retrieving or sending data, etc.) that are accessible via application programming interfaces (APIs), that the AI model can use and how to access such tools. As yet another example, a statement can instruct the AI model to respond that it cannot answer a question if no chunks of relevant text included in a prompt to the AI model.

The post-processing object 310 defines post processing to be performed on an output of the AI model defined in the model object 308. Any technically feasible post processing can be performed in some embodiments. For example, the post-processing could include redacting an answer generated by the AI model using another AI model or custom program code to remove sensitive and/or undesirable information. As another example, the post-processing could include transforming the answer generated by the AI model from one format to another format.

Post-processing can also include moderation. For example, code can check that the answer is within acceptable formatting, limits, and subject matter relevance. The moderation can also check for issues, such as prompt leakage.

Post-processing can also unredact previously redacted portions of a dataset or other data if the user has the required privileges to do so. If redaction is carried out by the pre-processing step, the post-processing step can support unredaction of the content back to the original fields. In one example, if the redacted information belongs to the user, then the post-processing can unredact that information. Similarly, a user having access to redacted information can cause the post-processing object 310 to unredact the information. In an example where the user has the requisite access criteria, a stored mechanism for unredaction, such as a key, can be retrieved based on a content identifier or chunk metadata associated with the content. The unredaction mechanism can then be applied against redacted information to decrypt it.

The Agent objects 312 defines another agent that takes as input an output of the AI model defined by the model object 308. Any suitable other agent can be specified by the Agent objects 312. For example, the other agent can include (1) an input object that specifies the Agent objects 316 as an input source; and (2) one or more other objects, such as dataset object(s), model object(s), etc., that define how the output of the AI model defined by the model object 308 is processed.

The storage object 314 defines a manner of storing output generated by the AI model of the model object 308. In some embodiments, the storage object 314 can specify any technically feasible storage mechanism. For example, in some embodiments, one type of storage object can define that output of the AI model and other conversation history is stored in memory. As another example, in some embodiments, one type of storage object can define that output of the AI model and other conversation history is summarized in a particular format (e.g., JavaScript Object Notation (JSON) format) by the same or a different AI model, and the summary is stored in a database. In such cases, an input object (input object 302 or 304) of the AI agent 300 or another AI agent can also define that the output of the AI model and the conversation history that is stored in memory or summarized and stored in the database is retrieved for inclusion in the context window of a prompt.

The output object 316 defines how to output the post-processed output generated by executing the post-processing object 310. Any suitable output can be specified by the output object 316 in some embodiments. For example, the output object 316 could specify that the post-processed output is displayed to a user. As another example, the output object 316 could specify that the post-processed output is transmitted to another application for further processing.

Although the AI agent 300 that includes the objects 302, 304, 306, 308, 310, 312, 314, and 316 is shown for illustrative purposes, in some embodiments, a user can define any suitable AI agent that includes one or more input objects, one or more model objects, and zero or more other objects, as well as any suitable relationships between the objects. More generally, in some embodiments, the AI platform application 115 can permit a user to define any suitable objects by specifying parameters thereof, and then add one or more of the objects to AI agents that relate the added objects. Examples of other types of objects include a pre-processing object that defines pre-processing to perform on inputs and/or retrieved chunks of text data from a dataset, a custom code object that defines custom program code to execute, a throttling object that throttles the use of an AI agent by a user so that users cannot abuse the AI agent, a data retention policy object that causes certain data generated by an AI agent to be stored for a certain period of time. For example, the custom program code could be used to perform pre-processing, to perform post-processing, to provide a tool that performs any suitable functionality, and/or the like. In some embodiments, the relationships between objects can also include relationships in which the output of one object is input back into a previous object.

In some embodiments, an AI agent can also define how timeouts and failure scenarios are handled, such as when an AI model does not respond. In some embodiments, an AI agent can also define a schedule (e.g., weekly, daily, etc.) for executing the AI agent, or that the AI agent is executed only via an API call. In some embodiments, an AI agent can also define trying one model (e.g., a low cost model) before another model (e.g., a high cost model).

The Agent objects of FIG. 3 can also be set according to object parameters. The parameters available can vary depending on the administration mode. In one example, a simplified mode provides summaries of parameter object parameter packages that are selectable. An expert or developer mode, meant for developers, can allow an administrator to access a more full compliment of available object parameters. For example, in expert mode, the administrator can see and edit the configuration of different blocks and connections via a text-based interface.

Returning to FIG. 2, the dataset manager 216, the AI model manager 218, and the custom code manager 220 manage dataset objects generated by the dataset instantiator 212, model objects, and custom program code required to execute objects, respectively. For example, in some embodiments, the dataset manager 216 can manage the generation of datasets for dataset objects by the dataset instantiator and storage usage of generated datasets; the AI model manager 218 can manage the generation (e.g., training and/or fine tuning) of AI models for model objects and the execution thereof, and the custom code manager 220 can manage the generation, storage, and execution of custom program code for custom code objects.

Other managers 240 can also execute on the AI app service 115, 180. For example, a prompts manager can manage the generation or editing of prompt packages. A toolsets manager can manage the generation or editing of toolsets, such as scripts and code. An endpoint manager can manage the creation and storage of agent endpoints and keys.

A policy manager (also called the AI management service) can manage the generation or editing of management policies. As discussed at length above, computing device 140 access to an AI-enabled app, AI agents, and agent objects can be driven by management policies and compliance rules. These can depend on device states, device configurations, network configurations, datacenter management policies, agent object states, infrastructure states, management groups, and tenancy.

These various states and configurations can be combined to create management policies that are set by the AI management service. As a result of an administrator creating a configuration profile specifying particular settings/values that must be implemented, the AI management service can monitor the various states and configurations to ensure that the management policies are met. The monitoring can determine a user's authorization to execute or access AI-enabled applications, AI agents, and Agent objects.

The AI management service can monitor agent object states. These monitored states can be data ingestion states, model development and training states, model evaluation and testing states, model deployment and serving states, model monitoring and maintenance states, infrastructure states, and agent and workflow states.

The AI agent executor 214 orchestrates the execution of AI agents. In some embodiments, the AI agent executor 214 can orchestrate the execution of each object of an AI agent according to the relationships between the objects. In such cases, execution of the AI agent can proceed from input object(s) to object(s) that take as input the output of the input object(s), and so forth, until all objects of the AI agent have been executed.

The API 222 exposes functions that can be called by other software, such as the client application 145, to interact with AI platform application 115. For example, in some embodiments, the functions can include functions for defining objects and AI agents, functions for testing AI agents, functions for executing AI agents subsequent to testing, and/or the like.

Compliance rules can encompass configurable criteria that must be met for a client device to be considered "in compliance" with the AI agent management service. These rules can be determined based on various factors such as the geographical location of the client device, its activation and management enrollment status, authentication data (including data obtained by a device management system), time, date, and network properties, among others. User profiles associated with specific users can also influence the compliance rules. User profiles are identified through authentication data linked to the client device and can be associated with compliance rules that take into account time, date, geographical location, and network properties detected by the device. Furthermore, user profiles can be connected to user groups, and compliance rules can be established based on these group associations.

Compliance rules set predefined constraints that must be satisfied for the AI agent management service or other applications to allow access to enterprise data or other features of the client device. In certain cases, the AI agent management service interacts with a management application, migration application, or other client application running on the device to identify states that violate one or more compliance rules. These non-compliant states can include the detection of viruses or malware on the device, the installation or execution of blacklisted client applications, or the device being "rooted" or "jailbroken," which grants root access to the user. Other problematic states can involve the presence of specific files, suspicious device configurations, vulnerable versions of client applications, or other security risks. Sometimes, the migration service provides the compliance rules, which are based on the rules of the previous management service. Alternatively, the compliance rules can be directly configured in the AI agent management service by an administrator.

Figure 4:
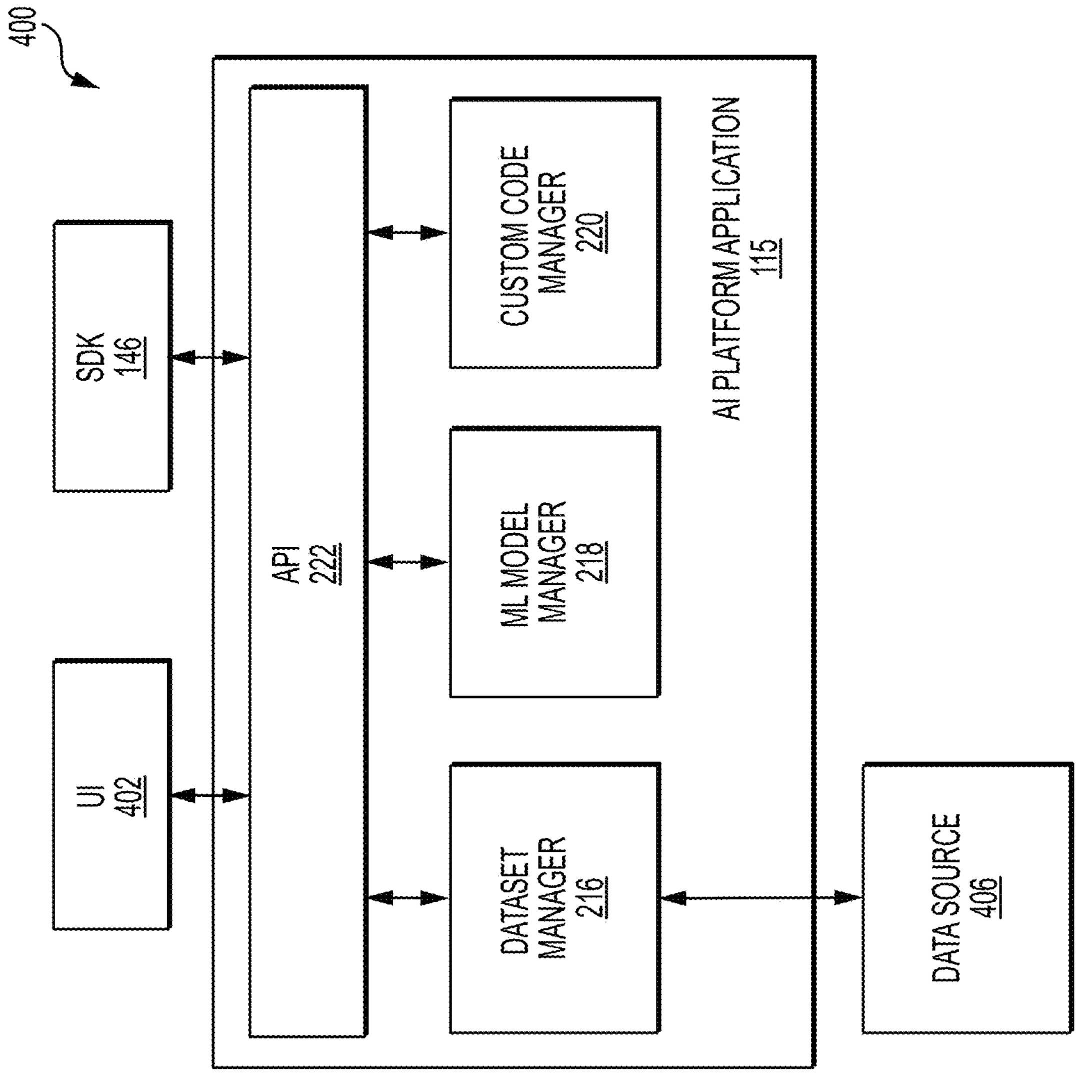
FIG. 4 illustrates exemplar interactions with the AI platform application of FIG. 1, according to various embodiments.

FIG. 4 illustrates exemplary interactions with the AI platform application 115 of FIG. 1, according to various embodiments. As shown, a UI 402 and the software development kit (SDK) 146 of the client application 145 communicate with the API 222 of the AI platform application 115. Further, the API 222 is in communication with the dataset manager 216, the AI model manager 218, and the custom code manager 220. In addition, the dataset manager 216 is in communication with a data source 406. In operation, a user, such as an IT administrator, can use the UI 402 to define an AI agent, including objects thereof and relationships between the objects. User interactions with the UI 402 are translated (by, e.g., a web application or software develop application) to API calls to the API 222, which in turn cause the dataset manager 216, the AI model manager 218, and the custom code manager 220 to, based on the API calls, manage the generation and storage of dataset objects from the data source 406 (and/or other data sources), model objects, and custom code objects, respectively, as described above in conjunction with FIG. 3.

The SDK 146 of the client application 145 permits the client application 145 to make API calls to the API 222 to access AI agents 116 maintained by the AI platform application 115. For example, in response to a user of the client application 145 entering a question into a text field within a UI provided by the client application 145, the client application 145 could use the SDK 146 to make an API call to the API 222 to execute one of the AI agents 116 for processing the question. In some embodiments, the SDK 146 can also include agents and/or AI models that permit local execution of the AI agents and/or AI models, without having to access the API 222.

The UI 402 can present different functions and options based on which mode the administrator selects. In a developer mode, a full complement of parameters can be available. Whereas in a normal mode, a more limited but understandable set of options can be presented that triggers preset packages of parameters for the Agent objects.

Figure 5:
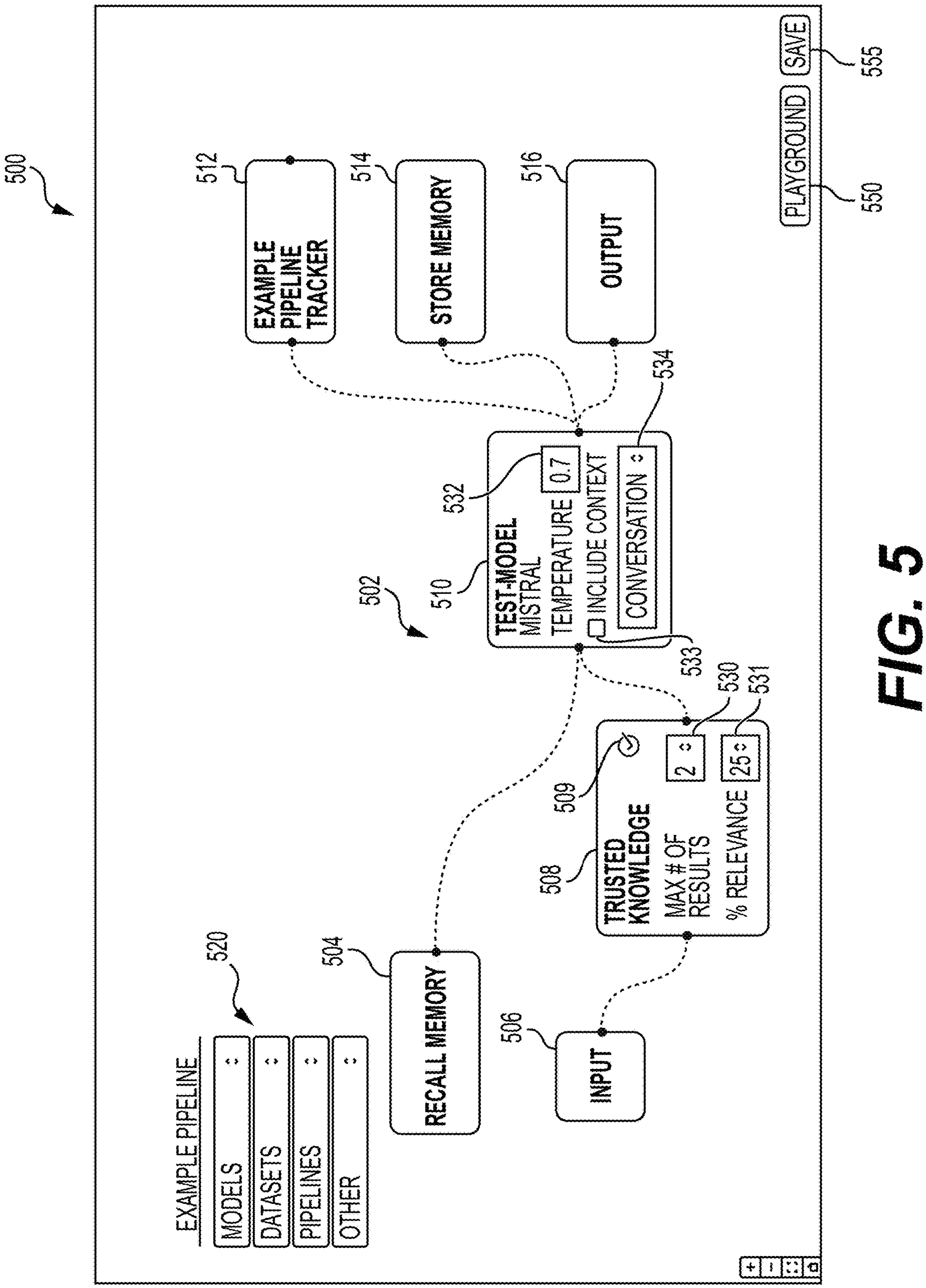
FIG. 5 illustrates how an AI agent can be designed using an exemplar UI, according to various embodiments.

FIG. 5 illustrates how an AI agent can be designed using an exemplar UI, according to various embodiments. As shown, a UI 500 displays a graphical representation of an AI agent 502 named "Example Agent." The graphical representation of the AI agent 502 includes boxes 504, 506, 508, 510, 512, 514, and 516 representing objects in the AI agent 502 and dashed lines between certain boxes representing relationships between the objects that are represented by the boxes. The UI 500 also includes a menu section 520 that provides menus for a user to select model objects, dataset objects, agents, and/or other objects for inclusion in the API agent 502. Using the menu section 520, a user can drag-and-drop objects from the menus and add relationships (shown as dashed lines) between such objects and one or more other objects to design an AI agent, such as the AI agent 502. The UI 500 also permits a user to move the boxes 504, 506, 508, 510, 512, 514, and 514 within the UI 500, as well as to change the relationships between objects.

Illustratively, the box 504 represents an input object named "Recall Memory" that retrieves a conversation history, and the conversation history is stored in memory by an output object named "Store Memory" that is represented by box 514. The box 506 represents another input object named "Input" that specifies a user input, such as a question entered into a text field within a UI provided by the client application 145.

The box 508 represents a dataset object named "Trusted Knowledge", and the box 508 includes input fields 531 and 530 that can be used to specify (1) a requirement percentage relevance when retrieving text chunks using an embedding search against the dataset, and (2) a maximum number of text chunks to output, respectively. In addition, the box 508 includes a status indicator 509 that can indicate whether the dataset is ready for use, is being instantiated, is being updated, etc. Illustratively, the status indicator 509 shows a green check mark, indicating the dataset is ready for use. Another status indicator, such as a red X, could be used to indicate that the dataset is not ready for use.

The box 510 represents a model object named "jjm-test-model." Illustratively, the box 510 includes an input field 532 that can be used to adjust a temperature parameter used by an AI model of the model object, a checkbox field 532 that can be selected to include data (e.g., a user role that affects how the AI model should response) from a predefined source in the context window of a prompt, and a drop-down selection field 534 that can be used to select a prompt statements object. As shown, a prompt statements object named "conversation" has been selected. Accordingly, statements defined by the "conversation" prompt statements object will be included in the context window of each prompt that is input into the AI model of the AI object represented by the box 510.

The box 512 represents an Agent objects named "Example Agent—Tracker." The Agent objects causes outputs generated by the AI model of the model object represented by the box 510 to be input into another AI agent named "Example Agent—Tracker."

The box 514 represents a storage object named "Store Memory" that causes outputs generated by the AI model of the model object represented by the box 510 to be stored, along with other conversation history from a current conversation, in memory (e.g., memory 114). As described, the input object named "Recall Memory" that is represented by the box 504 can retrieve the conversation history that is stored in memory for further processing via the AI agent 512.

The box 516 represents an output object named "Output" that causes outputs generated by the AI model of the model object represented by the box 510 to be displayed to a user. For example, the AI model output could be displayed via a UI provided by the AI platform application 115 or the client application 145.

To test the AI agent 500, the user can select the Playground option 550. The playground can open a query box such that the user can test different queries and inputs to the AI agent. A separate pane can show the output of the AI agent. In one example, a package of input queries can be fed into the AI agent as part of the playground. This is further discussed in connection with FIG. 7, below.

Changes to the AI agent can be saved by selected the save button 555. The saved agent can then be saved for future retrieval or deployment.

Figure 6:
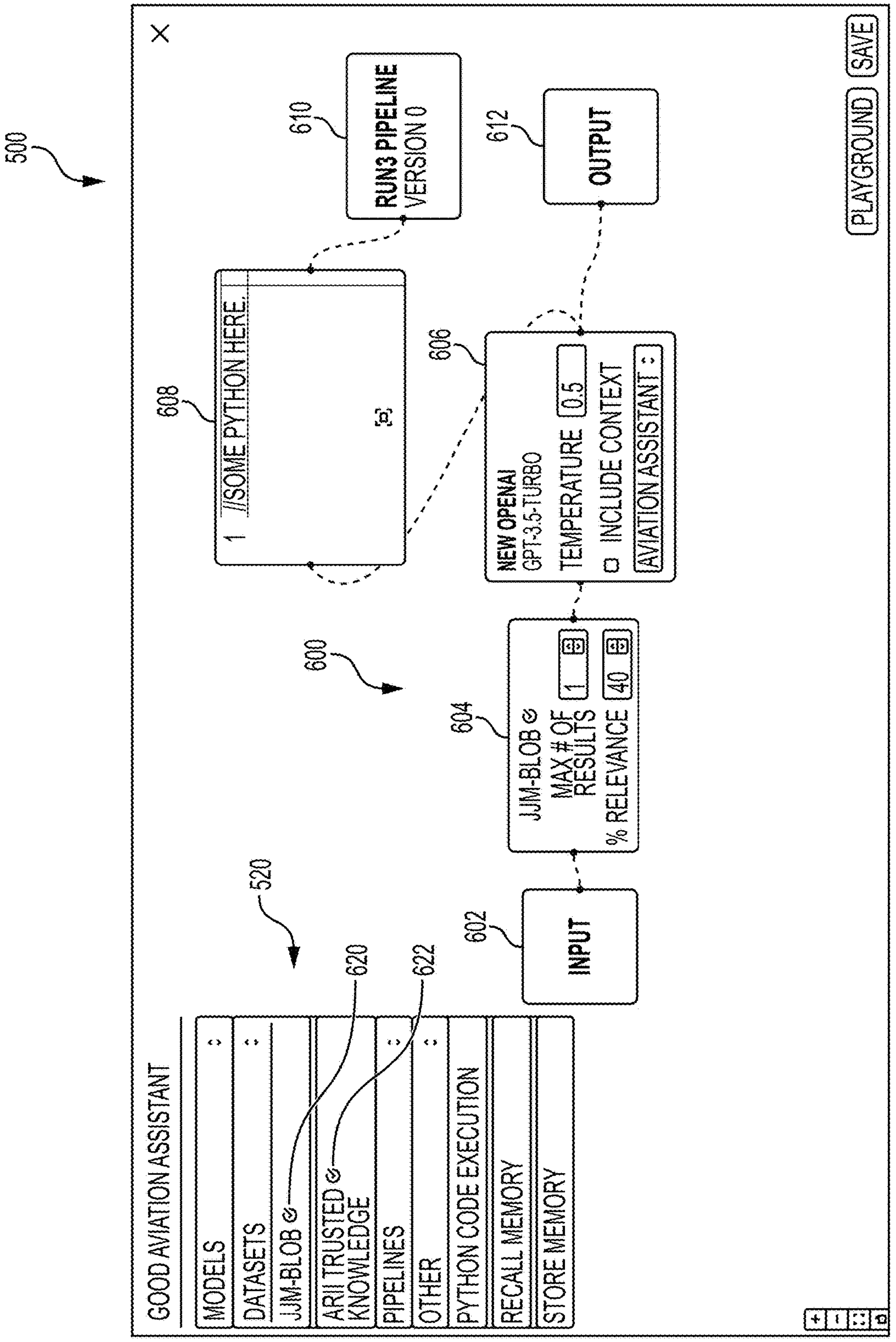
FIG. 6 illustrates how another AI agent can be designed using the exemplar UI of FIG. 5, according to various embodiments.

FIG. 6 illustrates how another AI agent can be designed using the exemplar UI 500 of FIG. 5, according to various embodiments. As shown, a user can select a "Datasets" drop-down menu and an "Other" drop-down menu in the menu section 520 to view available dataset objects and other available objects, respectively. Illustratively, in the "Datasets" drop-down menu, statuses of a "jjm-blob" dataset object and an "Trusted Knowledge" dataset object are indicated using status indicators 620 and 622, shown as checkmarks. By dragging-and-dropping objects from the menu section 520, a user can design an AI agent. For example, to quickly switch from using an outdated AI model to using a new AI model, a user can replace a model object associated with the outdated AI model with a model object associated with the new AI model in an AI agent.

As shown, a UI 600 displays a graphical representation of an AI agent 600 named "Good Aviation Assistant," and the representation of the AI agent 600 includes a box 602 that represents an input object named "Input"; a box 604 that represents a dataset object named "jjm-blob" and permits a user to specify a percentage relevance to use in an embedding search of the dataset and a maximum number of results to output; a box 606 that represents a model object named "New OpenAI" and that permits a user to specify a temperature to use, select to include data from a predefined data source, and select a prompt statements object (shown as a prompt statements object named "Aviation Assistant") to use; a box 610 representing an Agent objects named "Run3 Agent"; a box 612 representing an output object; as well as the relationships between objects. In addition, the graphical representation of the AI agent 600 includes a box 608 that represents a custom code object and permits a user to input program code for the custom code object. The box 600 can be used to enter any suitable custom code, such as code for post-processing of outputs generated by the AI model of the model object 606, code for other tools, and/or the like. In some embodiments, the user can input any desired program code into a custom code object, such as code for redacting certain information from text data, or code to otherwise modify text data.

The Agent objects 604, 606, 608 are connected with dashed lines that visually indicate execution linking. The AI agent 600 begins at input block 602 and follows the visualized execution flow according to the established execution linking.

Figure 7:
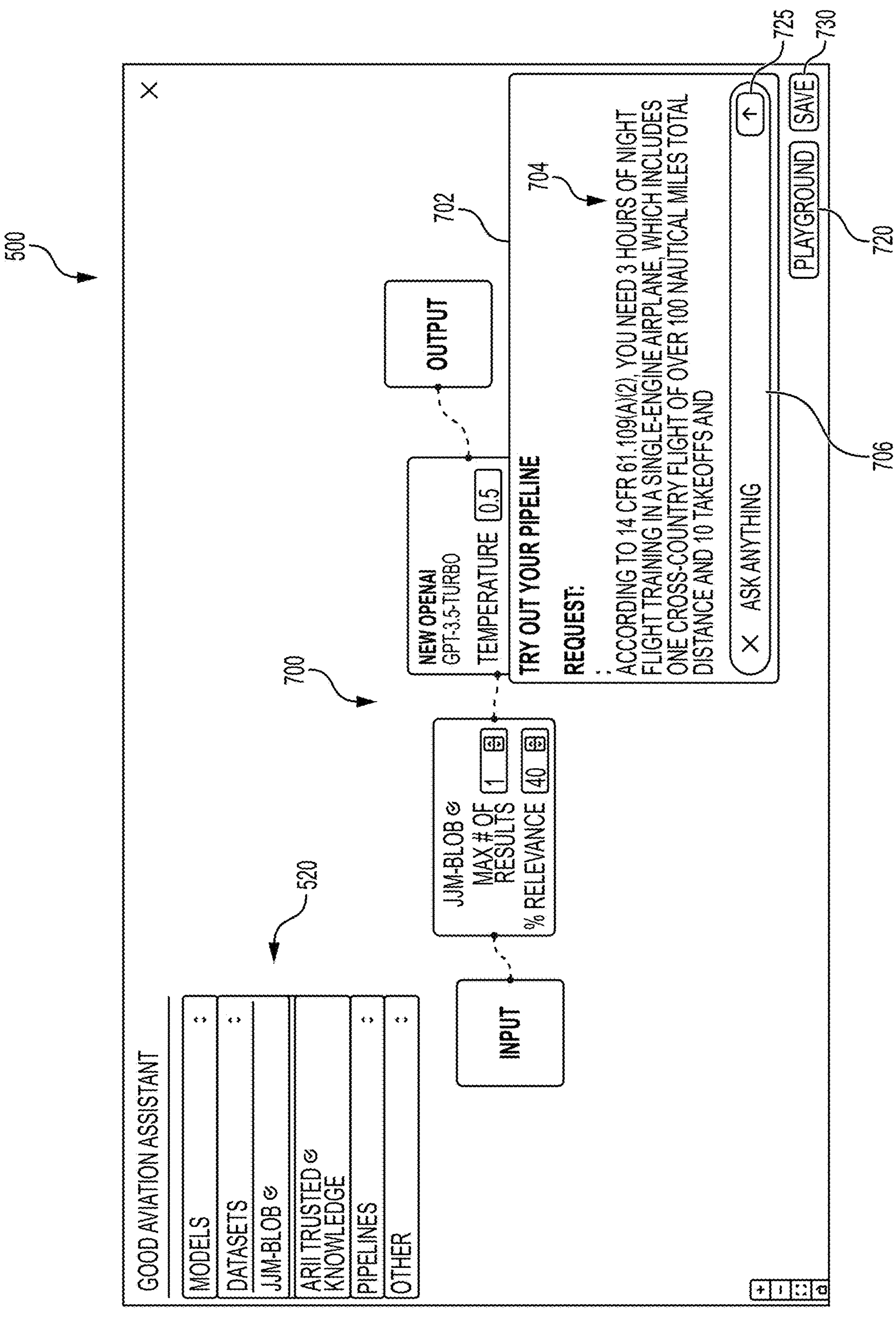
FIG. 7 illustrates testing an AI agent using the exemplar UI of FIG. 5, according to various embodiments.

FIG. 7 illustrates testing an AI agent using the exemplar UI 500 of FIG. 5, according to various embodiments. As shown, using the menu section 520 of the UI 500, a user has designed an AI agent 700 named "Good Aviation Assistant." Illustratively, the UI 500 includes the menu section 520, a representation of the AI agent 700, and an overlay section 702, also referred to herein as the "Playground," that permits a user to test the AI agent 700. In particular, the user can select the playground button 720, and the overlay section 702 is then presented. The overlay section 702 provides an input field 706 that permits a user to enter a question. The user can submit the question by selecting button 725. Given such a question as input, the AI platform application 115 executes the AI agent 700 to generate an answer to the question. Thereafter, the AI platform application displays an output 704 of the AI agent 700 in the overlay section 702. Accordingly, after designing an AI agent, a user can test the AI agent to understand what outputs the AI agent generates.

Although the testing of one AI agent using one user question is shown for illustrative purposes, in some embodiments, the AI platform application 115 can present a UI, referred to herein as a "Battleground," that permits a user to test multiple AI agents on the same and/or different inputs and compare outputs generated by the AI agents. In some embodiments, the AI platform application 115 can also present a UI that permits a user to test an AI agent using multiple different inputs in a batch of inputs (e.g., by computing an average score based on outputs of the multiple inputs) and/or one or more inputs that include various conversation histories (including conversation histories generated by previous use of the AI agent). In some embodiments, the AI platform application 115 can also "step through" objects of an AI agent, executing the objects one by one and displaying the output of each object after execution so that a user can debug the AI agent and objects therein. Battleground functionality can be used to test new models and compare results to previous models. The UI can show differential results in an easy to digest way.

In one example, a semantic comparison of the results is performed by using a comparison agent. The comparison agent can score the semantic similarity of each result in a batch. This can be based on sending both results to an LLM, or by vectorizing the results with an embedding model and comparing the vectors. Comparing the results at each step of a batch of queries can be helpful in determining and visualizing where the semantic difference occurs.

In one example, when a semantic difference occurs, the battleground agent can automatically request an additional prompt that would cause the new model to track the semantic meaning of the outputs from the prior model.

In one example, the battlefield can be performed against a historical batch. The answers of the historical batch can be saved. The same questions from the historical batch can be fed into the current agent. The comparison agent can score the semantic similarity of each result in a batch. This can be useful, for example, in detecting semantic drift for the same model without an obvious update. Such differences can arise, for example, when system prompts at the AI model are changed without the public being aware.

AI agents can run in real time. For example, one to ten test cases can be performed based on live input. Or the AI agent can run batch jobs. For example, the AI platform can run a new background removal model on existing 100K images.

Figure 8:
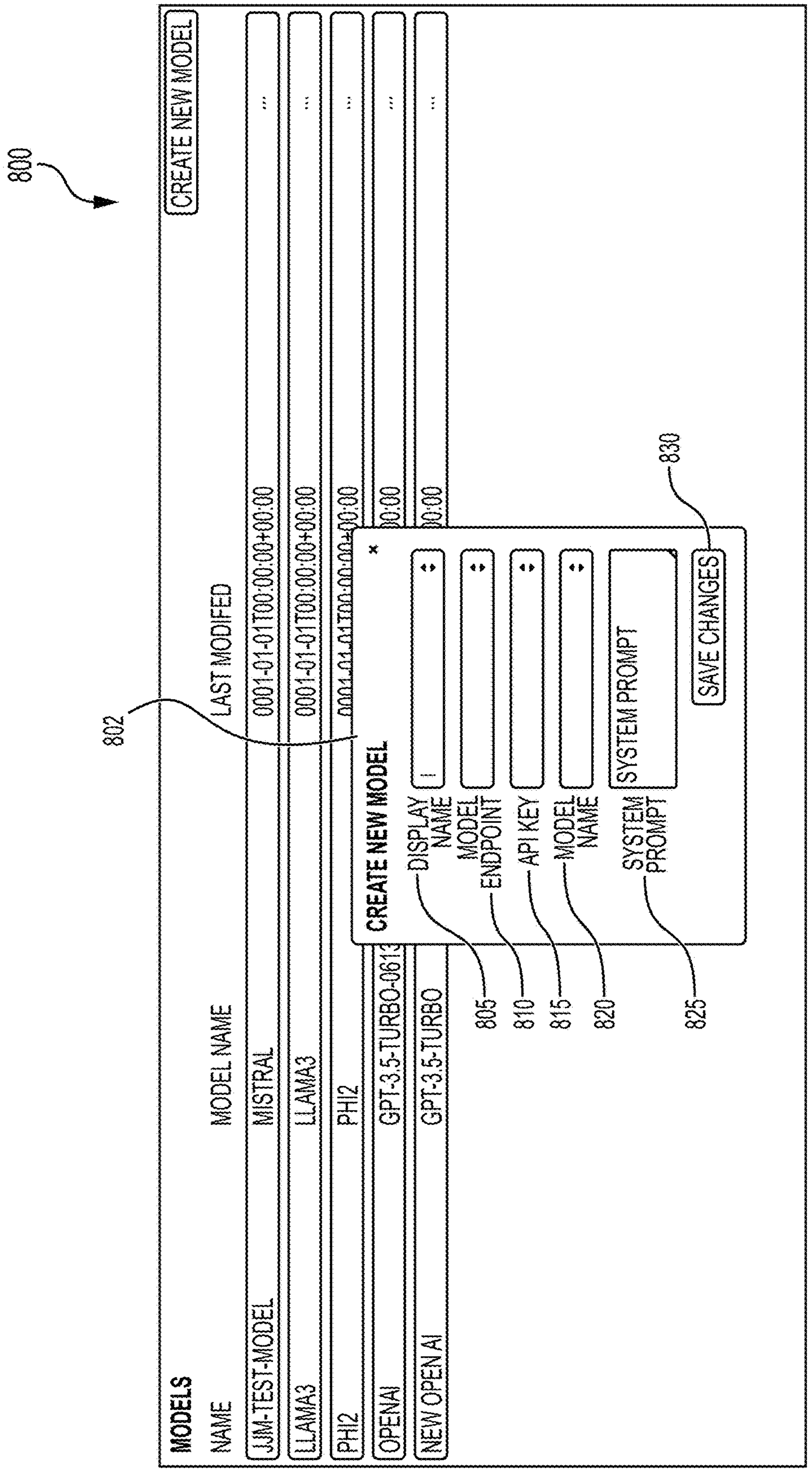
FIG. 8 illustrates an exemplar user interface (UI) for defining a model object.

FIG. 8 illustrates an exemplar UI for defining a model object, according to various embodiments. As shown, a UI 800 includes an overlay section 802 named "Generate New Model" that permits a user to define a new model object. Illustratively, the new model object can be defined by inputting, via the overlay section 802, parameters including a displayed name 805 of the model object, and a model endpoint 810 (e.g., a universal resource locator (URL) of an API endpoint for accessing an AI model, a pointer to a local model, or the like) where an AI model for the model object can be accessed. The AI platform 115 can generate an API key 815*f* for authenticating the AI platform application 115 or other application that calls an API to access the AI model, a name 820 of the AI model, and a system prompt message 825 to include in a context window of each prompt input into the AI model. Given such input parameters, when saved via button 830, the AI platform application 115 generates a new model object. The AI platform application 115 can generate the new model object in any technically feasible manner in some embodiments. For example, in some embodiments, the AI platform application 115 can add, to a database, one or more entries associated with the new model object and including the input parameters. As another example, in some embodiments, the AI platform application 115 can generate code (e.g., using a template and the input parameters) for accessing and utilizing the specified AI model. The generated code can then be executed by the AI platform application 115 and/or deployed to client applications (e.g., client application 145).

Figure 9:
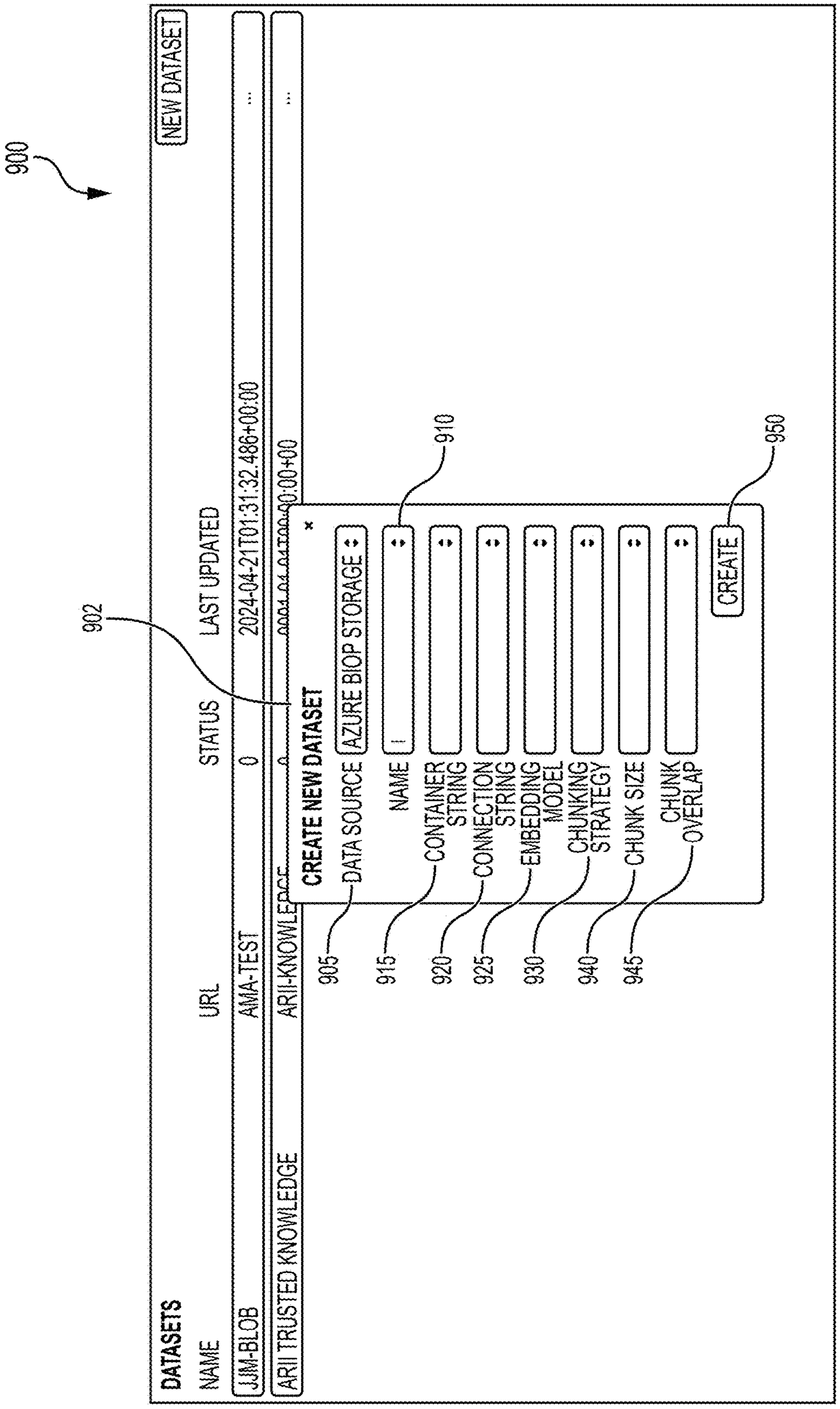
FIG. 9 illustrates an exemplar UI for defining a dataset object.

FIG. 9 illustrates an exemplar UI for defining a dataset object, according to various embodiments. As shown, a UI 900 includes an overlay section 902 that permits a user to define a new dataset object. Illustratively, the new dataset object can be defined by selecting the dataset in the data source field 905. The UI allows for inputting, via the overlay section 902, parameters including a name 910 of the dataset object, a name of a container 915 storing a data source, a connection string 920 for connecting to the container, an embedding model 925 for embedding chunks of text data from the data source. The overlay section 902 an also include a chunking strategy 930 for dividing the text data into chunks, a chunk size 940 specifying the size of each chunk (which can be dynamic), and a chunk overlap 945 specifying by how much chunks overlap. The chunk size can actually be a type, such as "paragraph" or "sentence." This can allow for chunking different datasets according to what will provide the most useful semantic meaning. When the user is done making selections, the user can select button 950 to begin the vectorizing of the dataset.

Given such input parameters, the AI platform application 115 instantiates a new dataset object. The AI platform application 115 can instantiate the new dataset object in any technically feasible manner in some embodiments. For example, in some embodiments, the AI platform application 115 can process text data (e.g., documents) from the data source according to the chunking strategy to divide such text data into chunks having the chunk size and overlapping by the chunk overlap. Then, the AI platform application 115 can use the specified embedding model to generate embeddings of the chunks and store the embeddings in, e.g., the vector database 122 for use in embedding searches. In addition, the AI platform application 115 can add, to a database, one or more entries associated with the new dataset object and including one or more of the parameters, and/or the AI platform application 115 can generate code (e.g., using a template and the input parameters) for performing embedding searches on the generated embeddings. The generated code can then be executed by the AI platform application 115 and/or deployed to client applications (e.g., client application 145).

Figure 10:
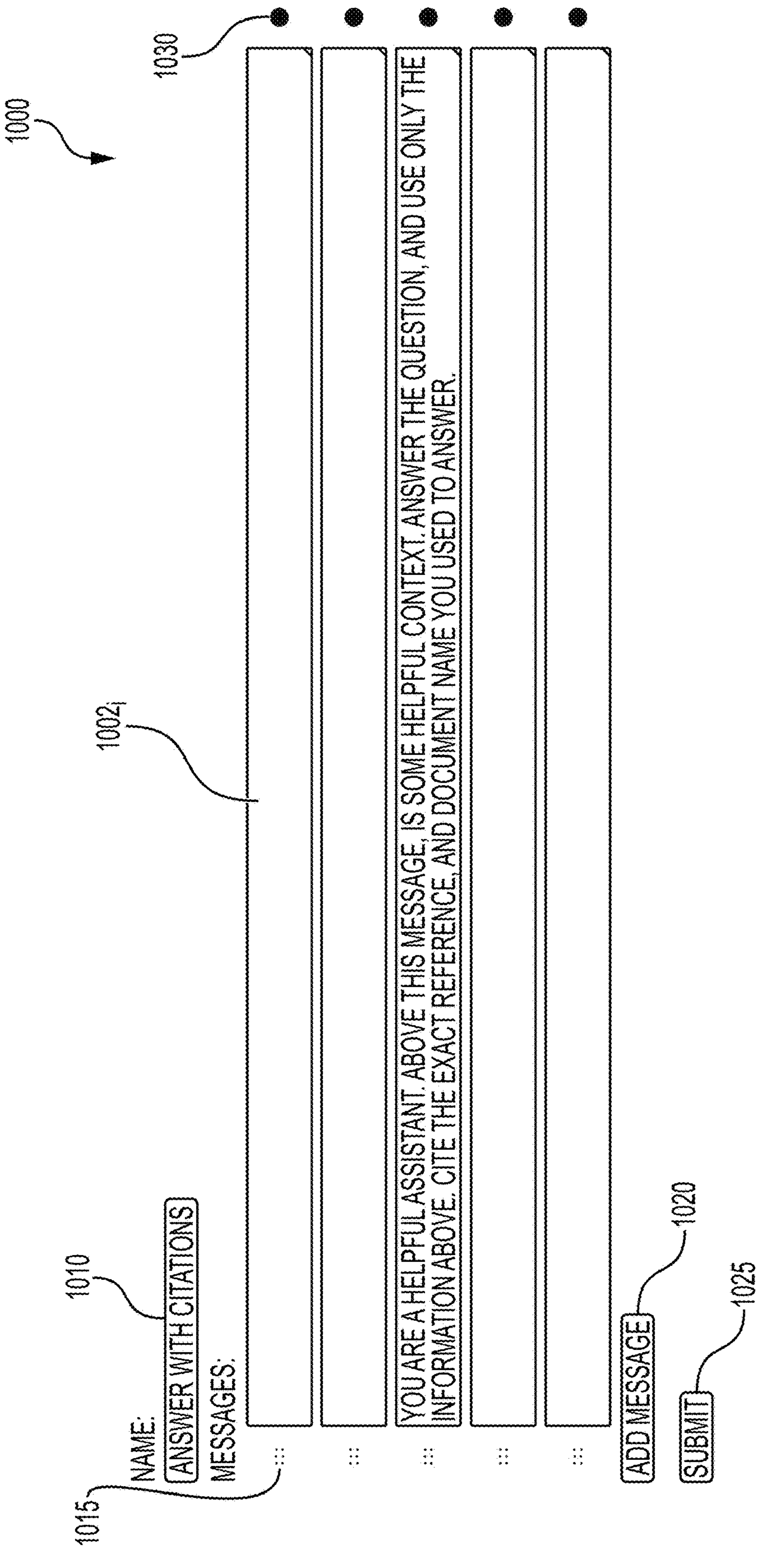
FIG. 10 illustrates an exemplar UI for defining a prompt object, according to various embodiments.

FIG. 10 illustrates an exemplary UI for defining a prompt object (also called a "prompt package" or "prompts"), according to various embodiments. As shown, a UI 1000 permits a user to define a new prompt statements object. Illustratively, the new prompt statements object can be defined by inputting, via input fields 1002 (referred to herein collectively as input fields 1002 and individually as an input field 1002) of the UI 1000, one or more statements to be included in the context window of a prompt that is input into an AI model.

The UI 100 permits the user to add, edit, and/or remove prompt statements. To add a prompt, the user can select the add message button 1020. In this example, the prompt package is named 1010 "answer with citations." When the user is done editing the prompt package, they can select the submit button 1025 to save any changes.

In addition, the UI 100 permits the user to re-order the prompt statements, which can affect the behavior of an AI model. The user can reorder the prompts by dragging row indicator 1015 to a different row. Given the user-input prompt statement(s), the AI platform application 115 can add, to a database, one or more entries associated with the new prompt statements objects and including the prompt statement(s), and/or the AI platform application 115 can generate code for performing generating prompts that include prompt statements. The generated code can then be executed by the AI platform application 115 and/or deployed to client applications (e.g., client application 145).

Figure 11:
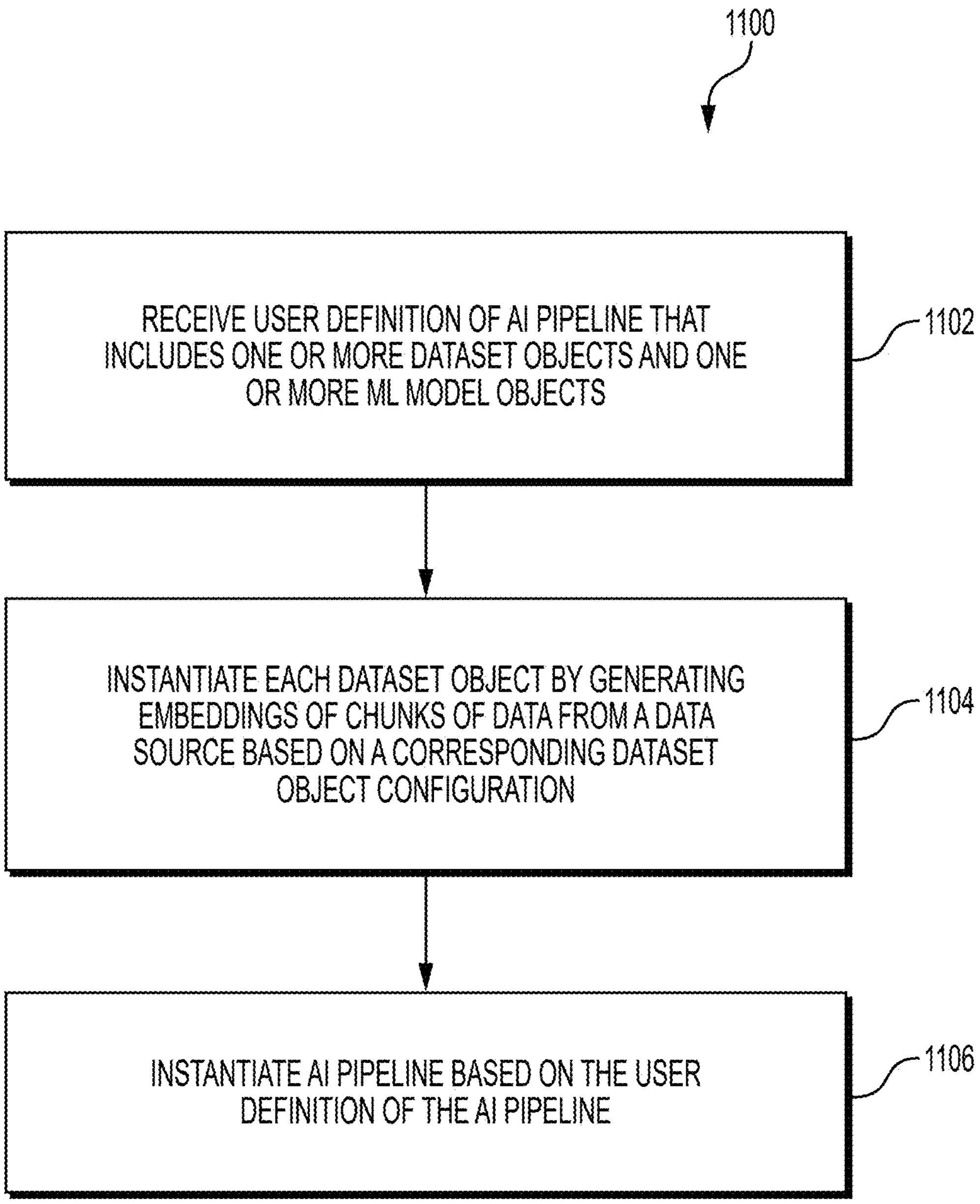
FIG. 11 is a flow diagram of method steps for generating an AI agent, according to various embodiments.

FIG. 11 is a flow diagram of method steps for generating an AI agent, according to various embodiments. Although the method steps are described in conjunction with the systems of FIGS. 1-10, persons skilled in the art will understand that any system configured to perform the method steps in any order falls within the scope of the present embodiments.

As shown, a method 1100 begins at step 1102, where the AI platform application 115 receives a user definition of an AI agent that includes one or more dataset objects and one or more model objects. In some embodiments, the AI platform provides one or more UIs that permit users to (1) define objects by specifying associated parameters, and (2) drag-and-drop and connect such objects to define an AI agent, as described above in conjunction with FIGS. 5-10.

Before allowing a UI connection between objects when building an AI agent, the AI platform can validate that the output of the first block being connected matches the expected input format of the block it is being connected to. If it does not, the AI platform can indicate the format mismatch on the UI and either prevent the connection of the two blocks in the UI or allow the connection but flagged it as an error condition. In one example, the UI suggests an available format conversion code block as an intermediate step between the two blocks. This can be the case when a code object exists for reformatting the output of the first block into a usable format for the second block.

At step 1104, the AI platform application 115 instantiates each of the dataset object(s) by generating embeddings of chunks of data from a data source based on a corresponding dataset object configuration.

At step 1106, the AI platform application 115 instantiates an AI agent based on the user definition of the AI agent. In some embodiments, the AI platform application 115 can instantiate the AI agent in any technically feasible manner, such as generating program code for the AI agent and/or adding one or more entries associated with the AI agent to a database for future use, similar to the description above in conjunction with instantiating objects in FIGS. 8-10.

Figure 12:
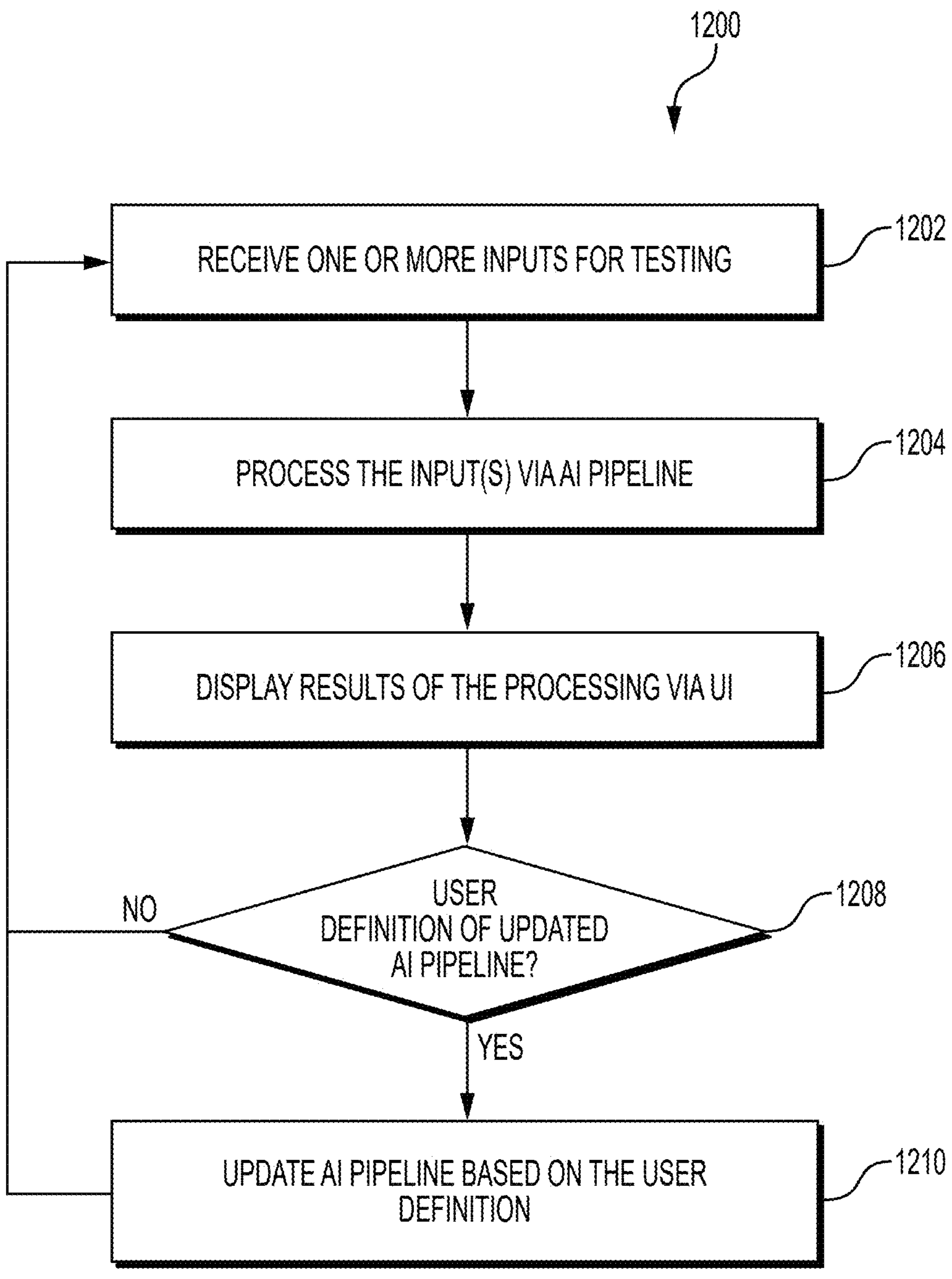
FIG. 12 is a flow diagram of method steps for testing an AI agent, according to various embodiments.

FIG. 12 is a flow diagram of method steps for testing an AI agent, according to various embodiments. Although the method steps are described in conjunction with the systems of FIGS. 1-10, persons skilled in the art will understand that any system configured to perform the method steps in any order falls within the scope of the present embodiments.

As shown, a method 1200 begins at step 1202, where the AI platform application 115 receives one or more inputs for testing an AI agent. In some embodiments, the input(s) can be received via a UI, such as the "Playground" UI described above in conjunction with FIG. 7. In some embodiments, multiple test inputs can be received, such as in a batch. In some embodiments, the inputs can include a conversation history.

At step 1204, the AI platform application 115 processes the input(s) received at step 1202 via the AI agent that is being tested.

At step 1206, the AI platform application 115 causes results of the processing to be displayed via a UI. For example, the AI platform application 115 could display the results of the processing via the "Playground" UI described above in conjunction with FIG. 7.

At step 1208, if the AI platform application 115 receives a user definition of an updated AI agent, then the method 1200 continues to step 1210, where the AI platform application 115 updates the AI agent based on the user definition.

After the AI platform application 115 updates the AI agent, or if the AI platform application 115 does not receive a user definition of an updated AI agent, the method 1200 returns to step 1202, where the AI platform can receive more input(s).

Figure 13:
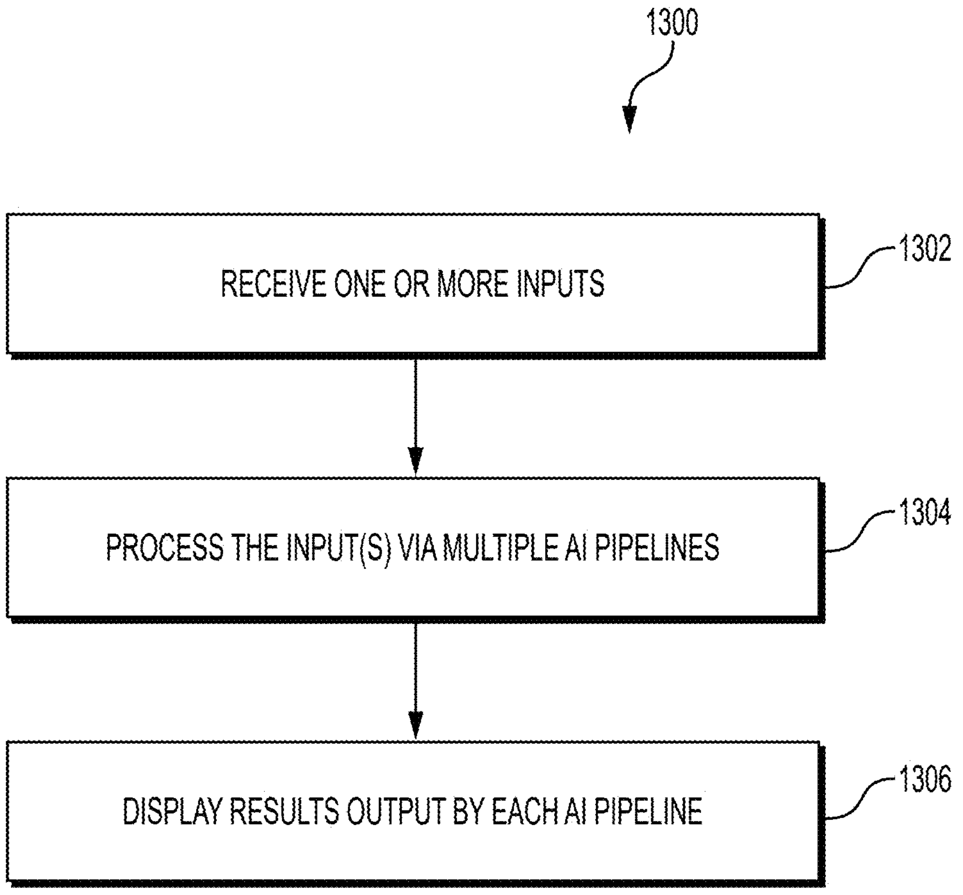
FIG. 13 is a flow diagram of method steps for comparing AI agents, according to various embodiments.

FIG. 13 is a flow diagram of method steps for comparing AI agents, according to various embodiments. Although the method steps are described in conjunction with the systems of FIGS. 1-10, persons skilled in the art will understand that any system configured to perform the method steps in any order falls within the scope of the present embodiments.

As shown, a method 1300 begins at step 1302, where the AI platform application 115 receives one or more inputs. In some embodiments, the input(s) can be received via a UI. In some embodiments, multiple test inputs can be received, such as in a batch. In some embodiments, the inputs can include a conversation history.

At step 1304, the AI platform application 115 processes the input(s) via the multiple AI agents. In some embodiments, the input(s) can be processed in parallel using the multiple AI agents that are being compared.

At step 1306, the AI platform application 115 causes results output by each AI agent to be displayed. Thereafter, a user, such as an IT administrator, can modify the definitions of one or more of the AI agents, select one of the AI agents for use, etc., as appropriate.

Figure 14:
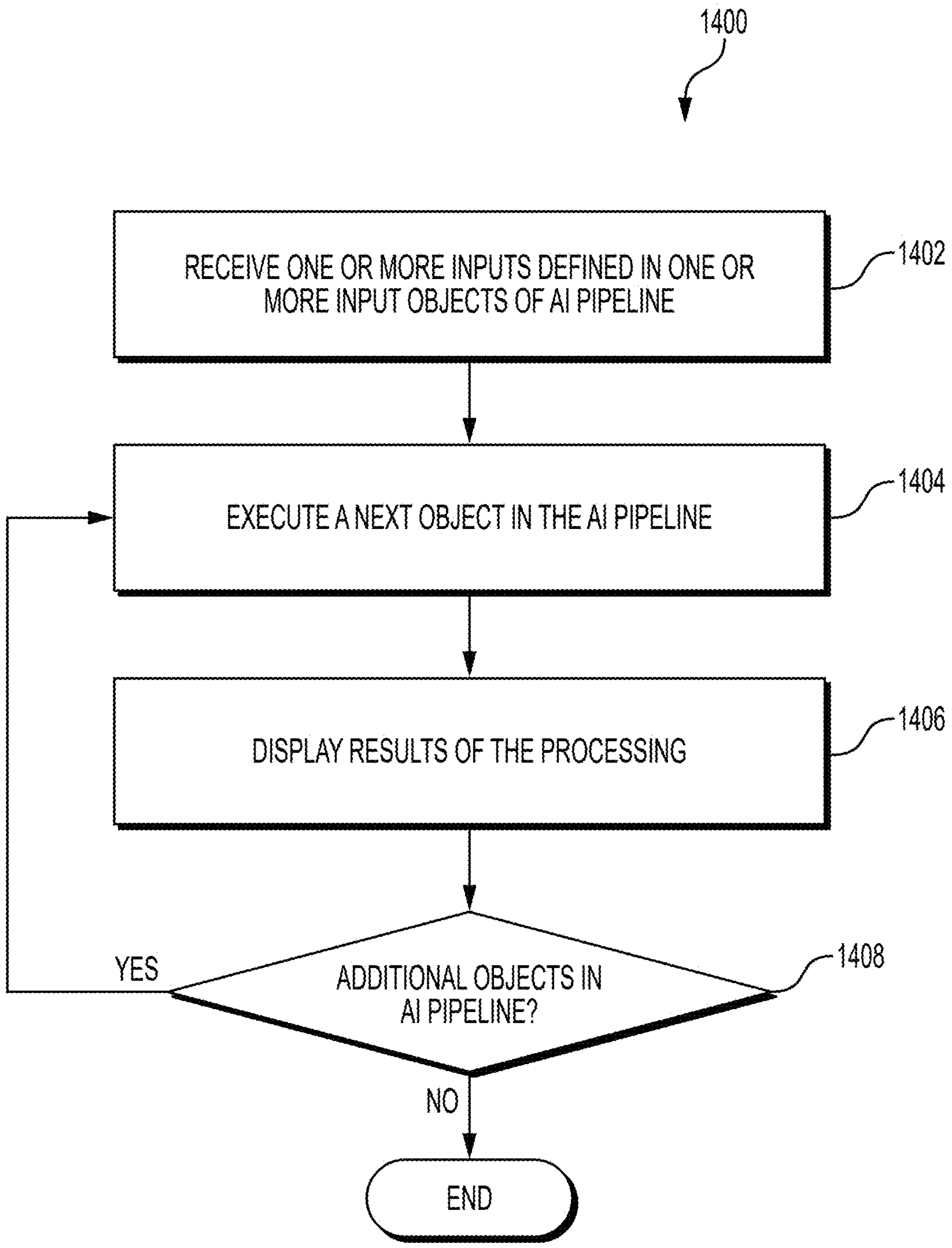
FIG. 14 is a flow diagram of method steps for debugging an AI agent, according to various embodiments.

FIG. 14 is a flow diagram of method steps for debugging an AI agent, according to various embodiments. As shown, a method 1400 begins at step 1402, where the AI platform application 115 receives one or more inputs that are defined in one or more input objects of an AI agent. At step 1404, the AI platform application 115 executes a next object in the AI agent. That is, the AI platform application 115 "steps through" objects of the AI agent and executes the objects one by one. At step 1406, the AI platform application 115 causes results of the execution at step 1404 to be displayed to a user.

At step 1408, if there are no additional objects in the AI agent, then the method 1400 ends. On the other hand, if there are additional objects in the AI agent, then the method 1400 returns to step 1404.

Figure 15:
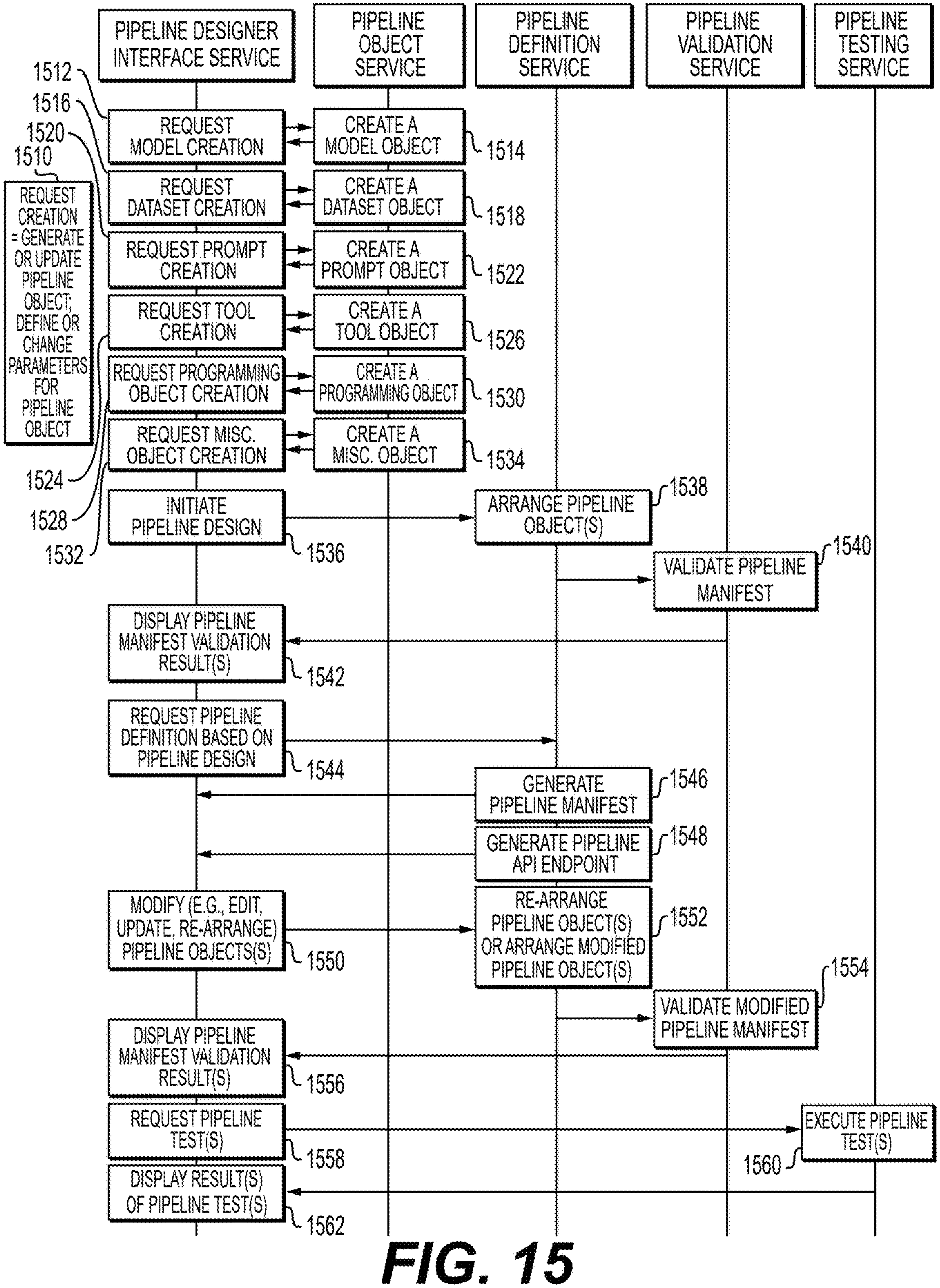
FIG. 15 is a sequence diagram of method steps for designing an AI agent, according to various embodiments.

FIG. 15 is a sequence diagram of method steps for designing an AI agent, according to various embodiments. Various services are displayed at the top. These services can execute on a server device 110, 170 or on a computing device 140. A series of stages 150 are performed as part of a request to update agent objects. The edit could be any change to parameters of the Agent objects or the AI agent itself.

At stage 1512, the AI agent designer interface service can receive a request for model creation. This can mean dragging a model icon into the UI, in an example. In another example, the model is created using a UI interface such as in FIG. 8. Various parameters discussed in connection with FIG. 8, such as display name and model name can be part of the model creation request. The request can also include things like dependencies and management policies that the administrator applies to the model. Using the UI, the user can define which dependencies and management policies apply.

In response to the request, an Agent objects service can create the model object at stage 1514. This can include ensuring that the user and device are compliant with the management policies and have permission to create the model object. At stage 1516, the AI agent designer interface service can receive a request for dataset creation. The request can be based on the UI discussed in FIG. 9. Alternatively, a dataset can be dragged onto the UI from a dropdown menu of potential datasets, in an example. In response to the request, an Agent objects service can create the dataset object at stage 1518. This can include ensuring that the user and device are compliant with the management policies and have permission to create the dataset object.

At stage 1520, the AI agent designer interface service can receive a request for prompt creation. The request can be based on the UI discussed in FIG. 10. Prompt packages can have a maximum number of prompts that can be dictated based on user profile attributes, in an example. Alternatively, the maximum number of prompts can be based on current allowable query sizes for AI models being utilized by the AI agent.

In response to the request, an Agent objects service can create the prompt object at stage 1522. This can include ensuring that the user and device are compliant with the management policies and have permission to create the prompt object.

At stage 1524, the AI agent designer interface service can receive a request for tool creation. The tool can be a third-party tool that is ingested by the AI platform through an ingestion agent. The ingestion can include creating code for interacting with an API of the tool in an example. Any of the various tool parameters discussed herein can be utilized. In response to the request, an Agent objects service can create the tool object at stage 1526. This can include ensuring that the user and device are compliant with the management policies and have permission to create the tool object. At stage 1528, the AI agent designer interface service can receive a request for creating a programming object. The programming object can be code that is uploaded to the AI platform through, such as in an ingestion agent. The ingestion can include creating code for insertion into the AI agent. In response to the request, an Agent objects service can create the tool object at stage 1530. This can include ensuring that the user and device are compliant with the management policies and have permission to create the tool object. A similar process works for onboarding miscellaneous objects. The AI agent designer can define the miscellaneous object at stage 1532, and the Agent objects service can create it at stage 1534.

At stage 1536, the AI agent designer interface service can initiate agent design. This can occur from opening a preexisting agent, selecting an option for a new agent, or saving a new agent.

At stage 1538, the AI agent distribution service can arrange the Agent objects for display at the UI. This can also include creating an AI agent manifest that represents the AI agent and object arrangement. An example agent manifest is shown below:

```
{
  “id”: “6b2daba2-cdab-4ef8-99fc-98c70f70d41c”,
  “name”: “Test dataset agent”,
  “executionName”: “test_dataset_agent”,
  “description”: “ ”,
  “version”: 0,
  “steps”: [
    {
      “stepType”: “inputStep”,
      “stepId”: “589b8d3d-5073-4348-bc62-7a8ac39901ad”,
      “position”: {
        “id”: “a24fc8c1-29a1-421e-9aa1-72116bf3b7b7”,
        “x”: 200,
        “y”: 450,
        “tenantId”: “2ce49ae0-c3ff-421a-91b7-830d0c73b348”,
        “createdAt”: “2024-06-07T22:02:57.085196Z”,
        “updatedAt”: “2024-06-07T22:02:57.085196Z”
      },
      “dependencies”: [ ],
      “agentId”: “6b2daba2-cdab-4ef8-99fc-98c70f70d41c”,
      “tenantId”: “2ce49ae0-c3ff-421a-91b7-830d0c73b348”,
      “createdAt”: “2024-06-07T22:02:57.084561Z”,
      “updatedAt”: “2024-06-07T22:02:57.084561Z”
    },
    {
      “dataSource”: “6ebb6214-de23-4245-9430-77308d28fce5”,
      “topK”: 5,
      “relevanceThreshold”: 50,
      “databaseType”: “pinecone”,
      “pineconeApiKey”: “f8803-4c5d-9a6d-34a4fb543fc7”,
      “pineconeIndexName”: “ ”,
      “stepType”: “dataSearch”,
      “stepId”: “8836c64a-3db7-4d1f-ac5d-be920cba1eca”,
      “position”: {
        “id”: “d050338f-6a10-4e23-98bf-8a2dd46747ac”,
        “x”: 472,
        “y”: 391,
        “tenantId”: “2ce49ae0-c3ff-421a-91b7-830d0c73b348”,
        “createdAt”: “2024-06-07T22:02:57.090006Z”,
        “updatedAt”: “2024-06-07T22:02:57.090006Z”
      },
      “dependencies”: [
        “589b8d3d-5073-4348-bc62-7a8ac39901ad”
      ],
      “agentId”: “6b2daba2-cdab-4ef8-99fc-98c70f70d41c”,
      “tenantId”: “2ce49ae0-c3ff-421a-91b7-830d0c73b348”,
      “createdAt”: “2024-05-23T16:51:18.662126Z”,
      “updatedAt”: “2024-05-23T16:51:18.714447Z”
    },
    {
      “stepType”: “outputStep”,
      “stepId”: “c51e30e9-bcfe-4703-8a77-62863fffe7ce”,
      “position”: {
        “id”: “155e601d-6dd5-48d6-9889-28b44fc91719”,
        “x”: 800,
        “y”: 450,
        “tenantId”: “2ce49ae0-c3ff-421a-91b7-830d0c73b348”,
        “createdAt”: “2024-06-07T22:02:57.08659Z”,
        “updatedAt”: “2024-06-07T22:02:57.08659Z”
      },
      “dependencies”: [
        “8836c64a-3db7-4d1f-ac5d-be920cba1eca”
      ],
      “agentId”: “6b2daba2-cdab-4ef8-99fc-98c70f70d41c”,
      “tenantId”: “2ce49ae0-c3ff-421a-91b7-830d0c73b348”,
      “createdAt”: “2024-06-07T22:02:57.08644Z”,
      “updatedAt”: “2024-06-07T22:02:57.08644Z”
    }
  ],
  “tenantId”: “2ce49ae0-c3ff-421a-91b7-830d0c73b348”,
  “createdAt”: “2024-06-07T22:02:57.079139Z”,
  “updatedAt”: “2024-06-07T22:02:57.079139Z”
}
```

The manifest can be a JSON or other format. In this example, the “id” is a unique identifier to reference the AI agent. “Name” indicates an AI agent name defined by an administrator, in this case “Test dataset agent.” The executionName indicates what the AI agent is called in an execution environment, and can also be defined by an administrator. Additional description and version fields can track additional information about the AI agent Each step can refer to an Agent objects. In this example, the AI agent manifest includes steps for inputStep (an input object), a dataSearch of a dataSource (searching a dataset object), and an outputStep (an output object). Each step can have an identifier such that it can be accessed from a datastore by the AI agent designer or agent engine during agent deployment.

The position of the step can also be stored, with an identifier of the position, and coordinates for placing an icon on the UI to represent the step. The position coordinates can include an X location and a Y location that correspond to placement of the Agent objects within the UI. This can allow for recalling the visual arrangement of the AI agent at a future time. For example, the position coordinates for the data source in the above example manifest are x: 472 and y: 391, which indicate X and Y screen positions within the UI.

The steps in the example manifest also include a dependencies field. This field can contain multiple identifiers, which the AI agent engine and validation service can use to determine which other steps or actions the current step (agent object) must wait on before completion. Zero, one, or multiple dependencies can be assigned to an Agent objects. The AI agent engine can look up the dependencies using the identifiers in the dependencies field.

The dependencies can include conditional events. For example, searching a dataset can be dependent on ingesting the dataset first. However, if a threshold period of time passes before the dataset is ingested, and a prior version of the dataset is already ingested at a date that falls after a recency threshold, then the step can move forward with searching the previously ingested prior version of the dataset.

Another example dependency is as follows. The AI agent engine can check with the ingestion service to get an estimate of how long it will take for the dataset to be ingested. That estimate can be compared against a threshold maximum waiting time, which can be based on a timing parameter for how long the AI agent can take to complete. A synchronous agent will typically have a much shorter time requirement than an asynchronous agent, such as an AI agent that can run at off-peak times in the night. If the estimate is within a percentage, such as 80%, of the maximum waiting time, then the AI agent engine can wait on the ingestion. However, if that time period elapses, the AI agent engine can check again with the ingestion service to determine how much longer the ingestion will take. This can be compared against an additional fallback threshold to determine whether to keep waiting. For example, if the ingestion is nearly complete, such as more than the percentage (e.g., 80%) of time waited so far, then the AI agent engine can continue to wait for the ingestion to complete. Otherwise, the AI agent engine can at that point decide to search the prior version of the dataset. The thresholds in this example can all be configured by an administrator when creating or editing dependency rules.

Nested dependencies such as this can exist for steps other than dataset ingestion as well. Dependencies can relate to current costs and execution times for AI models. For example, in an asynchronous agent, the AI agent engine can check projected costs to use a model at different times within the maximum execution window. These costs can be obtained by a resource agent (also called a "RSRC agent" or "cost agent") that polls the AI services at intervals for current and future cost estimates. The dependency can cause the AI agent engine to wait until a lowest cost time, or until the soonest time when the cost is projected to be below a maximum cost threshold.

As yet another example dependency, if four different LLMs are available for use to perform a single step within an AI agent, the AI agent can check average execution times and costs for the LLMs within a most recent time period. These numbers can be polled and stored by a resource agent running at the platform. A first LLM (selected as preferred) can be used dependent on its cost and execution time being within a threshold closeness to cheaper costs and/or times of the other available LLMs. Otherwise, the cheapest or fastest LLM is selected.

Continuing with the AI agent manifest, each step (agent object) can also include a tenant ID. Multiple tenant IDs are possible. The tenant ID can be used to determine which tenants can access the Agent objects. The platform can be multi-tenant, such that tenant assets can be easily segmented and isolated from other tenants. When a tenant utilizes the platform, they can create their own agents and agent objects that are stored with the corresponding tenant ID. These objects are not accessible by other tenants unless the creator elects to allow such accessibility.

A tenant can be an enterprise customer. Alternatively, the tenant ID can represent a subtenant of the enterprise customer. This can allow the enterprise customer to white label the platform and provide the AI design and administration capabilities to its own customers. These subtenants can be limited to less agent objects than the enterprise customer itself. For example, the enterprise customer can have its own prompt packages, but its subtenants can still create additional prompt packages that are not shared with the other subtenants.

The manifest steps can also include dates that track when the step was created and modified, such as in the createdAt and updatedAt fields.

At stage 1540, the AI agent validation service can validate the AI agent manifest. This can involve ensuring that the manifest, which defines the Agent objects (e.g., steps) of an AI agent, adheres to the required format, contains valid configurations, and meets the predefined standards for successful execution. This can include syntax validation, validation of the manifest format against a schema, and validation that all required parameter fields are in the manifest. Values of the parameter fields can be checked to ensure that they fall within an acceptable range for that parameter. The AI agent can also ensure values match the expected types (e.g., strings, integers, lists).

In addition, the AI agent validation service can ensure all referenced objects (e.g., data sources, processing steps, models) are defined and available to the user or tenant within the AI platform. The AI agent validation can also check for compatibility, including that agent objects (and particularly adjacent objects are compatible with each other (e.g., input/output data formats).

The AI agent validation service can also ensure that all dependencies between objects are properly defined and resolvable. Dependencies can include preprocessing that must occur before a particular object, in an example. Dependencies can be configured according to administrative rules. And then these rules can be referenced when validating the dependencies of the AI agent. Additionally, the AI agent can ensure that the execution order respects dependencies (e.g., a model cannot be trained before the data preprocessing step is completed).

By implementing these validation steps, an AI platform can ensure that the AI agent manifest is correctly defined, properly configured, and ready for execution, minimizing the risk of errors and ensuring smooth operation.

At stage 1542 the designer interface service can display the AI agent manifest validation results in the UI.

At stage 1544 the UI can request an AI agent definition from the AI agent definition service based on the user selecting the AI agent design. This can include sending an AI agent identifier to the AI agent definition service. In response, at stage 1546, the AI agent definition service can generate the AI agent manifest. The AI agent definition service can also generate an AI agent API endpoint at stage 1548. A corresponding URL and key can be sent back to the AI agent designer interface in an example.

The AI agent then displays in the UI. At stage 1150, the user can modify the AI agent. The modification can be an edit, update, or rearrangement of agent objects or parameters. Even dragging one of the Agent objects to a different place on the UI is a modification.

Agent UI builder can suggest blocks, connections, prompts, and other agent objects in real time as autocomplete suggestions. For example, the UI can offer to automatically link a dataset and an LLM when dragging blocks on the UI canvas. Additionally, the UI can offer to use a specific prompt for the selected LLM.

The modifications are sent to the AI agent definition service. At stage 1552, that service can rearrange agent objects or arrange modified agent objects. This can include changing parameters, AI services, and coordinate values in the manifest. At stage 1554, the AI agent validation service validates the modified manifest.

At stage 1556, the AI agent manifest validation results are displayed on the UI.

At stage 1558, a request is made to test the AI agent. This could be as a result of selecting a playground or battlefield button. An AI agent testing service is notified. The AI agent testing service can execute the AI agent at stage 1560. Again, this can be a playground or battleground, both of which have been discussed previously. The results of the tests then display at stage 1562.

Figure 16:
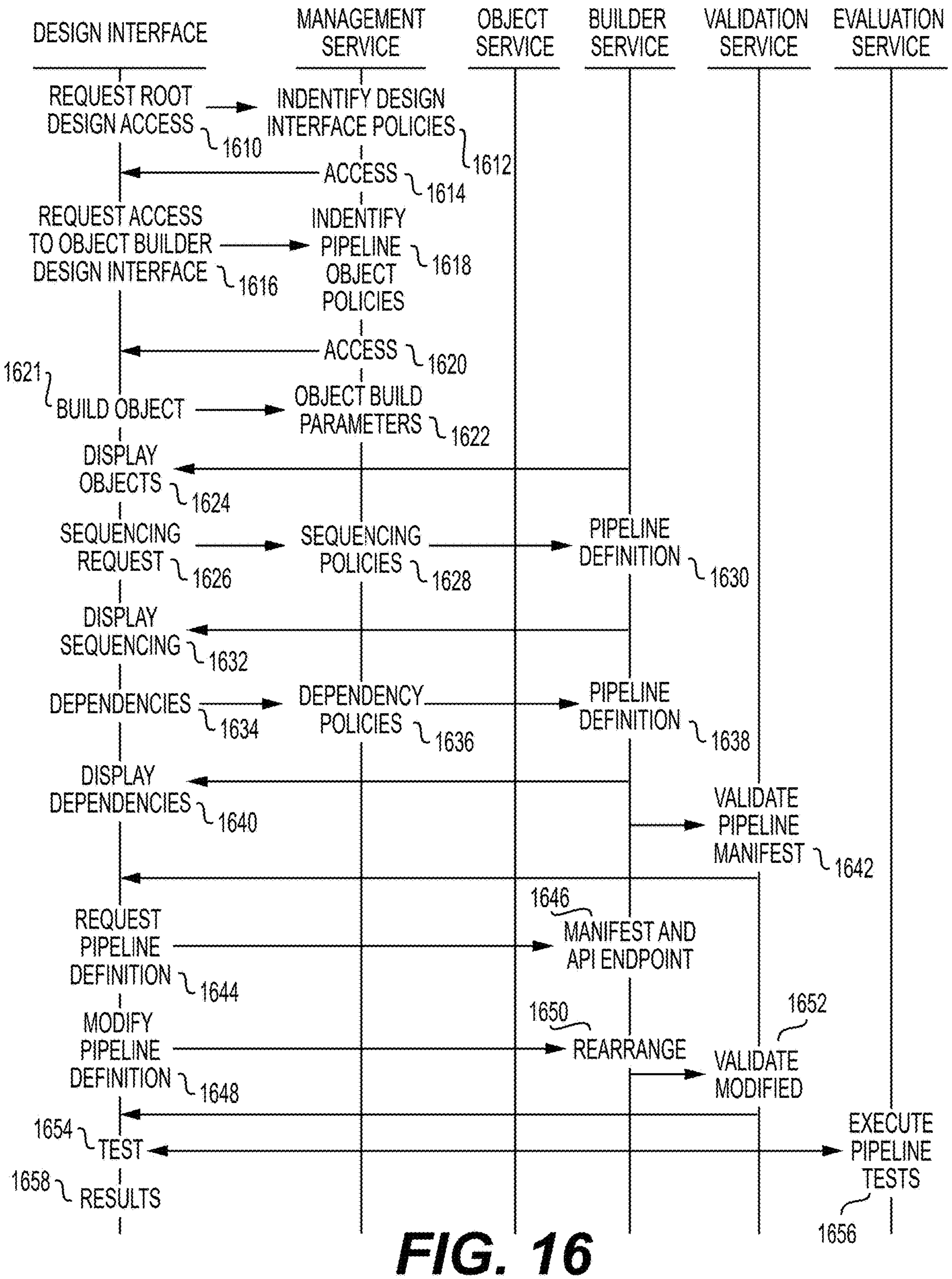
FIG. 16 is a sequence diagram of method steps for designing an AI agent, according to various embodiments.

FIG. 16 is a sequence diagram of method steps for designing an AI agent, according to various embodiments. A UI for designing agents (the design interface), a management service, object service, builder service, validation service, and evaluation service all execute at an AI platform.

At stage 1610, the AI design interface requests root access from a management service. This can include seeking the highest level of permissions within the design UI. This access can grant the administrative user full control over all agent objects, policies, and parameters. The permission can also include access to editing management policies and user permissions, modifying global settings, and accessing all advanced tools and features.

At stage 1612, the management service can identify design interface policies. The management service can identify the relevant management policies based on contextual data, such as the user making the request, the user's role in the enterprise, groups the user belongs to, the tenant, and the user's device configuration and state. Both historical and current device configurations can be considered by the management service. Other compliance information, such as the platform infrastructure configuration and state, network configuration and state, and any other compliance information explained herein can be considered by the management service.

Based on these considerations, the management service can grant varying levels of access at stage 1614. The design interface can then display the access level and execute various security measures. The design interface can authorize a connection to the user's computing device 140. Again, based on the access level, different portions of the design interface may be available to the user.

At stage 1616, the design interface can identify a request to access an object builder design interface. The object builder interface can be used for creating, modifying, updating, or deleting agent objects and parameters. In response, the management service can identify agent object policies associated with the access request at stage 1618. Similar information can be considered as in stage 1614. An Agent objects policy can be used to determine authorized agent object design parameters. The determination can be based on the user's credentials, device configuration, and compliance information.

Varying levels of access can be granted at stage 1620. The UI can then display the access level. The object builder interface allows users to create and configure specific components or objects within the AI platform, such as AI models, AI agents, and preprocessing steps. Users can define the properties, parameters, and relationships of these objects, tailoring them to fit specific requirements and workflows.

At stage 1621, a request to build one or more agent objects can be received at the design interface. The request can be defined by inputs of object parameters in the UI. The request can be based on the upload of a dataset, the integration of a toolset, or any other request to create a new agent object.

At stage 1622, the management service identifies an Agent objects policy associated with the request. The policy can be based on the request itself, the user profile information (e.g., group, role, tenant, etc.), device configuration and state, the device type, platform processing configuration and state, platform storage configuration and state, and network configuration and state.

Based on the identified agent object policy, authorized object build parameters are determined at stage 1622 and passed to an object service.

The object service returns information to the UI that allows for the display of the requested created object at stage 1624.

At stage 1626, the UI requests sequencing for the Agent objects. A request to establish sequencing among Agent objects involves defining the order in which components or steps within an AI agent are executed. This sequencing ensures that data flows correctly through the AI agent and that each processing step occurs in the correct order. For example, data preprocessing must occur before a query is sent to an LLM in some agents. Sequencing can also take into account dependencies.

Implementing sequencing can be done using configuration files (e.g., YAML, JSON) or workflow orchestrators to manage and enforce the sequence. The UI can allow users to define the sequence by connecting components in the desired order. Proper sequencing ensures data integrity, reduces the risk of errors, and improves the reliability and maintainability of the AI agent. By clearly defining the order of execution, each step receives the correct input and produces the expected output, facilitating a smooth and efficient agent operation.

In response to the sequencing request, the management service identifies and effectuates sequencing policies at stage 1628. The sequencing is then used to create or modify an AI agent definition by a builder service at stage 1630. Although not shown in the figure, this can also cause modification to the AI agent manifest, which can be revalidated by the validation service.

At stage 1632, the UI displays the sequencing. This can include displaying the various agent objects of the AI agent, with connections between the input and output of the AI agent.

At stage 1634, the user can add dependencies to objects in the AI agent, or an object parameter or policy object can indicate a dependency. At stage 1636, the management service applies dependency policies (also called "dependency rules") to one or more of the Agent objects.

Designing an AI agent can include establishing various dependency policies that define how components or steps interact and rely on each other to ensure efficient and correct operation. Sequential dependencies mandate that one step must be completed before the next begins, ensuring tasks are executed in a specific order, such as data preprocessing before feature engineering. Conditional dependencies execute steps based on specific criteria or conditions, like querying a model only if the dataset in the AI agent is done being ingested. Data availability dependencies ensure that a step starts only when the necessary data or inputs are available from a previous step, ensuring that model training waits for the completion of feature engineering.

Resource-based dependencies manage the execution of steps based on the availability of computational resources, optimizing performance by scheduling tasks when required resources such as CPU or GPU are available. Concurrency constraints allow for the parallel execution of multiple steps while respecting dependencies, improving agent efficiency by running non-dependent tasks simultaneously, such as running data ingestion and initial data cleaning in parallel. Time-based dependencies schedule steps to execute at specific times or intervals, suitable for agents requiring periodic updates, like running data ingestion every night at midnight.

Error handling dependencies define the AI agent's response to errors or failures in specific steps, incorporating retry policies, fallback procedures, or stopping the AI agent. Manual approval dependencies ensure that critical stages requiring human oversight proceed only after receiving manual approval, such as deploying a trained model to production after successful evaluation and team lead approval. These dependency policies, implemented through configuration files, workflow orchestrators, and visual interfaces, help create robust, efficient AI agents capable of handling complex workflows by clearly defining the interactions and prerequisites for each step.

At stage 1638, the AI agent definition is updated to reflect the dependencies. This can include adding the dependencies to the AI agent manifest. The dependency can be identified in the manifest in connection with the step (e.g., agent object) that has the dependency.

The validation service can then validate the updated agent manifest at stage 1642. This can include ensuring that the manifest adheres to required formats, contains valid configurations, and meets predefined standards for successful execution. This process can include multiple layers of validation to ensure both syntactic correctness and functional integrity.

Firstly, the syntax validation checks that the manifest file conforms to the expected schema, which can be defined using tools like JSON Schema or YAML Schema. This involves verifying that all required fields are present, data types are correct, and the structure of the manifest is as expected. Format checking and linting are also part of this step to enforce coding standards and detect common formatting errors.

Secondly, semantic validation ensures the manifest's content makes logical sense. This involves checking that all referenced components, such as data sources, preprocessing steps, and models, are defined and available to the tenant. It also includes validating that the specified parameters and configurations are within acceptable ranges and types. Additionally, dependency resolution ensures that the sequence of steps respects the required order and that all necessary prerequisites are met. This process can simulate the AI agent execution to identify any issues before actual deployment.

Security validation ensures that sensitive information is managed correctly, and access controls are properly configured. This includes verifying that credentials, API keys, and other sensitive data are securely handled and not exposed in the manifest. The validation results can be displayed.

When the AI agent is loaded in the UI, at stage 1644 the UI can request an AI agent definition from the builder service. The builder service can generate and return the manifest and an API endpoint at stage 1646.

The user can modify the AI agent in the UI at stage 1648. When the user saves the modification, the builder service can rearrange the manifest at stage 1659. The modified manifest is validated by the validation service at stage 1652.

The UI can then test the AI agent, such as in a playground, battlefield, or QA environment at stage 1654. At stage 1656, the evaluation service executes agent tests. Comprehensive validation, including testing and dry runs, ensures that the AI agent is ready for execution, reducing the risk of errors and ensuring robust and reliable agent operation.

The AI agent tests can include running a batch of inputs and comparing the outputs to expected outputs. The comparison can be a semantic comparison based on vectorizing the output and performing a vector comparison to a vectorized expected output. Alternatively, and LLM can compare the results to expected results and alert an administrator to divergence. The test results can display in the UI at stage 1658.

The test results are one type of execution metric. The results can include an output from the AI agent that displays onscreen. The results can also include outputs of one or more of the Agent objects, allowing the administrator to trace outputs at each stage of the AI agent. Other execution metrics can include cost, number of tokens used, and the time to execute the AI agent or each stage of the AI agent.

Figure 17:
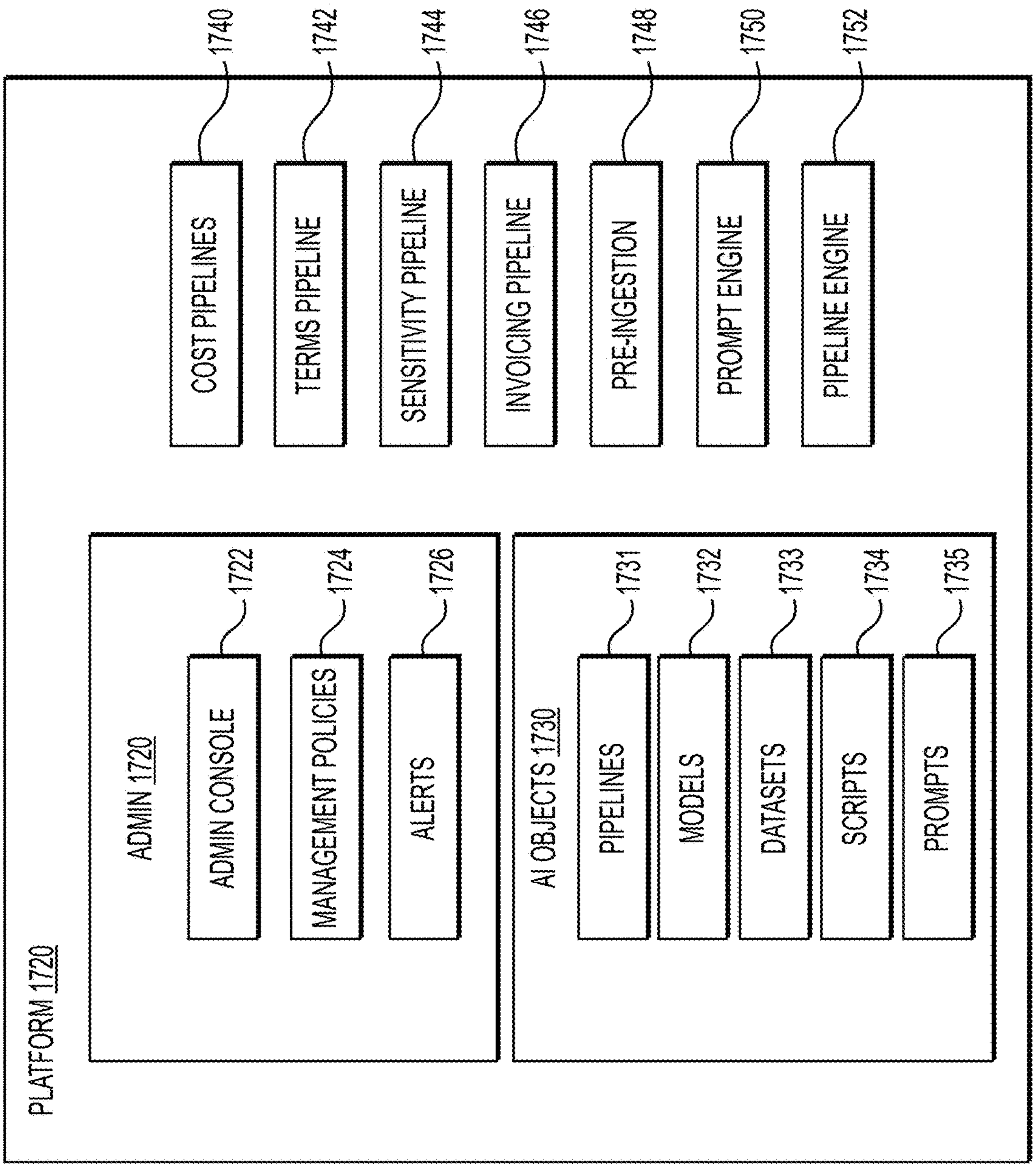
FIG. 17 is an illustration of system components for administration aspects of an AI platform application, according to various embodiments.

FIG. 17 is an illustration of system components for administration aspects of an AI platform 1710, according to various embodiments. The AI platform 1710 can include various administrative agents for determining the costs of AI services, the information sensitivities of agents, and invoicing, among other administrative features. Pre-ingestion tools and prompt engines ensure that the AI agents continue to operate with minimal disruption, as will be explained.

Administrative features 1720 can include an admin console 1722, management policies 1724, and alerts 1726. The admin console 1722 can include the previously described UI for designing and testing AI agents. AI objects 1730 are pictured for this purpose, with agents 1731, AI models 1732, AI datasets 1733, code 1734, and prompts 1735 all being available for inclusion in the AI agent design.

The administrative features of the AI platform can determine what is permitted at various third-party models and what is the cost both now and in the future. With this information compared to requirements for the AI agent, the AI agent engine 1752 can determine when and where to execute some stages of an AI agent. Additionally, invoicing can occur automatically based on the costs of running the AI agent.

An administrator can set management policies 1724, such as agent policies, that define cost and timing boundaries of an AI agent's operation.

The AI agent can operate either synchronously or asynchronously. Synchronous operation runs upon receipt of an input to the AI agent. However, asynchronous agents run independently of an input, and instead can wait for a different triggering condition. For example, a customer might not care when a large image manipulation job occurs, so long as it is within a threshold number of hours. This can allow for flexibility in where the job runs, such as in a low cost market overnight to save money.

To surface infrastructure costs, a resource agent 1740 asynchronously executes at the AI platform 1710. The resource agent 1740 can periodically poll hyperscalers to determine costs currently and historically at different times. A hyperscaler can be a large-scale cloud service provider that offers extensive and scalable infrastructure for computing, storage, and networking. These hyperscalers, such as Amazon Web Services (AWS), Microsoft Azure, and Google Cloud Platform (GCP), are capable of supporting vast amounts of data and high-performance computing tasks required for AI workloads. They provide the necessary resources to deploy and manage complex AI models at scale.

Polling a hyperscaler to determine the costs of running an AI service can include querying the cloud service provider's pricing APIs to retrieve real-time pricing information for the resources utilized by the AI service. The process starts by identifying the specific resources required, such as compute instances, storage, data transfer, and specialized AI services like machine learning models or data preprocessing tools.

To perform the polling, the AI platform 1710 can authenticate with the hyperscaler's pricing API using appropriate credentials, such as API keys or tokens. Once authenticated, the AI agent engine 1752 can send requests to the pricing API, specifying the types and configurations of resources needed. These requests can be built into the resource agent 1740, in an example. The API responds with detailed cost information, including current prices for various resource types and any applicable discounts or usage tiers.

By storing historical resource information, the resource agent 1740 can also forecast the likely resource expenditures and performance of each AI service at various times during a day. This can allow the AI agent engine 1752 to schedule asynchronous AI agents based around the times with cheaper costs. In another example, the AI agent can allow flexibility in where to execute an AI service, such as an LLM. This can allow the resource agent 1740 to consider costs across all eligible AI services for an AI agent.

The system then aggregates this pricing data to calculate the total estimated cost of running the AI service. This involves summing up the costs of all individual resources over the expected usage duration. For a comprehensive cost estimate, the system may also factor in additional costs such as data ingress and egress, persistent storage, and any ancillary services. This aggregated cost information can be presented to users or system administrators to inform budgeting and resource allocation decisions.

Finally, the polling process can be automated to run at regular intervals, ensuring that cost estimates remain up to date with any changes in pricing or resource usage patterns. This continuous monitoring helps in managing and optimizing the operational expenses associated with running AI services on a hyperscaler platform.

As an example of cost awareness, GPU workloads on AWS can run $4.00/hour, but same hardware from smaller vendors can be had for $0.70/hour. The resource agent 1740 can continuously evaluate and lower cost for customers by choosing where to run their models, all things being otherwise equal, to achieve the lowest cost. The resource agent 1740 or agent engine 1752 can allow the both upon run of agent and throughout its execution switching to alternate execution environment upon a significant/threshold deviation from the current execution environment.

GPU workloads are most efficient when multi-thread operations are being executed, so making cost-aware decisions on how to sub-divide an entire processing load of an AI agent across X array of GPUs can have a significant impact on the total cost to run the AI agent (e.g., images are best run as batches as to optimize the cost when 1M images are run through a new, more capable model, as opposed to sequentially, as well as the optimal batch size being a significant factor in workload execution optimization)

A sensitivity agent 1744 can run at the AI platform 1710 to identify data sensitivity levels of customer agents and datasets. The sensitivity can be relevant because different agent objects may need to be suggested to ensure the data remains confidential. The sensitivity agent 1744 can review the prompts in a user's AI agent to determine what kind of information is being shared. Alternatively, the AI platform can ask the user can be asked questions about the AI agent or dataset, and based on those questions the AI agent or dataset can be labelled as sensitive.

Different AI services have different terms of service, making some AI services unsuitable for particular use cases. For example, a health application might violate terms of an AI service that forbids health applications. Because these terms change periodically, a terms agent 1742 can periodically execute and poll the eligible AI services for their terms of service.

High sensitivity agents can be more likely to violate terms of service. The terms of service agent 1742 or another process can surface conflicts with existing agents, in the form of alerts 1726. To determine if a terms of service changed, the service can be polled, the terms of service can be hashed and compared to a prior hash of the terms of service. If a difference exists, the AI platform can perform a semantic meaning comparison between the two versions of the terms of service. If the terms of service have become more or less restrictive with regard to any category of service, then the terms agent 1742 can re-compare against existing agents to reassess which AI agents are now allowed or disallowed based on the new terms of service.

Different providers have varying levels of restrictiveness in their terms of service. The terms agent 1742 can distill down the disallowed topics or topics that require approval prior to an AI agent using the provider. For example, health questions may be disallowed. The prompt engine 1750 can analyze user prompt packages to determine whether any agents are using the provider for health advice. If so, then an alert 1726 can be surfaced to an administrator.

In one example, AI platform can download and vectorize a terms of service. For example, the terms can be downloaded from a company website. The terms agent 1742 can then determine whether the terms are violated by the intended use of the AI agent. Based on the combination of eligible AI services with non-conflicting terms and with cost schedules in place, the AI agent engine 1752 can select an AI service and operation time. This allows for dynamically adjusting the execution of asynchronous AI agents to save money for the customer.

Additionally, an AI agent can be multithreaded to harness graphical processing unit (GPU) power better. This can particularly help with large jobs. For example, several threads, such as ten, can simultaneously run for image ingestion. In one example, the size or volume of the dataset can be used to determine whether to multithread the job.

Likewise, if an AI agent is taking too long to execute compared to polled data regarding execution times at another hyperscaler, the AI agent engine can stop execution and resume execution at the faster hyperscaler. Likewise, if another hyperscaler is polling with similar execution times but a lower price, the AI agent engine 1752 can switch the next portion of the workflow to the other hyperscaler. This can particularly be relevant for large batch jobs, such as processing a hundreds of gigabytes of images.

The AI agent engine 1750 can report each AI service that runs in the AI agents. The AI platform can track which AI service ran, when it ran, and the cost. Additionally, the platform can track what could have run and how much that would have cost.

An invoicing agent 1746 can use this tracked data to periodically tally a customer's current balance. Invoices can be created according to scheduled time periods. The cost savings of the dynamically scheduled asynchronous AI agents can be calculated and displayed on the invoice. For example, in addition to adding up line items about which services the customer used and how much that cost, the invoicing agent 1746 can sum up which services the customer could have run or even would have run without the platform's dynamic agent adjustments. The cost difference can be shown on the invoice, which helps the customer understand their overall savings by continuing to use the AI platform 1710.

The invoicing agent 1746 (also called billing agent) can calculate infrastructure consumption, such as compute and storage costs. The invoice itself can also be broken down by AI agent, in an example. The average costs of the AI agents during the billing period can be shown. Additionally, average costs of individual agent objects can be shown. This can allow the user to know how to tweak agents to lower costs.

In one example, the cost agent 1740 polls alternative prices at other hyperscalers. When another hyperscaler offers savings above a threshold as compared to a user's current configuration, an alert 1726 can be sent to the user. The user can review the per-day or per-hour cost difference. The user can decide whether to switch to the other hyperscaler. The user can also establish the cost threshold and select and option that authorizes the AI agent to pick the hyperscaler with the best price when the threshold is exceeded. The user can also be presented with an option of whether to apply this to asynchronous agents, synchronous agents, or both. In one example, the user can approve a list of potential hyperscalers. From this list, the cheapest hyperscalers can be selected by the AI agent.

In one example, a prompt engine 1750 can automate a battleground for an AI agent at multiple hyperscalers, including new hyperscalers that are not yet on the user's approved list. The prompt engine 1750 can use one or more conversations that are repeated at each hyperscaler. At each step of the conversation, the semantic similarity of the results can be analyzed by the prompt engine 1750. If the semantics diverge at a step, the prompt engine 1750 can request a new prompt for use at the new hyperscaler that will result in the conversation maintaining semantic similarity at the step where the semantic meaning diverged. The new prompt can be stored for use at that hyperscaler.

The battleground can be repeated, using the new prompt. If the semantic similarity remains the same through multiple battlegrounds, then the AI platform can indicate on the UI that the hyperscaler has been battleground tested. The UI can also indicate how many new prompts were created to maintain semantic similarity. The user can review the new prompts and decide whether to add the new hyperscaler to the approved list, along with the new prompts.

A pre-ingestion module 1748 can inspect new content that the user attempts to upload to the AI platform 1710 for ingestion. The AI platform can also include a marketplace where third parties can monetize and optionally deploy their agent modules (e.g., AI models, data sets, python scripts, identity provider hooks, etc.).

Figure 18:
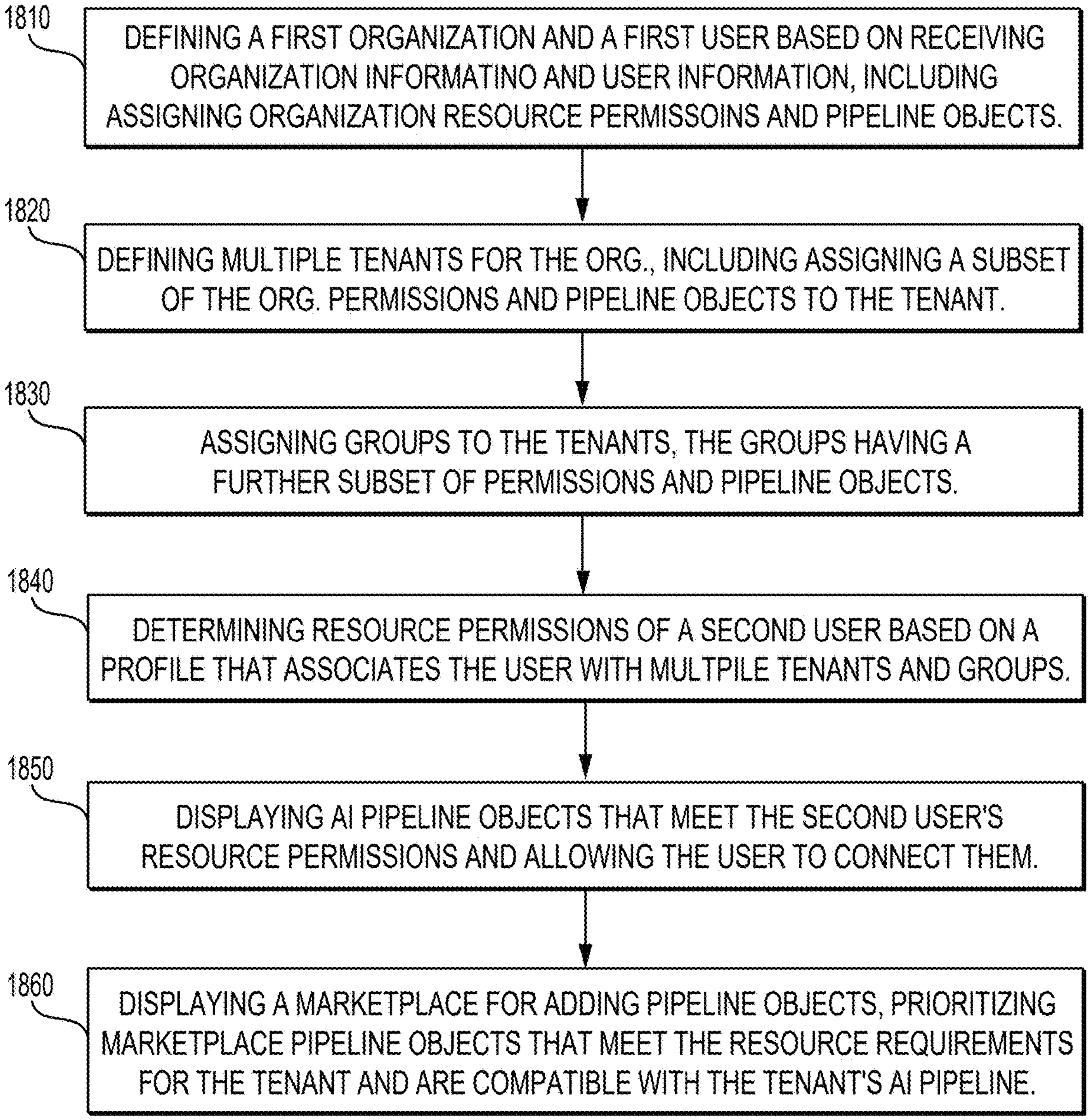
FIG. 18 is an example flow chart of a method for managing subtenant AI agents.

FIG. 18 is an example flow chart of a method for managing subtenant AI agents. At stage 1810, a server that is part of or communicates with the AI platform can receive user information and organization information. It is understood that the server can comprise multiple physical servers that execute using physical hardware, such as processors and memory. A user can submit the user information and organization information in multiple ways. For example, the user can go to a website for the AI platform, click an option to create an account, and type in basic information, such as their name, email, and an organization name. In another example, a message can be sent by either the website or the user to the server with this information. The server can generate and store a record, such as a consumer relationship management (CRM) record. An administrator for the AI platform can approve the record based on determining that the person and organization are real and not malicious or otherwise undesirable on the AI platform. This can allow the AI platform to reduce spoofing and generally improve the quality of customer onboarding.

Once approved, the server can create records, such as database entries, to define a first organization based on the organization information and a first user based on the user information. The AI platform can associate the first user with the first organization through a user profile. The user profile can include an organization identifier that is linked to the organization.

The AI platform can then send an email or other electronic message to the user. The email can include a link with a one-time passcode seeded in a uniform resource locator (URL). When the user follows the link, they can log into the AI platform for the first time. There, the user can setup their password and other account information.

The AI platform can assign organization resource permissions and organization agent objects to the organization identifier. The resource permissions can dictate which agent objects are available to the organization, in an example. In this context, the resources being permitted include AI agents and Agent objects.

The user experience can be based on selections the user makes on the UI of the AI platform. For example, the user might identify themselves as either an AI novice or sophisticated. A novice user can be presented with a template AI agent that is fairly basic, such as a retrieval-augmented generation (RAG) agent with a dataset that is relevant to selections the user made about how they intend to use the AI platform. Alternatively, the novice user can be walked through interactions with an AI model that is relevant to the user's user case. For a sophisticated user, the AI platform can step the user through a battleground UI, so that the user can understand how to change out and see the impact of different agent objects within the AI agent. The AI platform can also include an assistant to answer user questions and point the user to various features.

At stage 1820, the user can define multiple tenants for the organization. For example, based on inputs from the first user, the server can define a first tenant having a first tenant identifier and a second tenant having a second tenant identifier. Both the first and second tenants can be associated with the organization identifier.

In general, the tenants can represent customers of the organization that desire access to the AI platform for purposes of managing or creating their own AI agents. The tenants can alternatively represent different companies owned by the organization.

Defining the multiple tenants can include assigning first tenant resource permissions to the first tenant. The tenant resource permissions can be the same or fewer than the organization resource permissions. This subset can be selected based on the scope of the tenant's use of the AI platform and based on management decisions at the organization level. The tenant resource permissions can therefore vary between tenants. A first tenant and a second tenant can have different subsets of the organization resource permissions.

The server can also assign first Agent objects to the first tenant. The first Agent objects can be those that meet the first tenant resource permissions. Like with the resource permissions, the first Agent objects can be a subset of the organization agent objects. The first and second tenants therefore can have different subsets of the organization agent objects. The server can assign second Agent objects to the second tenant that are a different subset of the organization agent objects than the first Agent objects. As an example, the first and second tenants could be two technology companies focused on different technologies, such as a first company that provides health tracking and advice and a second company that provides automated alerts based on image recognition. The types of agent objects and AI agents employed by these two tenants will likely differ, even though there is overlap. The tenant agent objects and resource permissions can be set accordingly, allowing the UI experience for each tenant to be more directly focused on the respective tenant's needs.

At stage 1830, this permissions and agent object hierarchy can be taken a step further by assigning groups to tenants. The groups can represent teams or divisions within the tenant. The groups can be defined by a user at the organization level or at the tenant level, depending on management policies and resource permissions of that user. In one example, the user assigns first and second groups to the first tenant, those groups having first and second resource permissions, respectively. The first and second resource permissions can give access to different agent objects from among the first Agent objects assigned to the first tenant. The first and second resource permissions are the same or fewer than the resource permissions of the first tenant. In this way, the group resource permissions are subsets of tenant resource permissions, which in turn are subsets of organizational resource permissions.

At stage 1840, the server can receive a login request from a second user that is defined within the system of the AI platform. Using the login information, the server can locate a stored profile that associates the second user with the first organization, first and second tenants, and the first group of the first tenant. These associations can drive which resource permissions and agent objects are available to the second user.

In one example, the user can only be logged into a single tenant at any one time. This helps prevent the sharing of potentially sensitive information between the tenants. The AI platform can determine which tenant the second user is logged into based on a tenant selection. The tenant selection can be a default that is stored with the user profile. And the user can switch between tenants through use of a tenant selector UI component, such as a dropdown list, in an example.

At stage 1850, for the selected tenant, the server can cause the UI to display the associated available agent objects. For example, when the second user is logged into the first tenant, the UI can cause agent objects to display that meet the resource requirements of the first tenant and the first group of the first tenant. The second user might see even fewer agent objects based on their own preferences and based on management policies that apply to the second user. Even though the second user also is associated with the second tenant, the available agent objects do not include those of the second Agent objects that are not also first Agent objects. To access the AI agents and agent objects of the second tenant, the second user must login to the second tenant, ending the session with the first tenant.

In one example, a default AI agent displays based on profile information of the second user. The default AI agent can meet resource permissions of the first group, first tenant, and first organization.

The UI can display options to select and connect the subset of first Agent objects. These agent objects can include prompt objects, dataset objects, model objects, and other agent objects discussed herein. The resource permissions of the particular user can dictate which AI agents the second user can edit and deploy, and which Agent objects the second user can utilize when doing so.

At stage 1860, to allow customization and expansion of the available agent objects, the UI can display a marketplace of agent objects. The user can browse agent objects by type in the marketplace, with visual cues explaining costs, performance, and current permissiveness of the marketplace agent object. The UI prioritizes display of a first marketplace agent object that meets the first resource permissions of the first tenant. The UI likewise can prioritize display of the first marketplace item because it is compatible with an AI agent that is stored in association with the first tenant, such as the template AI agent. The first marketplace item is purchasable, meaning the second user can select to add the first marketplace agent object to the available agent objects. The marketplace can by dynamic, and constantly update to include the latest agent objects.

The AI platform can include intelligent marketplace agent object recommendations. For example, an approval flow can be included that highlights marketplace agent objects based on similarity to existing available agent objects. Model similarity can be based on having a same creator, a different version number, and being the same model type. Dataset and code similarity can be based on the published purpose, content, version, and creator. In one example, the UI includes an option toggle on marketplace agent objects that are not currently permitted. These agent objects might fail to meet the resource permissions of the first group, for example. But the UI can prioritize display of a first non-permitted marketplace agent based on similarities to a current agent object in the AI agent, the similarities including object type, object date, object version, and object creator. The prioritization can include making the marketplace agent object appear first onscreen, highlighting the marketplace agent object a different color, and the like.

The marketplace can therefore prioritize display of agent objects differently between different tenants. Additionally, management policies associate with the second user can dictate whether the second user is allowed access to certain AI agents. In one example, the AI agents and agent objects accessible by the user can influence which marketplace agent objects are prioritized (e.g., highlighted) on the UI.

In one example, the AI platform includes an option on the UI to simulate execution of the first marketplace agent object prior to purchase. This can allow for collection of data that may be needed to decide whether purchase of the marketplace agent object is justified. This data can also be included with the purchase request to administrative users of the tenant or organization that ultimately approve or deny the purchase. The simulated execution can be performed in a playground or battleground UI. For example, the first marketplace agent object can be automatically or manually inserted into a modified version of an AI agent that is stored in association with the first tenant or first group. The user can select the AI agent and select the Agent objects to replace with the marketplace agent object for testing purposes. The simulation metrics can be stored for later retrieval or automatically included in the approval request. For example, prior to the approval request being submitted, a battleground with simultaneous simulated execution may be required. The results can be displayed on the UI, and the user can be prompted regarding whether they would still like to submit the approval request. If so, then the results can be sent to the administrator as part of the approval request. The results can provide context regarding the impact that the purchase could have on finances, performance, storage space, and overall return on investment. For example, a new dataset might require additional storage space, and the AI platform can surface the associated cost.

The approval process can include receiving an UI selection from the second user to add the first marketplace agent object to the available agent objects of the first tenant or first group. Then, the AI platform can delay purchase (i.e., addition) of the Agent objects, the purchase being contingent on approval by an administrative user that is different than the second user. Again, a simultaneous simulation may be run as part of the approval request. Once approved, the server can update the available agent objects for the first group to include the purchased agent object.

The AI platform can likewise recommend removal of agent objects based on the lack of inclusion of the Agent objects in existing AI agents, particularly when a newer version of the Agent objects is being used in the AI agents.

Figure 19:
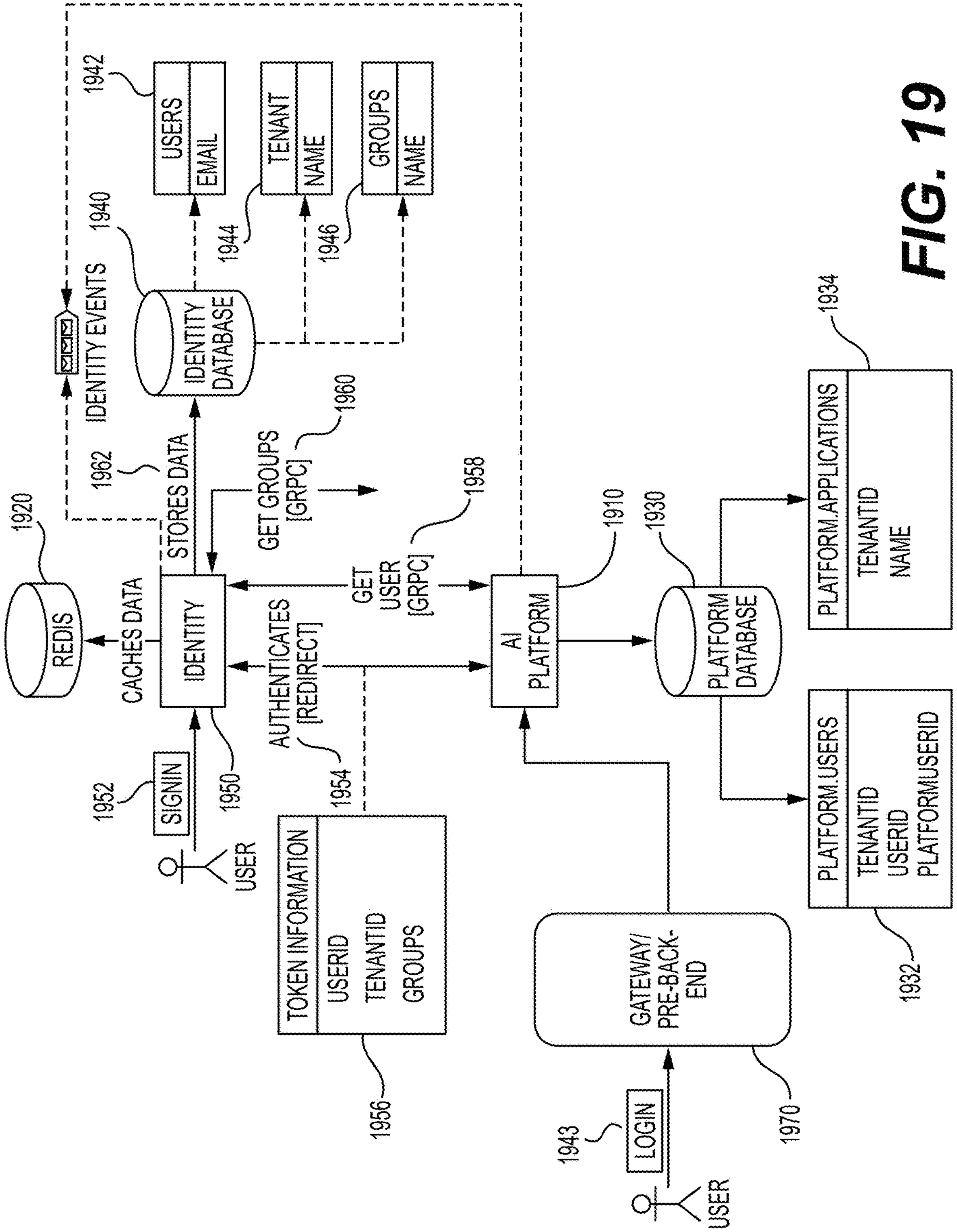
FIG. 19 is an example illustration of system components for managing multi-tenant AI agents.

FIG. 19 is an example illustration of system components for managing multi-tenant AI agents. A user signs in at stage 1952 and authenticates with the AI platform 1910. Alternatively, a gateway pre-backend 1970 can be used to login 1993 the user into the AI platform 1910.

An identity server 1950 authenticates the user with the AI platform 1910 at stage 1954 by sending user token information. The token information can include a User ID, a tenant ID, and group(s). Alternatively, tenant IDs and groups can be derived from the User ID. User IDs 1942, Tenant IDs 1944, and groups 1946 are all tracked at an Identify Database 1940. Group information can be retrieved at stage 1960.

The identity server 1950 can work together with AI platform server 1930 to authenticate a user at stage 1954. This can include API calls or GOOGLE remote procedure calls (GRPC) at stage 1958. GRPC can be used to enable communication between distributed systems or microservices, allowing them to call functions or methods across different machines as if they were local, regardless of the platform or programming language. The identity information can also be cached in a REDIS database 1920 for quick retrieval. The identity server 1950 can store identity-related data at stage 1962 in an identity database 1940.

The AI platform 1910 has a platform database 1930 that tracks which users and tenants correspond to which organizations (i.e., via organization IDs or platform IDs). The platform database can 1930 trace particular users and tenants of a single organization, such as with table 1932. This can allow for true separation of data between organizations. Likewise, the platform database 1930 tracks which AI applications 1934 correspond to which tenant IDs. In this way, different tenants can be served with different AI applications. The platform database 1930 can manage resource permissions, which can be linked to the user, organization, tenants, and groups.

The same can be true of AI agents and agent objects. One or more tables can relate a tenant ID over to the AI agents and agent objects, tracking which agent objects are accessible by which tenants.

Subtenancy can be implemented as well. In one example, a table tracks which tenant IDs are subtenants of other tenant IDs. In another implementation, a new group ID is created for each subtenant, and the subtenants (the customer's customers) are actually groups of the tenant (the customer).

The AI platform can quickly spin up tenants that are dedicated to an organization. Management policies and resource permissions can be applied to the tenant based on what is already selected by or for the organization. Datasets, models, agents, tools, and code can all be preselected for application to subtenants. The AI platform can authenticate subtenant access and apply the preselected policies against the tenant environment (e.g., security, privacy, user/group based). The resource permissions can be based on group or role, with each permitted agent object associated with the group or role.

Figure 21:
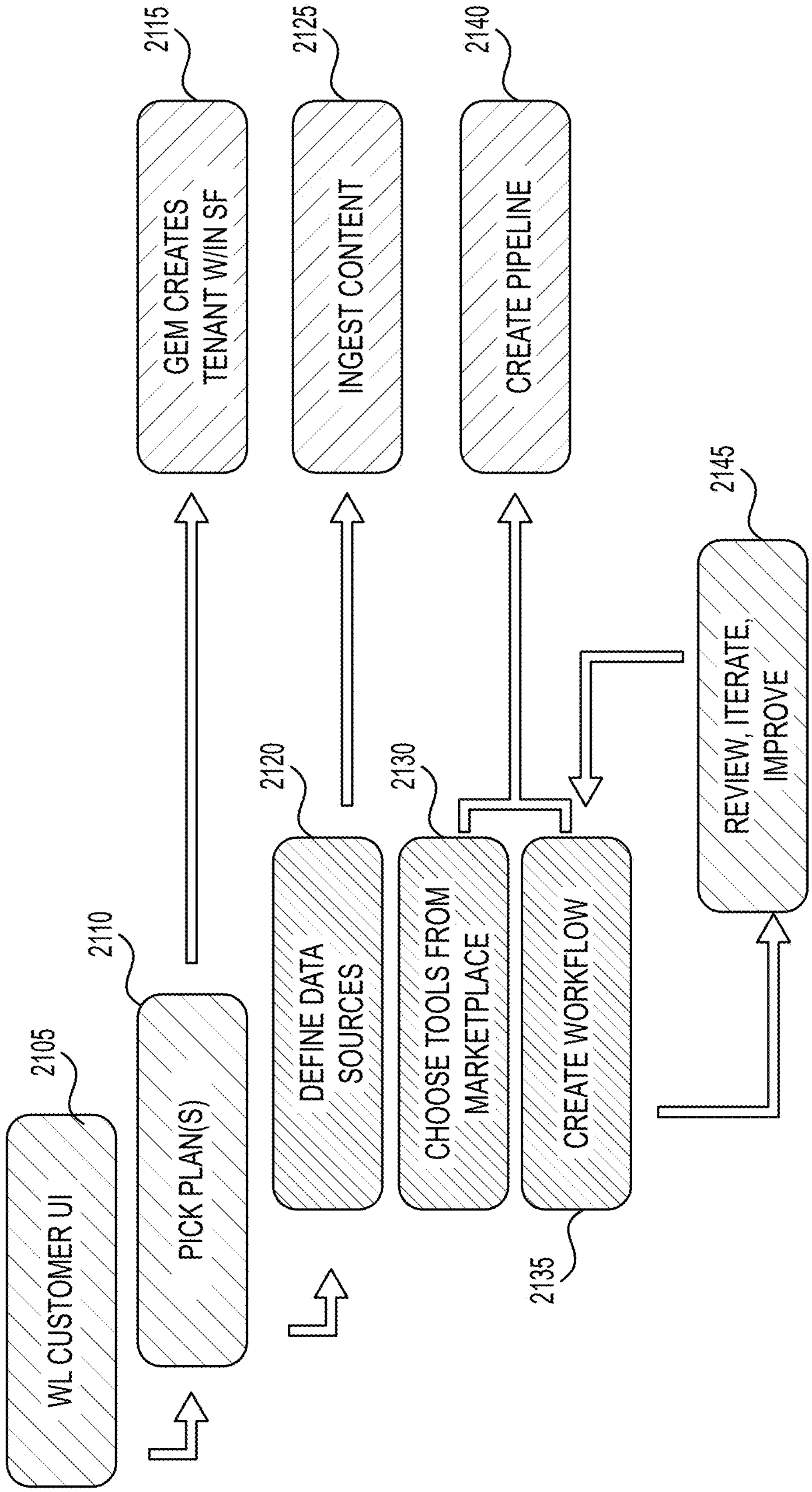
FIG. 21 is an example flow chart for creating subtenant AI agents.

The AI platform can also provide a white-labeled (WL) version of the US to the tenant customer, as shown in FIG. 21. The customer can pick plans that will apply their customers (the subtenants). The plans can define datasets, include tools chosen from a marketplace, and include AI agents and other workflows.

Picking the plan can cause a global environment manager (GEM) to create subtenants. The GEM can execute above the other platform services and move tenant workloads between hyperscalers. Only so many tenants can operate on a node, so the GEM can perform load balancing. The GEM scales compute and storage resources in various environments.

In one example, the GEM can create user profiles for the subtenant or tenant based on a user chatting with the AI platform. The user can mention another user, and the GEM can create a profile for that other user, which the other user can later claim. Claiming a profile allows the other user to access the AI platform and inherit any data captured about them in the chat before they claimed their account.

The tenant can show their customers the WL UI, allowing their customers to deploy the tenant AI agents in a flexible, configurable, secure, and private way. The tenant's customer (TC) can add their own datasets, chose tools and models, and the GEM can create a new tenant for the TC. The AI agent can provide a connector to ingest the datasets, with the output going where the tenant or TC defines.

The multitenant AI platform can logically isolate data among the tenants. This allows for sharing the database, cache, and applications infrastructure for all the tenants that are created into the AI platform ecosystem. The multitenant architecture can rely on an identity server, such as in FIG A1, to provide an abstraction of some concepts to the back-end systems and to propagate events related to changes on the identity of a given user.

The AI platform can provision an message broker to propagate tenant events to other back-end applications. The AI Platform can subscribe to that event and create a Default app and assign the tenant admin user permissions for the tenant owner inside AI Platform authorization system.

A user can belong to multiple tenants and have different roles defined within those tenants. For example, User A on tenant X can have an editor role on the AI platform. User A on tenant Y can have a viewer role. This can ensure that the user's resource privileges can be tenant specific.

The AI platform can also include a marketplace where third parties can monetize and optionally deploy their agent modules (e.g., AI models, data sets, python scripts, identity provider hooks, etc.). Customers can include these modules in their AI agents.

The marketplace can provide a revenue stream for the AI platform, which can collect a percentage of all sales.

Management policies can dictate which users can purchase the AI agent modules, in an example. Additionally, a customer deposit or credit account can be charged. In one example, AI models and entire agents can be purchased and integrated into client agents and other workflows. The AI agent modules can incur a monthly charge, a per use charge, or any other payment configuration. Authorized users can implement the AI agent modules and payments can be deducted from the user account.

The purchased agent modules can be tested in a battleground against existing AI models.

An administrative user can approve an AI agent module as an alternative AI agent or agent object for use during times when costs or execution times of the primary AI agent or primary agent object exceed a threshold. In this way, the marketplace agent module can be a cheaper or quicker backup for times when an existing agent does not meet customer criteria.

Figure 20:
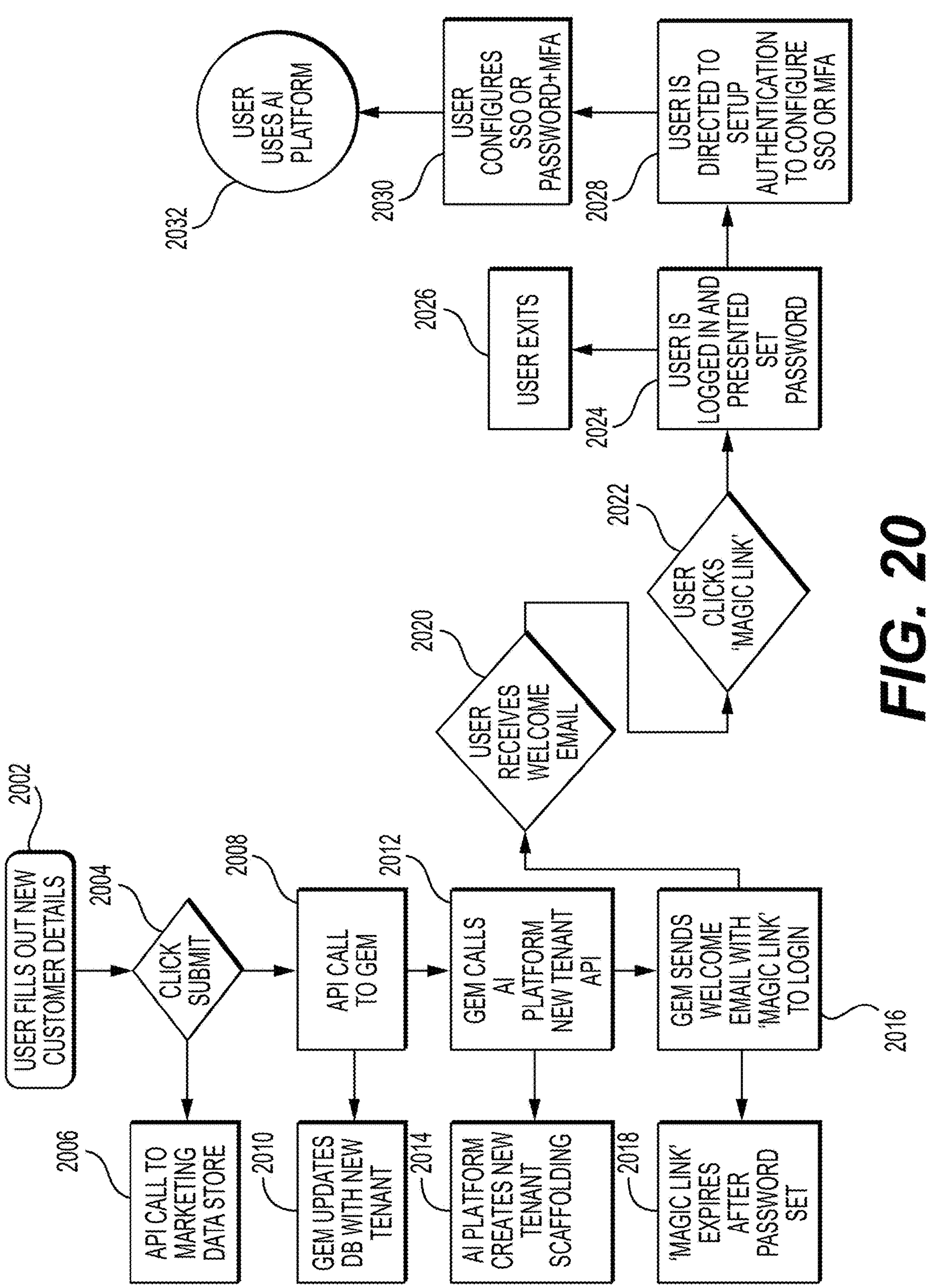
FIG. 20 is an example flow chart for onboarding tenants in an AI platform.

FIG. 20 is an example flow chart with example stages for onboarding tenants in an AI platform. A new user is created. This can include setting up enterprise single sign-on (SSO) or creating a local password for the user. This can trigger user account creation. Tenant creation can also be triggered, and the user account can be tied to the tenant account. The user can be setup as an administrative user by default.

At stage 2002, a user provides tenant information in a UI, such as through a website, and then submits the tenant information at stage 2004. The server can make an API call to the GEM at stage 2008, with the GEM updating a database with new tenant information at stage 2010. Likewise, the GEM can make an API call to a server associated with marketing at stage 2006, to store on an onboarding record for follow-up.

When the new tenant is approved, the GEM can issue an API call the AI platform at stage 2012 to cause the AI platform to create new tenant infrastructure at stage 2014. This includes storing the necessary identifiers and resource permission subsets already discussed. The GEM can then send the user a welcome email at stage 2016. The email can include a link for the first login, with a temporary passcode embedded in an URL. At stage 2018, the link password expires subsequent to the user performing a password reset upon login.

The user receives the welcome email at stage 2020 and clicks the link at stage 2022. At stage 2024, the user logs in and resets their password. The user can exit the AI platform at stage 2026. Alternatively, the user is prompted to setup authentication preferences such as single-sign-on (SSO) at stage 2028 and associated passwords or authentication criteria at stage 2030. After the setup is complete, the user can access and use the AI platform at stage 2032.

The AI platform can then ask profile creation questions. For example, the user can be asked what their use case is, what problem AI can help solve, what industry they work in, how sensitive their data is, and how accurate their output must be.

The collected information can trigger creation of a base or demo AI agent. The base AI agent can be created for based on a user template identified based on the user's answers to the profile creation questions. The base AI agent can include an appropriate model based on the user template. For example, for a high sensitivity template, the AI model can be open source (e.g., llama3, mistral). The AI model can be hosted on AI platform or on the customer's infrastructure for a "high sensitivity" user template. Alternatively, the model can be a most recently trained AI model (e.g., mistral, new versions of any model) for a "high accuracy" user template. As another example, the model can be selected as most capable (e.g., GPT4o, Claude Opus) for a "most capable" user template.

The user's account can also be initiated with sample prompts based on the selected user template. For example, a legal "use case" can include a prompt package that instructs the AI model to behave as an expert in law. But in other verticals, the sample prompts are different. In one example, a system AI agent of the AI platform asks an LLM to create at least one of the prompts based on the user's unique responses.

An AI agent utilizing the base model and sample prompts is then added to the tenant.

The AI platform can present a guided tour that illustrates how to create agents and agent objects, add a model, add a payment provider, and the like. The payment provider (e.g., STRIPE) can be added later while a free trial takes place, in an example.

The AI platform can utilize an invoicing agent 1746 to track all use of API keys for various LLMs and combine the uses into a single bill for the user. The AI platform can then charge a percentage on top of the LLM token rate. As described previously, cost savings can be calculated and displayed on an invoice for a billing period. The invoice can be created and added to a tenant. The tenant's payment processor can then be charged. Alternatively, the tenant can be charged daily for their use.

FIG. 21 is an example flow chart for creating tenant AI agents. At stage 2105, a white-labeled (WL) version of the UI is presented to a user associated with an organization. The user can pick plans at stage 2110 that will apply to the organization or to one or more of its tenants. The plans can be selected statically from a list, or dynamically determined based on a user questionnaire about use cases and user sophistication regarding AI. The plan can cause the GEM to create the tenant within SALESFORCE (SF) or some other CRM system at stage 2115 for customer tracking. The selected plan can define available datasets at stage 2120, include tools chosen from a marketplace at stage 2130, and include AI agents and other workflows at stage 2135.

Picking the plan can cause a global environment manager (GEM) to create tenants. The GEM can execute above the other platform services and move tenant workloads between hyperscalers. Only so many tenants can operate on a node, so the GEM can perform load balancing. The GEM scales compute and storage resources in various environments.

In one example, the GEM can create user profiles for the tenant based on a user chatting with the AI platform. The user can mention another user, and the GEM can create a profile for that other user, which the other user can later claim. Claiming a profile allows the other user to access the AI platform and inherit any data captured about them in the chat before they claimed their account.

The user can ingest content for datasets at stage 2125 and begin creating AI agents at stage 2140. The AI agent builder UI of the AI platform 1710 can track versions of an AI agent. This can allow an administrator user to make changes, such as to try a new AI model or now conditional parameters or management policies, and revert to a prior version of the AI agent if needed.

The AI agent builder UI can support if/then code blocks. This can allow the user to drag and drop conditions into the AI agent. The conditional block can include multiple And and OR conditions in an example. The conditions can be selected from any of the extensive parameters, management policies, and compliance settings discussed herein.

For example, the AI agent path can split in any number of paths based on a conditional block that checks user group, user compliance, device configuration, network settings, object parameters, and any of the settings discussed herein.

The AI platform 1710 can also periodically rotate API keys for the AI agents.

Find and replace objects can be used in the AI agents. This can allow for easy pre- or post-processing. In one example, the user or tenant can maintain a list of words to replace, with alternatives. The find and replace object can utilize one or more selected lists. A dynamic mode can be used for replacing names that are recognized. The list can mention types of words, such as "names," "slurs," "personal information," and the find and replace block can replace those word types.

The AI agent builder UI can also include Python text processing objects. A Python text processing object can include a tool, class, or library in Python designed to handle, manipulate, and analyze text data. These objects are essential for tasks in natural language processing (NLP), where raw text data needs to be transformed into a format suitable for machine learning models. Common tasks include tokenization, text cleaning, vectorization, and the reduction of words to their base forms, all of which prepare the text data for further analysis and model training.

Tokenizers are objects that break down text into smaller units, such as words or subwords (tokens). This process is useful in NLP and can be performed using tools like nltk.word_tokenize, or BertTokenizer from the Hugging Face library.

Vectorizers and embedders are objects that convert text into numerical representations (vectors) that machine learning models can use. Examples include Count Vectorizer, TfidfVectorizer from scikit-learn, Word2Vec from gensim, and pre-trained transformers like BERT. Additionally, lemmatizers and stemmers, such as WordNetLemmatizer and PorterStemmer from nltk, reduce words to their base or root forms, helping normalize the text for analysis.

Other important text processing objects include Named Entity Recognizers (NER) and Part-of-Speech (POS) taggers, which classify named entities and assign parts of speech to each token, respectively. Examples include the spaCy NER and nltk.ne_chunk for entity recognition, and nltk.pos_tag and spaCy POS tagger for part-of-speech tagging.

An external dependency object is another agent object available in the AI agent Builder UI. The object can list one or more dependency that an AI agent engine should wait on prior to executing an Agent objects. The external dependency can include the ingestion of content by an external service.

External dependencies can encompass the various libraries, frameworks, and services that the AI agent relies on to function correctly. These dependencies include widely used libraries such as TensorFlow, PyTorch, and scikit-learn, which provide essential tools for building and deploying machine learning models.

Beyond libraries, external dependencies also involve cloud services and APIs that facilitate data storage, processing power, and model deployment. Platforms like Amazon Web Services (AWS), Google Cloud Platform (GCP), and Microsoft Azure offer scalable infrastructure that supports large-scale data processing and model training. These services often include specialized AI and machine learning tools that can accelerate development and deployment. However, reliance on these external services introduces considerations such as cost, latency, data privacy, and security, all of which can impact the overall effectiveness and feasibility of the AI agent.

The AI agent Builder can also include an option to define agent execution location. For example, the AI agent can execute on-premises or in an SaaS configuration, such as with a cloud connector.

An AI agent scheduler can be a process that schedules when an AI agent will run, causing execution of the AI agent at that time. Some agents can be triggered by an event, such as by receiving an input. These and other agents, particularly asynchronous agents, can be scheduled for execution. The schedule can be a one-time execution or a periodic execution.

In one example, the polling of the cost agent 1740 allows the AI platform to determine that an asynchronous agent will run more cheaply at a later time that is still within the acceptable execution window. The AI platform can schedule the AI agent to execute at that later time through use of the AI agent scheduler.

The UI can also include agent export and import functions. All agent objects can require passwords to be typed in again before they become usable.

The UI can allow the user to specify dataset subobjects and parameters. In the context of an AI agent, dataset subobjects can be individual elements that define how the dataset is handled, processed, and utilized. These subobjects help break down the complex task of dataset management into manageable pieces, each responsible for a specific aspect of the data workflow.

The Embedding Model subobject defines how text data is transformed into numerical vectors that can be used by machine learning models. This subobject might allow users to choose from various pre-trained models (e.g., Word2Vec, GloVe, BERT) or to specify custom embeddings. The embedding model determines the representation of the text data, which is critical for the performance of NLP tasks.

A vector stores parameter provide options for users to select or define the storage mechanism for the vectors generated by the embedding model. This could include choices like in-memory storage, databases, or specialized vector stores like FAISS. The user interface would allow configuration of the storage parameters, ensuring that the vectors can be efficiently retrieved and utilized in the AI agent.

Chunking parameters enable users to define how large datasets should be divided into smaller, manageable chunks for processing. The UI can include options for specifying chunk sizes and strategies for chunking, ensuring smooth and efficient data processing.

A data sources parameter allows users to specify and configure the sources of the data being used in the AI agent. Options could include file uploads, database connections, API endpoints, or streaming data sources. The user interface can provide fields and options for entering the necessary connection details and credentials, making it easy to integrate diverse data sources into the AI agent.

An API Keys Object cab allow users to securely input and manage API keys required for accessing external services and resources. This section can provide fields for entering keys, options for naming them, and managing their scope and permissions. It could also include features for securely storing and retrieving these keys during the AI agent execution, ensuring that sensitive information is protected while maintaining the functionality of the AI agent.

A Memory Object in the user interface can enable users to configure memory management aspects of the AI agent. This can involve setting up cache mechanisms, defining memory limits, and selecting memory storage options. The interface can offer sliders, input fields, and drop-down menus to adjust memory settings and optimize the performance of the AI agent, ensuring efficient handling of data and intermediate results without exceeding available system resources.

At stage 2145, the AI platform can dynamically suggest improvements to the user, such as agent objects to add, agent objects to delete, and more efficient third-party providers. These suggestions can be based on iterative evaluation of the tenant use of the platform, newly-available agent objects, and the like.

Figure 22:
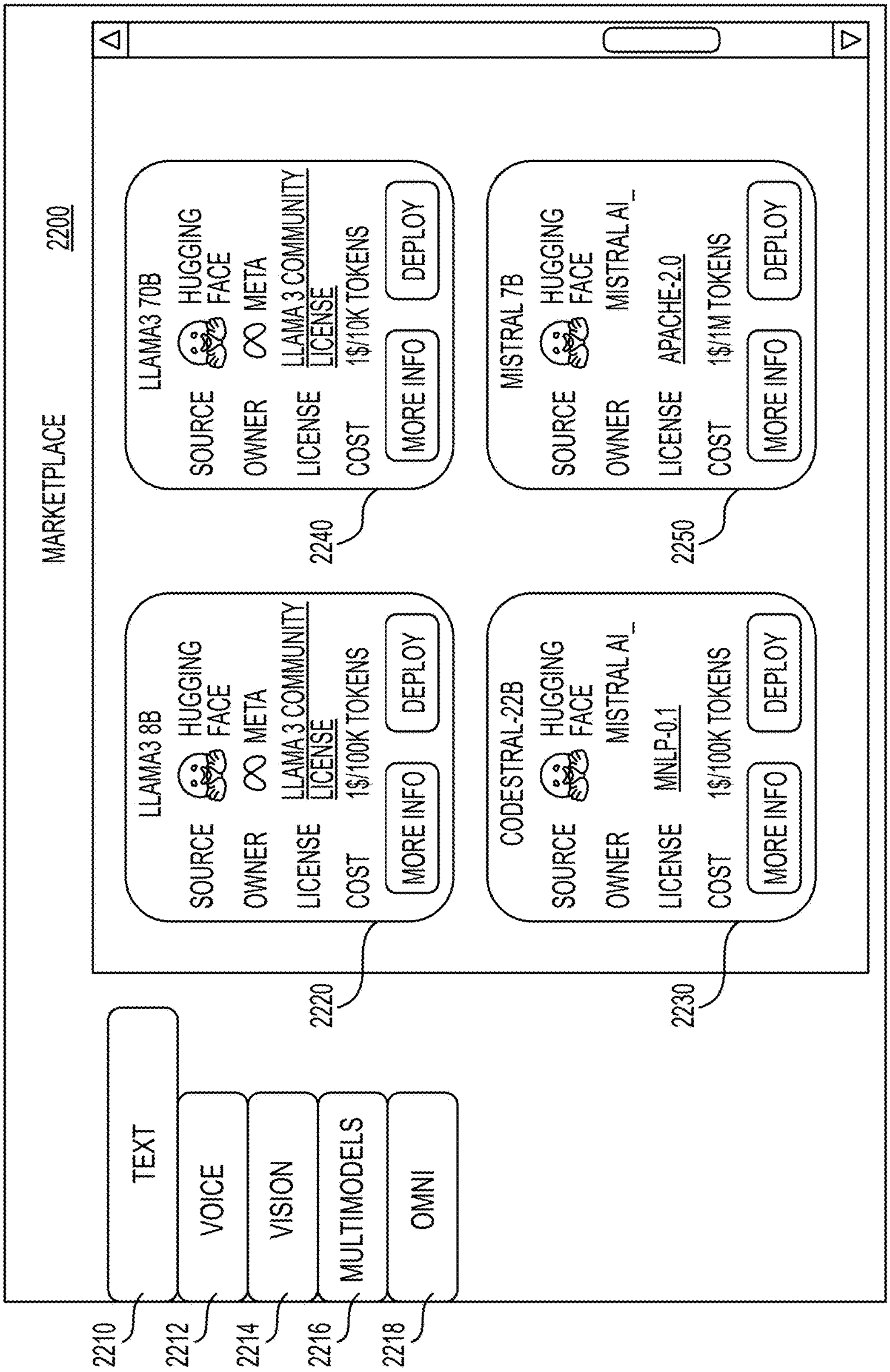
FIG. 22 is an example illustration of a UI screen for a marketplace of agent objects.

FIG. 22 is an example illustration of a UI screen for a marketplace of agent objects. The marketplace UI can include a model library that facilitates adding models to a tenant library of available agent objects.

The marketplace can include user ratings on the models, deployment time information, and efficiency rankings. Model costs are also shown.

The marketplace can sort the models by type. For example, FIG. 22 shows text models 2210 are selected. Other categories include voice models 2212, vision models 2214, multimodels 2216 capable of multiple categories of intelligence, and omni models 2218. multi-model and omni-model systems represent distinct approaches to handling multiple data modalities or performing various tasks. A multi-model system is characterized by the utilization of multiple distinct models, each engineered to process a specific type of data or to perform a particular task. For instance, one model within a multi-model system may be designed for natural language processing tasks, while another is optimized for image recognition, and yet another for audio analysis. These models operate independently, often requiring an overarching framework or system that integrates their outputs to achieve the desired outcome. The primary advantage of a multi-model approach lies in its flexibility, as each model can be individually optimized for its respective task or data type, allowing for specialized performance enhancements. This approach is commonly employed in applications where different types of data, such as text, images, and audio, must be processed concurrently, enabling the system to deliver tailored results based on the specific characteristics of each data type.

Conversely, an omni-model system, also referred to as a unified model, employs a single, integrated model designed to handle multiple modalities or tasks within the same architecture. This model is capable of processing various types of inputs—such as text, images, and audio—and generating corresponding outputs for a diverse range of tasks. The hallmark of an omni-model approach is its unified architecture, which facilitates cross-modality learning, allowing the model to leverage knowledge gained from different types of data simultaneously. This often results in improved generalization across tasks, as the model can draw on a broader base of information to enhance its understanding and performance. Additionally, the omni-model approach tends to be more efficient in terms of resource usage and system maintenance, as there is only one model to train, deploy, and manage, compared to the multiple models required in a multi-model system. This efficiency, combined with the ability to handle complex, multi-modal tasks, makes the omni-model approach particularly advantageous in scenarios where diverse inputs must be seamlessly integrated and processed.

While multi-model systems offer greater flexibility and the potential for task-specific optimization, they can also introduce added complexity in terms of system integration and management. In contrast, omni-model systems provide a more streamlined and integrated solution, enabling more efficient processing and potentially superior overall performance through shared learning across modalities. For example, in a multi-model system, separate models might be employed in a recommendation engine to analyze customer reviews, product images, and user interaction logs independently. In contrast, an omni-model system could handle all these inputs within a single model architecture, generating more coherent and contextually relevant recommendations by leveraging the combined knowledge from all data types.

The selection of the Text model 2210 category results in a scrollable display of text models that can be purchased from the marketplace. In this example, four such models 2220, 2230, 2240, 2250 are displayed. Each icon shows the name of the model, the source of the model, the owner of the model, the license required for the model, and the cost of using the model (one time or ongoing). Other resource information, such as storage and compute required, can be displayed when "more info" is selected. The "deploy" button can allow the user to make a purchase request or begin testing the model with simulated execution.

An AI model library designed with user-friendly organization and detailed information displays can enhance the user experience. One effective way to organize such a library is by grouping models by type. This categorization helps users quickly locate models suited to their specific needs, whether they are looking for models focused on natural language processing, computer vision, time series analysis, or other specialized tasks. By presenting the models in well-defined categories, the library becomes a valuable resource for users to efficiently navigate and select the appropriate tools for their AI projects.

Each model within the AI model library can be accompanied by a comprehensive set of details that provide users with all the necessary information to make informed decisions. For example, the library interface might include fields to display the source of the model, which indicates where the model was developed or originally published. The owner's information identifies the individual or organization responsible for maintaining the model, providing users with a point of contact for support or collaboration. Additionally, the license information is crucial as it informs users about the legal terms and conditions under which they can use, modify, and distribute the model.

To further assist users in evaluating and selecting models, the library can include details about the cost associated with each model. This might cover aspects such as one-time purchase fees, subscription models, or pay-per-use pricing structures. Additionally, a "More Info" section can provide links to detailed documentation, research papers, or user guides, offering users deeper insights into the model's capabilities, performance benchmarks, and potential use cases. This ensures that users have access to all the relevant information needed to thoroughly understand and effectively utilize the models.

The library can also offer a straightforward deployment option for each model, making it easier for users to integrate the chosen model into their own applications or workflows. This can involve providing pre-configured deployment scripts, compatibility with popular machine learning platforms, or seamless integration with cloud services. By incorporating a "Deploy" button or similar functionality, the library simplifies the process of moving from model selection to implementation, enabling users to quickly and efficiently put their chosen models to work.

Model deployment in an AI agent leverages microservices, which encapsulate specific functionalities, making the deployment process modular and scalable. Different deployment strategies can exist across different platforms, such as AWS SageMaker, Azure ML, and self-hosted environments, along with the necessary infrastructure to manage and store models.

Deploying models on AWS SageMaker involves a dedicated microservice responsible for uploading, creating, and deploying inference models. This microservice interfaces with AWS SageMaker's APIs to automate the deployment process, allowing for seamless integration with existing agents. Users can upload their trained models, which the microservice then packages and deploys as SageMaker endpoints. This approach leverages SageMaker's robust infrastructure, providing features such as auto-scaling, managed hosting, and monitoring, ensuring high availability and performance of the deployed models.

Similarly, another microservice can handle the deployment of inference models to Azure ML Kubernetes clusters. This service facilitates the uploading, creation, and deployment of models directly onto Kubernetes clusters managed by Azure Machine Learning. The microservice automates the setup of Kubernetes pods, deployment configurations, and scaling policies, providing a flexible and scalable environment for running inference workloads. By utilizing Kubernetes, this approach ensures efficient resource utilization, load balancing, and high availability, making it ideal for large-scale deployment scenarios.

For organizations preferring self-hosted solutions, a specialized microservice manages the deployment of inference models on local or on-premises infrastructure. This microservice includes functionalities for scaling, load balancing, and monitoring. It ensures that deployed models can handle varying loads by dynamically adjusting the resources allocated to each model instance. Load balancing mechanisms distribute the inference requests evenly across available instances, optimizing response times and resource usage. Continuous monitoring allows for real-time tracking of model performance, health, and usage metrics, enabling proactive maintenance and scaling decisions.

The deployment infrastructure supports multiple model storage options. Users can upload models to selected storage solutions, integrating with private cloud or on-premises storage systems. For collaborative projects, models can be stored using git and large file storage (LFS), facilitating version control and easy access to different model versions. Additionally, the AI platform can support downloading models directly from the Hugging Face platform, providing access to a vast repository of pre-trained models. For containerized deployments, a Docker registry stores inference images, allowing for consistent and repeatable deployment of models across various environments.

To support the diverse deployment scenarios, the "Create Model" user UI can allow for the aforementioned use cases. The UI provides a streamlined experience for users to upload, configure, and deploy their models across different platforms and environments. It includes options for selecting deployment targets (AWS SageMaker, Azure ML, self-hosted), configuring deployment settings (scaling, load balancing), and managing model storage preferences. By integrating these features into a cohesive UI, the deployment process becomes more accessible and user-friendly, enabling users to focus on developing and deploying high-quality AI models with minimal friction.

A custom code object in the UI can allow for connecting to legacy or custom external APIs. These can use Python code to call a user's systems.

Because tenant data is isolated from other tenants, the AI platform can also provide a migration function. This can include a temporary storage at the organization level. A user with appropriate permissions at both tenants can export an AI agent from a first tenant to the temporary storage while logged into the first tenant. Then, logged into the second tenant, the user can import the AI agent. The manifest file can be imported, and the AI platform can determine which agent objects in the AI agent are available at the second tenant. For those that are not, the user can attempt to gain administrative approval. The user can also import the specific agent objects, such as datasets, in an example. These can also be stored in the shared space.

The export function can include a process that checks for and removes PII. Likewise, an administrative approval (from a tenant or organization administrator) can be required prior to the export.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." Furthermore, aspects of the present disclosure may take the form of a computer program product in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Aspects of the present disclosure are described above with reference to flowchart illustrations and/or block diagrams of methods, apparatus (systems) and computer program products according to embodiments of the disclosure. The stages of the flowcharts can operate in different orders.

What is claimed is:

1. A method of managing artificial intelligence ("AI") agents for multiple tenants, comprising:

defining, by a server, an organization-tenant-group permissions hierarchy comprising a first organization having a first tenant and a second tenant, the first tenant having a first group and a second group, and the second tenant having a third group and a fourth group, the defining comprising:

assigning first tenant resource permissions to the first tenant, the first tenant resource permissions being a subset of the organization resource permissions;

assigning first group resource permissions to the first group and second resource permissions to the second group, the first group and second group resource permissions being different subsets of the first tenant resource permissions;

assigning first agent objects to the first tenant that meet the first tenant resource permissions, wherein the first agent objects are a subset of the organization agent objects; and assigning second agent objects to the second tenant that are a different subset of the organization agent objects than the first agent objects;

receiving, from a user device associated with a user, an input at an endpoint associated with an AI agent assigned to the first tenant, wherein the AI agent comprises a subset of the first agent objects that are identified in a manifest file;

retrieving a stored profile associated with the user or user device, wherein the stored profile indicates the user is associated with the first group of the first tenant;

based on the stored profile indicating the first group, verifying that the subset of the first agent objects satisfy the first group resource permissions;

executing the subset of the first agent objects in an order specified by the manifest file of the first AI agent, to an AI model specified in the manifest file, the input and a system prompt, wherein the system prompt is authorized for use based on an analysis of the stored profile of the user; and causing an output of the AI model to be displayed at the user device.

2. The method of claim 1, further comprising causing, by the server, display at the user device of a marketplace on a user interface ("UI") for adding agent objects to the first agent objects, wherein the UI prioritizes display of a first marketplace agent object that (1) meets the first resource permissions of the first tenant, and (2) is compatible with the first AI agent, wherein the first marketplace agent object is purchasable.

3. The method of claim 2, wherein the UI includes an option to simulate execution of the first marketplace agent object prior to purchase, wherein the simulated execution uses the first marketplace agent object in a modified version of the AI agent that is stored in association with the first group.

4. The method of claim 2, wherein the method further comprises:

receiving a UI selection from the user to add the first marketplace agent object to the first agent objects that are available to the first group;

delaying purchase of the agent object, the purchase being contingent on approval by an administrative user that is different than the user; and updating the available agent objects for the first group to include the purchased agent object.

5. The method of claim 2, wherein the UI includes an option toggle on non-permitted marketplace agent objects that fail to meet the resource permissions of the first group, wherein a first non-permitted marketplace agent object is prioritized for display based on similarities to a current agent object in the AI agent, the similarities including object type, object date, object version, and object creator.

6. The method of claim 1, further comprising causing display of a user interface ("UI") for designing a first tenant AI agent, wherein the UI dynamically manages access to agent objects based on the stored profile of the user and the defined organization-tenant-group permissions hierarchy.

7. The method of claim 6, further comprising dynamically displaying, based on a tenant selection by the user, available agent objects for the first group of the first tenant, wherein the available agent objects include at least a subset of the first agent objects that meet the resource permissions of the first group of the first tenant, wherein the available agent objects do not include those of the second agent objects that are not also first agent objects.

8. The method of claim 6, further comprising causing display of UI options at the user device to select and connect the subset of the first agent objects, the first agent objects being draggable within the UI, wherein the first agent objects include prompt objects, dataset objects, and model objects.

9. The method of claim 1, wherein defining the organization-tenant-group permissions hierarchy further comprises:

receiving, at the server, user information and organization information;

defining, by the server, a first organization based on the organization information and a first user based on the user information, the first user being associated with the first organization by a profile that includes an organization identifier;

assigning, by the server, organization resource permissions and organization agent objects to the organization identifier of the first organization; and based on receiving inputs from the first user, defining, by the server, multiple tenants for the first organization, including the first tenant having a first tenant identifier and the second tenant having a second tenant identifier, both the first and second tenants being associated with the organization identifier.

10. The method of claim 1, wherein the first group and the second group have first and second resource permissions, respectively, that give access to different agent objects from among the first agent objects assigned to the first tenant, and wherein the first and second resource permissions are less permissive than the resource permissions of the first tenant.

11. The method of claim 1, wherein the AI agent is a default AI agent that is selected for display based on profile information of the user, the default AI agent meeting resource permissions of the first group, the first tenant, and the first organization.

12. The method of claim 1, wherein a user interface ("UI") presents the first tenant and the second tenant as options to the user based on the stored profile of the user identifying the first tenant and the second tenant, wherein the user has different resource permissions with respect to the second tenant than with respect to the first tenant.

13. The method of claim 12, wherein selecting the second tenant causes display of the second agent objects, the second agent objects being different than the first agent objects of the first tenant.

14. The method of claim 12, wherein the server prevents the user from simultaneously accessing AI agents of the first tenant and the second tenant.

15. The method of claim 12, wherein the UI prioritizes display of marketplace agent objects that meets resource permissions of the second tenant.

16. The method of claim 12, further comprising:

determining that the resource permissions allow for exporting the AI agent from the first tenant to the second tenant;

based on a UI selection and the determination, exporting the first AI agent to a temporary storage; and in an instance in which the user logs into the second tenant, importing the first AI agent from the temporary storage.

17. The method of claim 1, wherein the first agent objects are determined based on a selected plan during creation of the first tenant.

18. The method of claim 1, wherein the stored profile indicates a role of the user, and wherein the role dictates accessibility of the first AI agent.

19. A system for managing multiple-tenant access to artificial intelligence ("AI") agents, comprising:

a memory storage including a non-transitory, computer-readable medium comprising instructions; and at least one hardware-based processor that executes the instructions to carry out stages comprising:

defining, by a server, an organization-tenant-group permissions hierarchy comprising a first organization having a first tenant and a second tenant, the first tenant having a first group and a second group, and the second tenant having a third group and a fourth group, the defining comprising:

assigning first tenant resource permissions to the first tenant, the first tenant resource permissions being a subset of the organization resource permissions;

assigning first group resource permissions to the first group and second resource permissions to the second group, the first group and second group resource permissions being different subsets of the first tenant resource permissions;

assigning first agent objects to the first tenant that meet the first tenant resource permissions, wherein the first agent objects are a subset of the organization agent objects; and assigning second agent objects to the second tenant that are a different subset of the organization agent objects than the first agent objects;

receiving, from a user device associated with a user, an input at an endpoint associated with an AI agent assigned to the first tenant, wherein the AI agent comprises a subset of the first agent objects that are identified in a manifest file;

retrieving a stored profile associated with the user or user device, wherein the stored profile indicates the user is associated with the first group of the first tenant;

based on the stored profile indicating the first group, verifying that the subset of the first agent objects satisfy the first group resource permissions;

executing the subset of the first agent objects in an order specified by the manifest file of the first AI agent, to an AI model specified in the manifest file, the input and a system prompt, wherein the system prompt is authorized for use based on an analysis of the stored profile of the user; and causing an output of the AI model to be displayed at the user device.

20. A non-transitory, computer-readable medium having instructions for managing multiple tenant usage of an artificial intelligence ("AI") platform, the instructions, when executed by a processor, causing the processor to perform stages comprising:

defining, by a server, an organization-tenant-group permissions hierarchy comprising a first organization having a first tenant and a second tenant, the first tenant having a first group and a second group, and the second tenant having a third group and a fourth group, the defining comprising:

assigning first tenant resource permissions to the first tenant, the first tenant resource permissions being a subset of the organization resource permissions;

assigning first group resource permissions to the first group and second resource permissions to the second group, the first group and second group resource permissions being different subsets of the first tenant resource permissions;

assigning first agent objects to the first tenant that meet the first tenant resource permissions, wherein the first agent objects are a subset of the organization agent objects; and assigning second agent objects to the second tenant that are a different subset of the organization agent objects than the first agent objects;

receiving, from a user device associated with a user, an input at an endpoint associated with an AI agent assigned to the first tenant, wherein the AI agent comprises a subset of the first agent objects that are identified in a manifest file;

retrieving a stored profile associated with the user or user device, wherein the stored profile indicates the user is associated with the first group of the first tenant;

based on the stored profile indicating the first group, verifying that the subset of the first agent objects satisfy the first group resource permissions;

executing the subset of the first agent objects in an order specified by the manifest file of the first AI agent, the execution comprising sending, to an AI model specified in the manifest file, the input and a system prompt, wherein the system prompt is authorized for use based on an analysis of the stored profile of the user; and causing an output of the AI model to be displayed at the user device.

* * * * *